Oct. 12, 1965 S. H. CREED 3,211,201
PEAR STEM END TRIMMING, STEMMING, PEELING, CORING, AND
SPLITTING MACHINE
Filed May 31, 1962 32 Sheets-Sheet 1
FIG_1
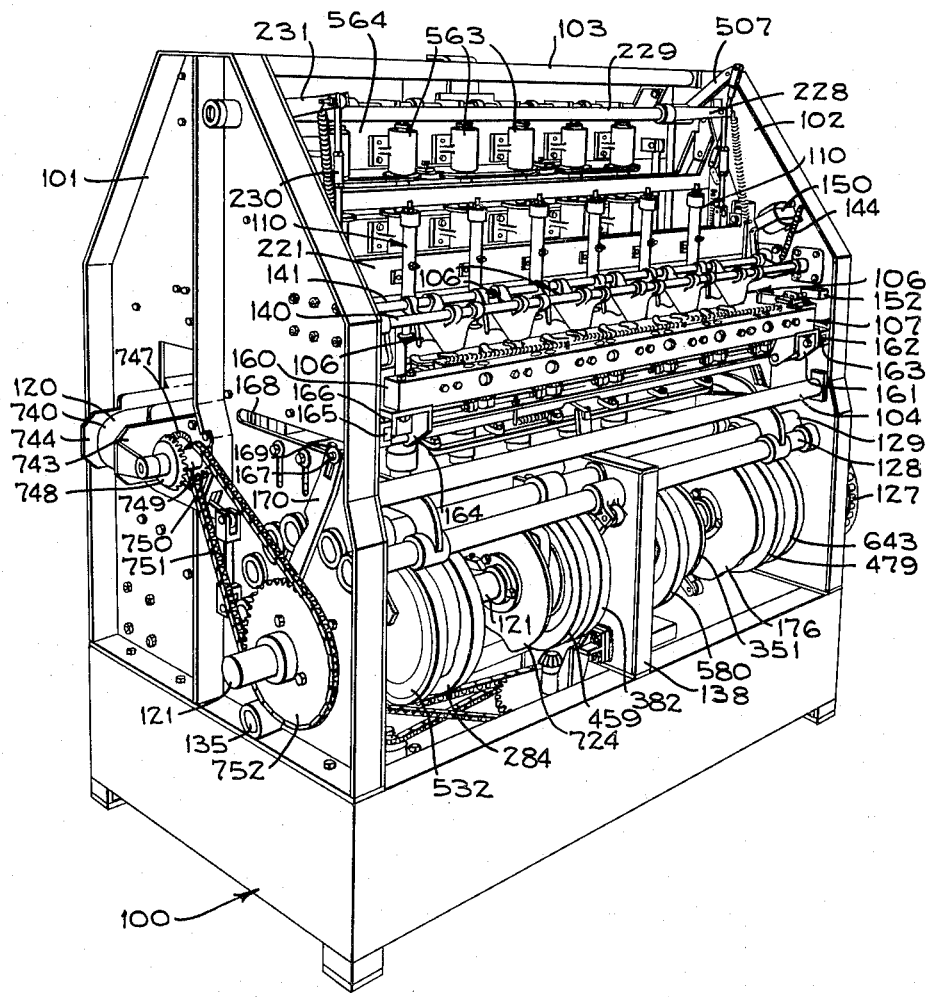
INVENTOR
SHERMAN H. CREED
BY
ATTORNEY

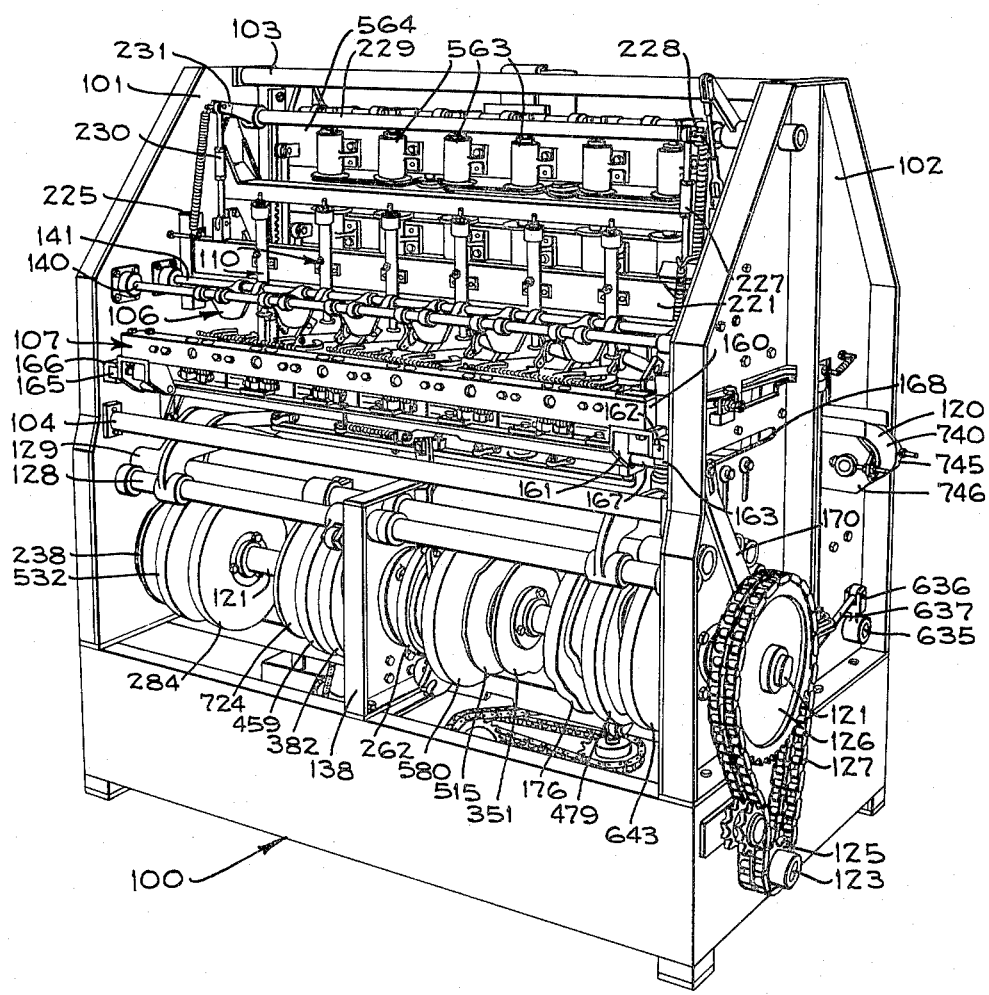

Oct. 12, 1965 S. H. CREED 3,211,201
PEAR STEM END TRIMMING, STEMMING, PEELING, CORING, AND
SPLITTING MACHINE
Filed May 31, 1962 32 Sheets-Sheet 3
FIG_3
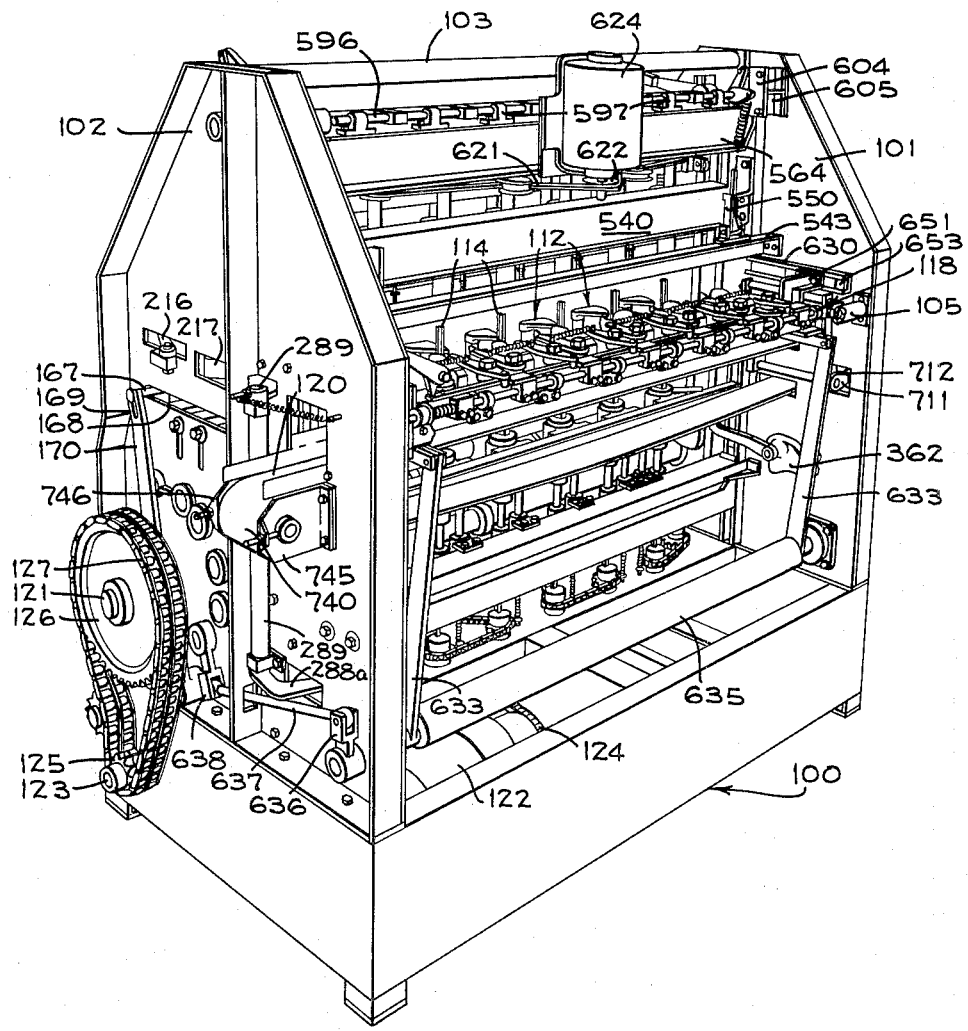
INVENTOR
SHERMAN H. CREED
BY Hans G. Hoffmeister.
ATTORNEY

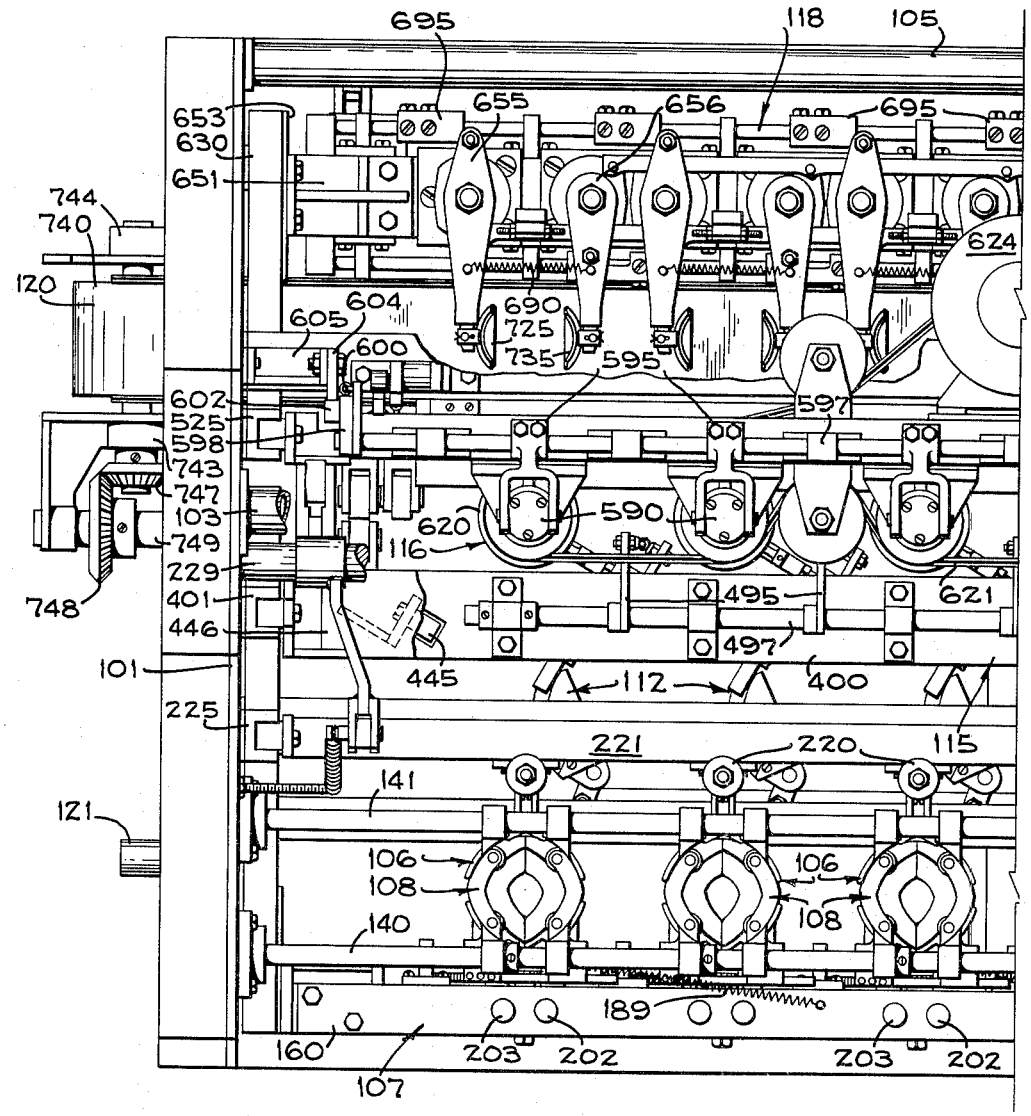

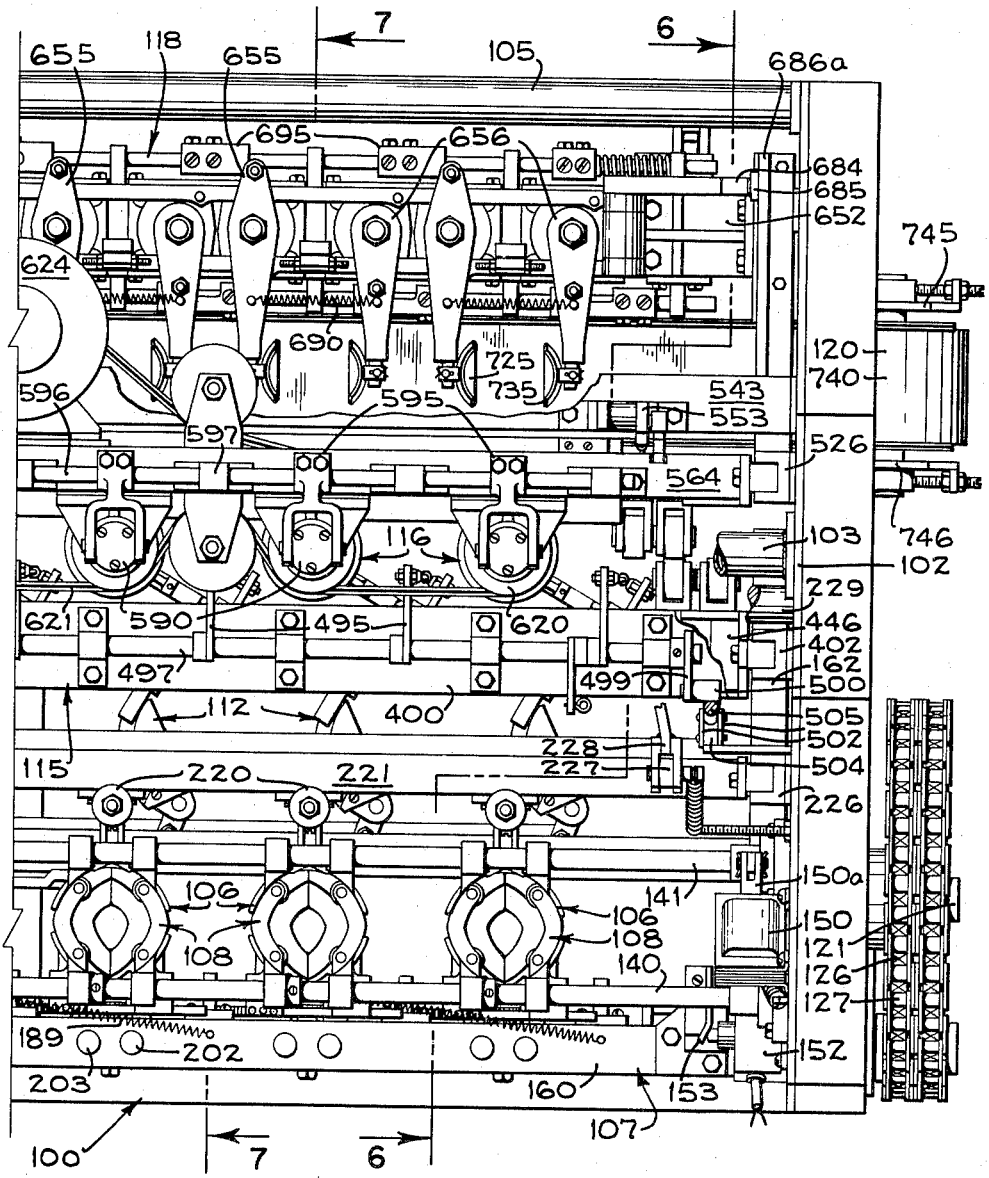

Oct. 12, 1965 S. H. CREED 3,211,201
PEAR STEM END TRIMMING, STEMMING, PEELING, CORING, AND
SPLITTING MACHINE
Filed May 31, 1962 32 Sheets-Sheet 6
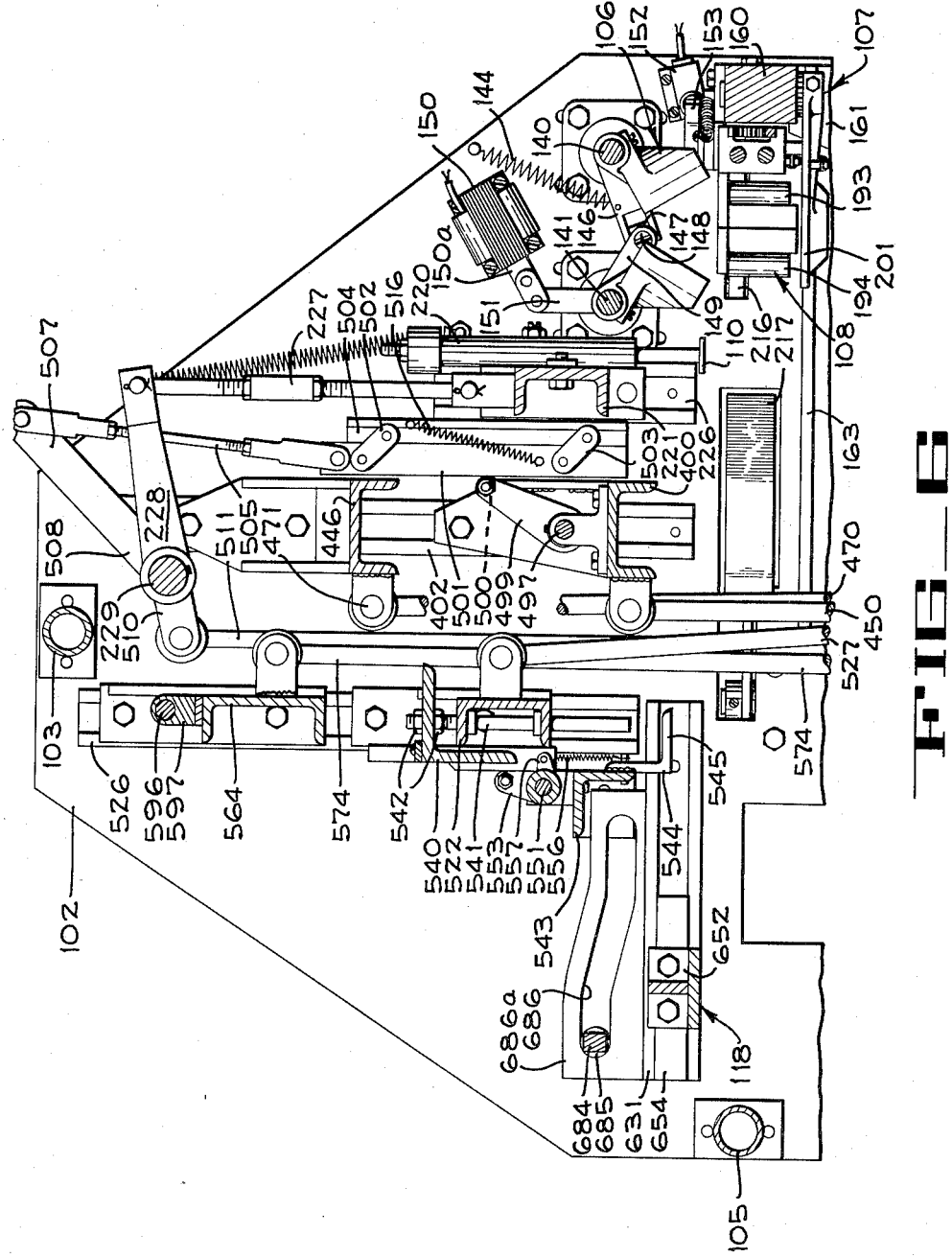
FIG_6
INVENTOR
SHERMAN H. CREED
BY Hans G. Hoffmeister
ATTORNEY

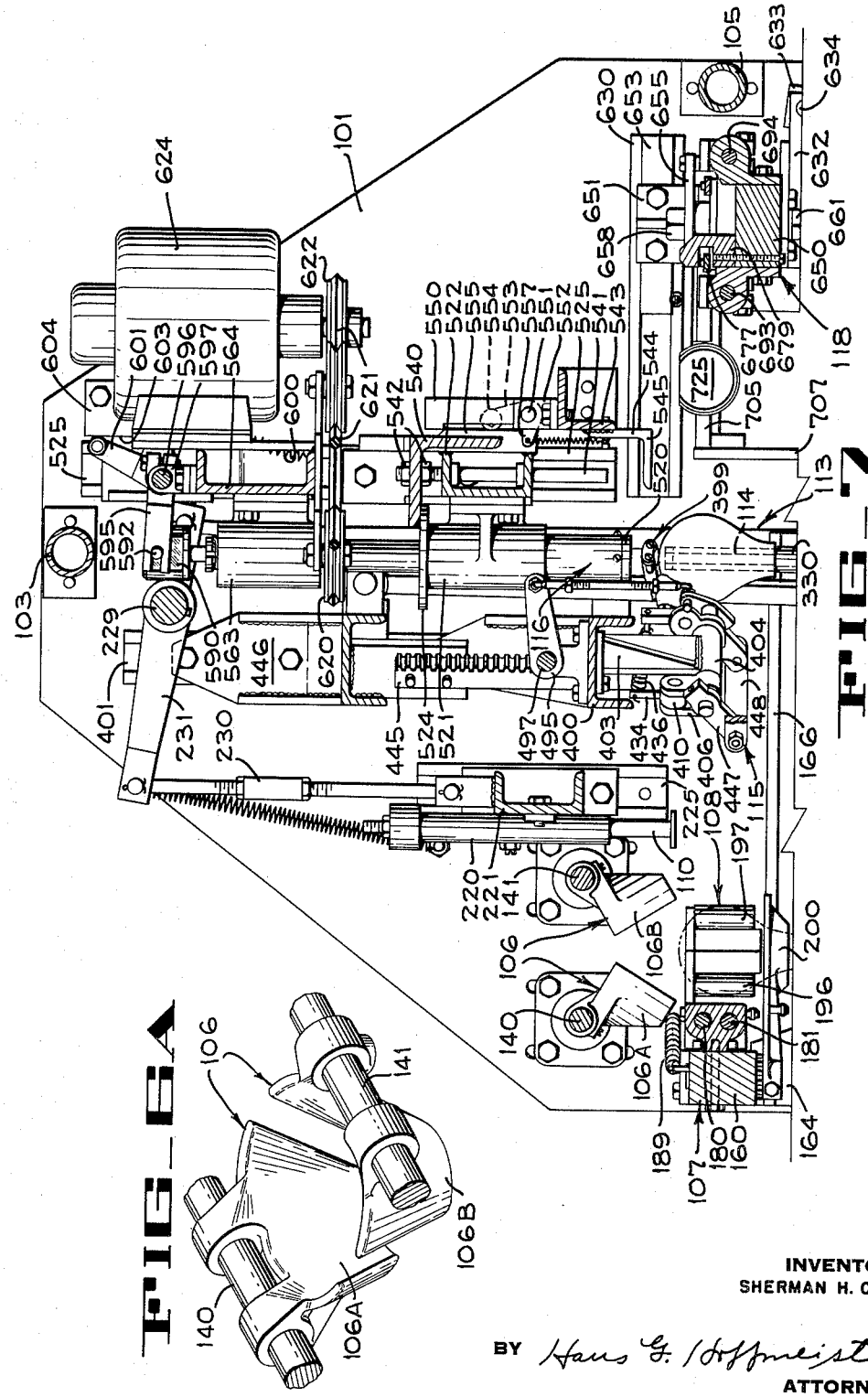

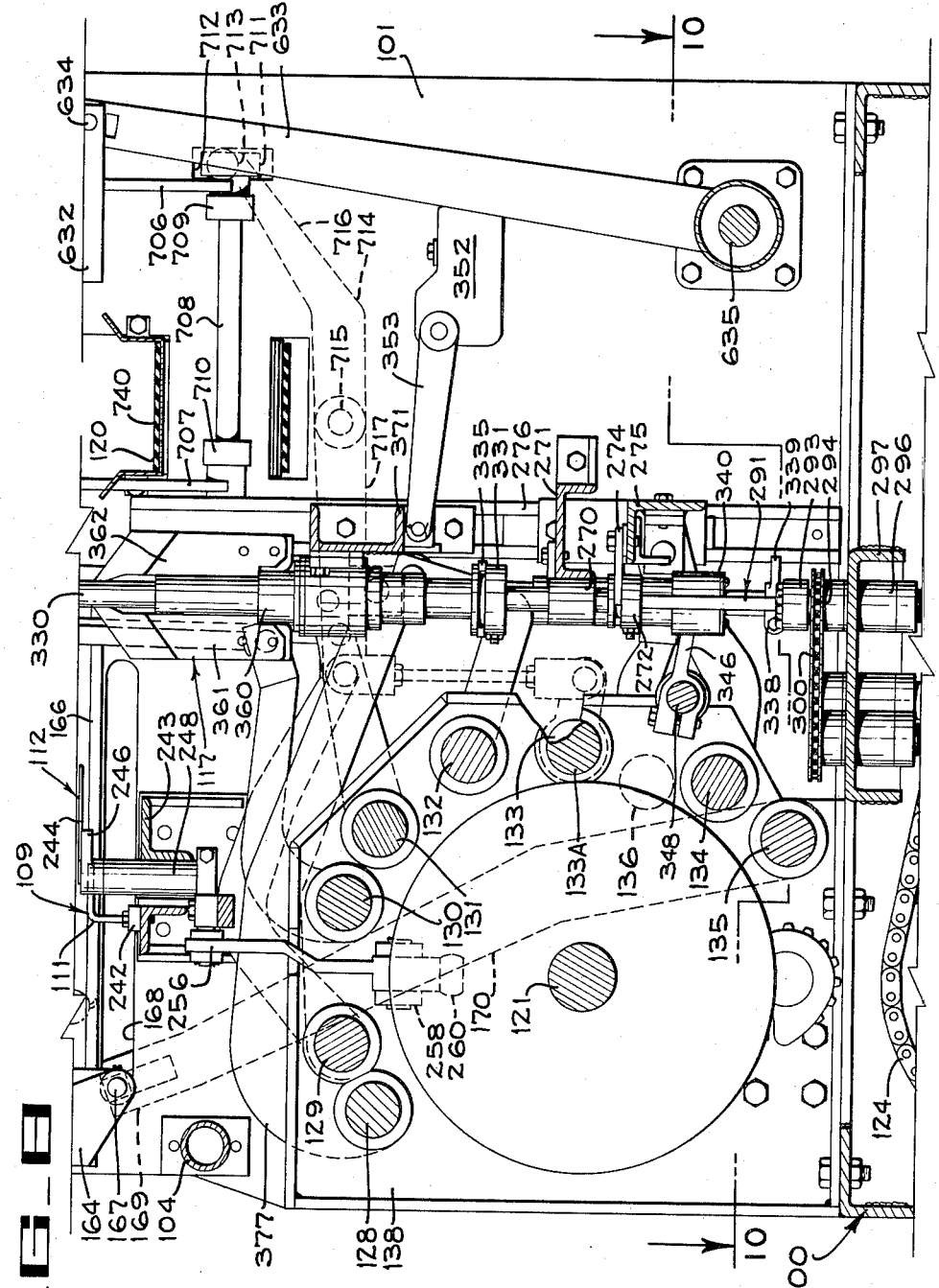

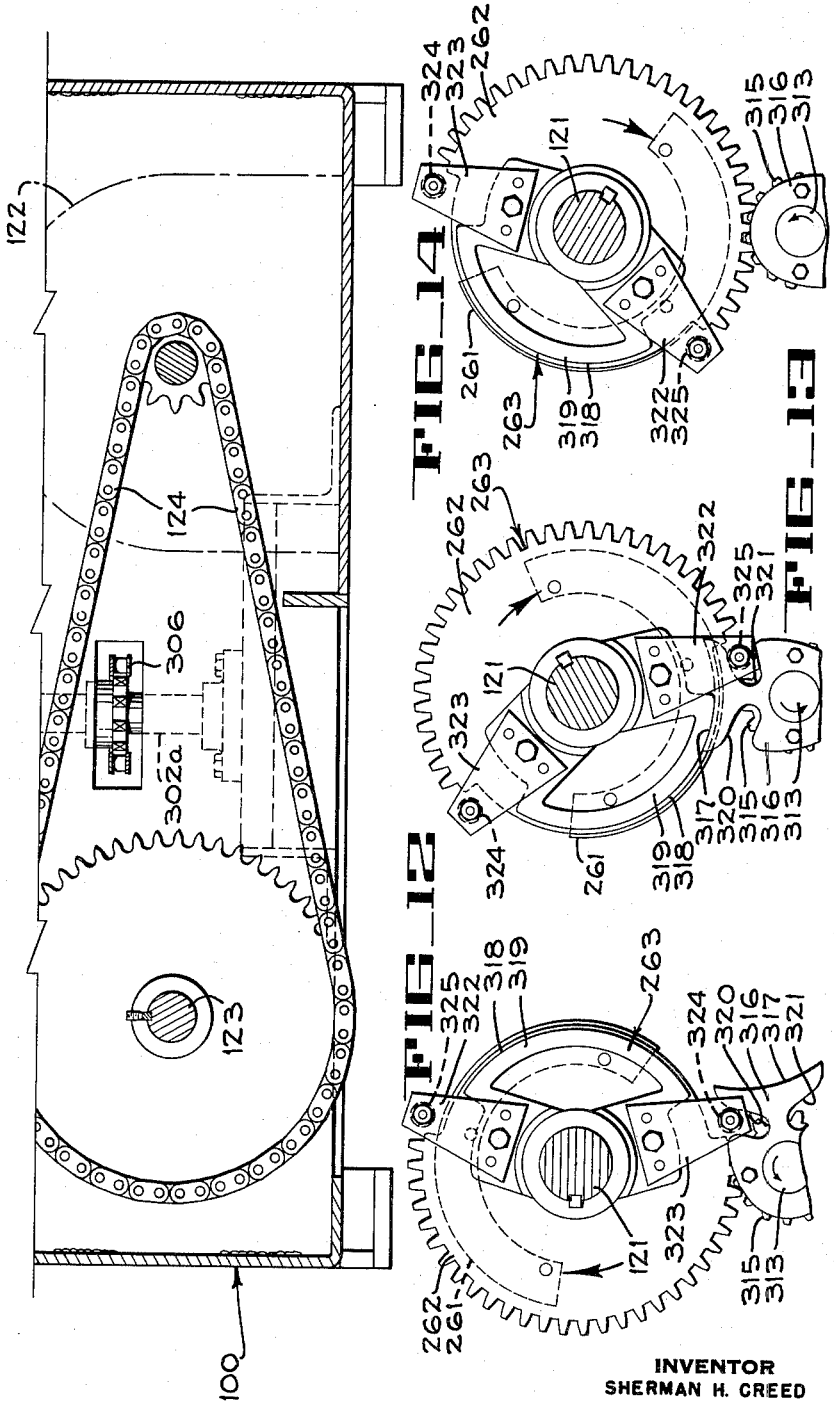

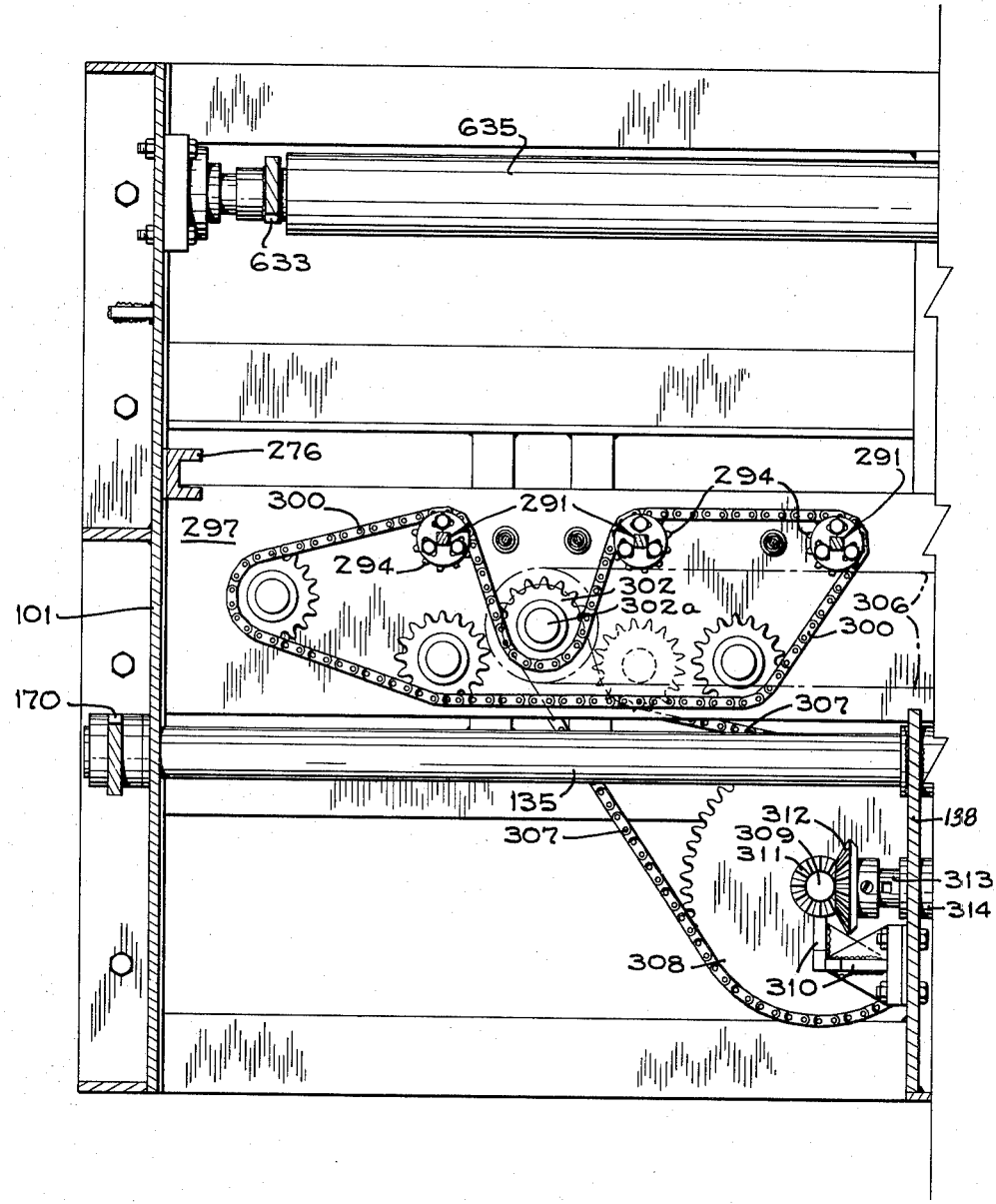

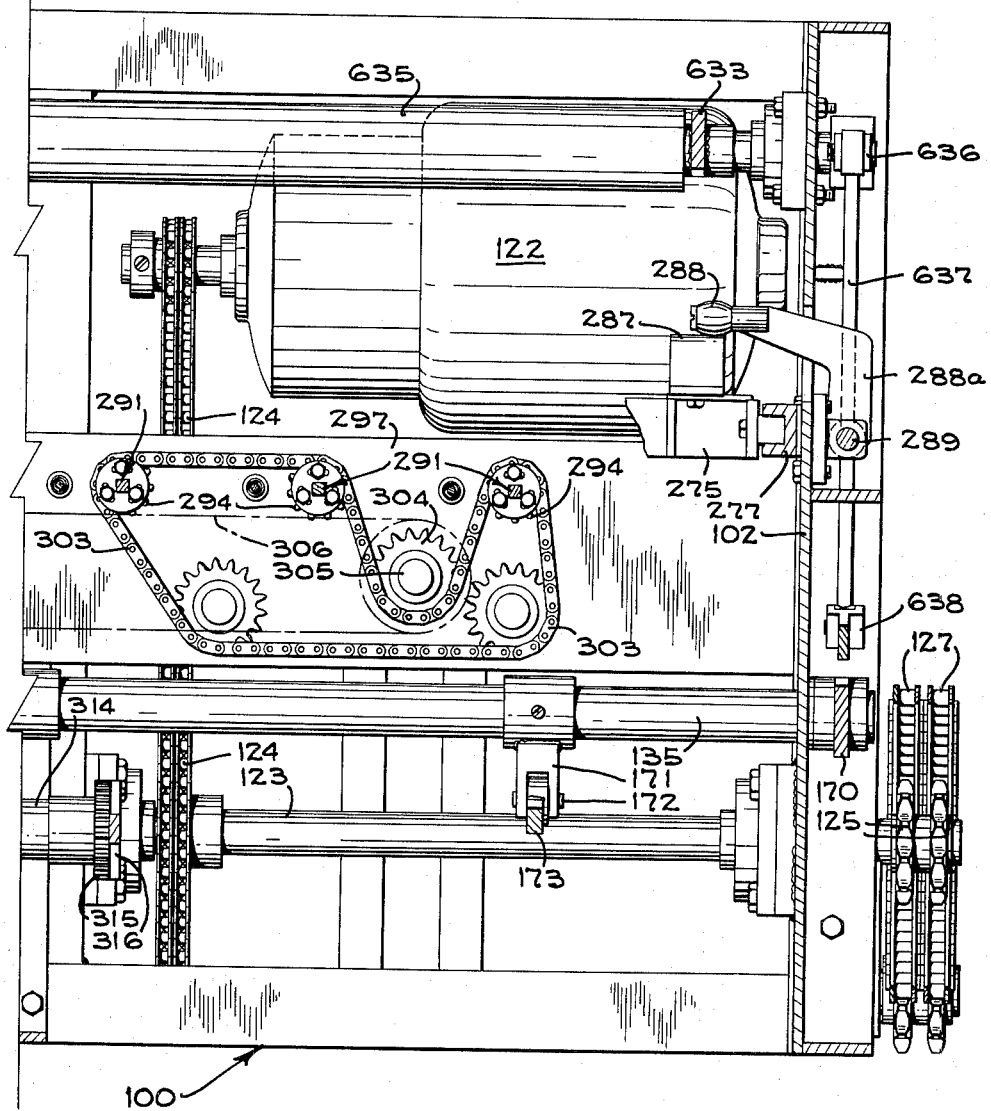

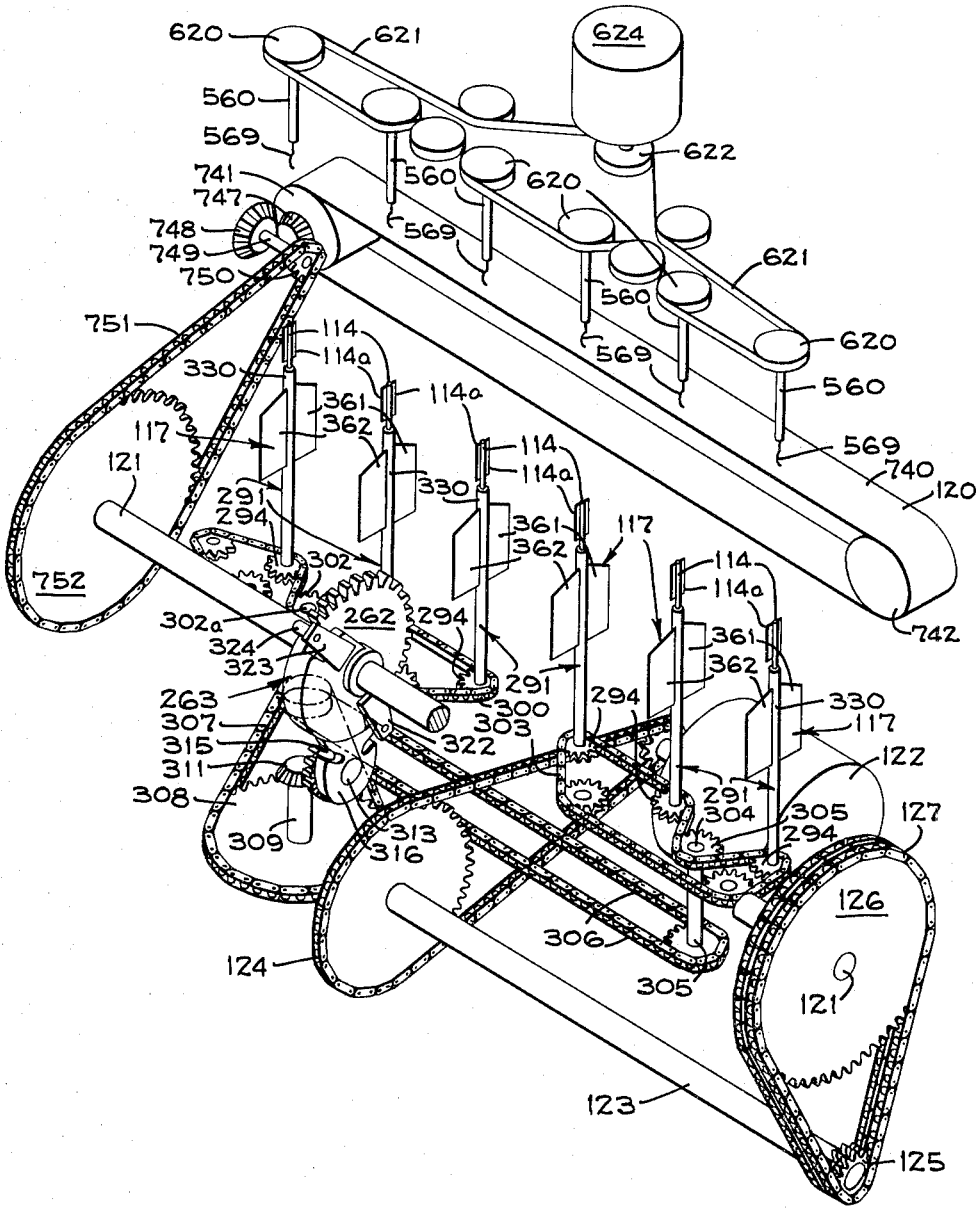

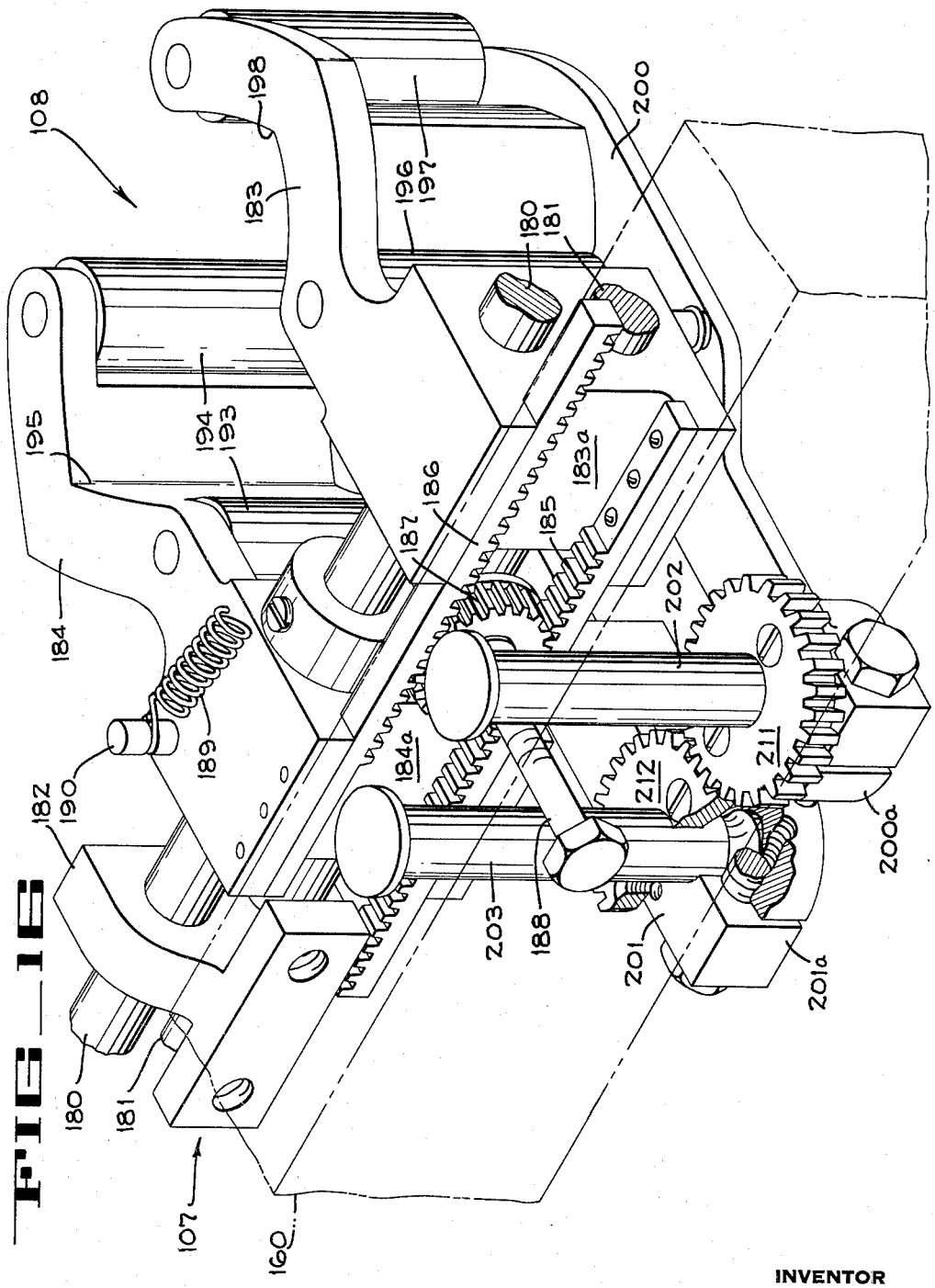

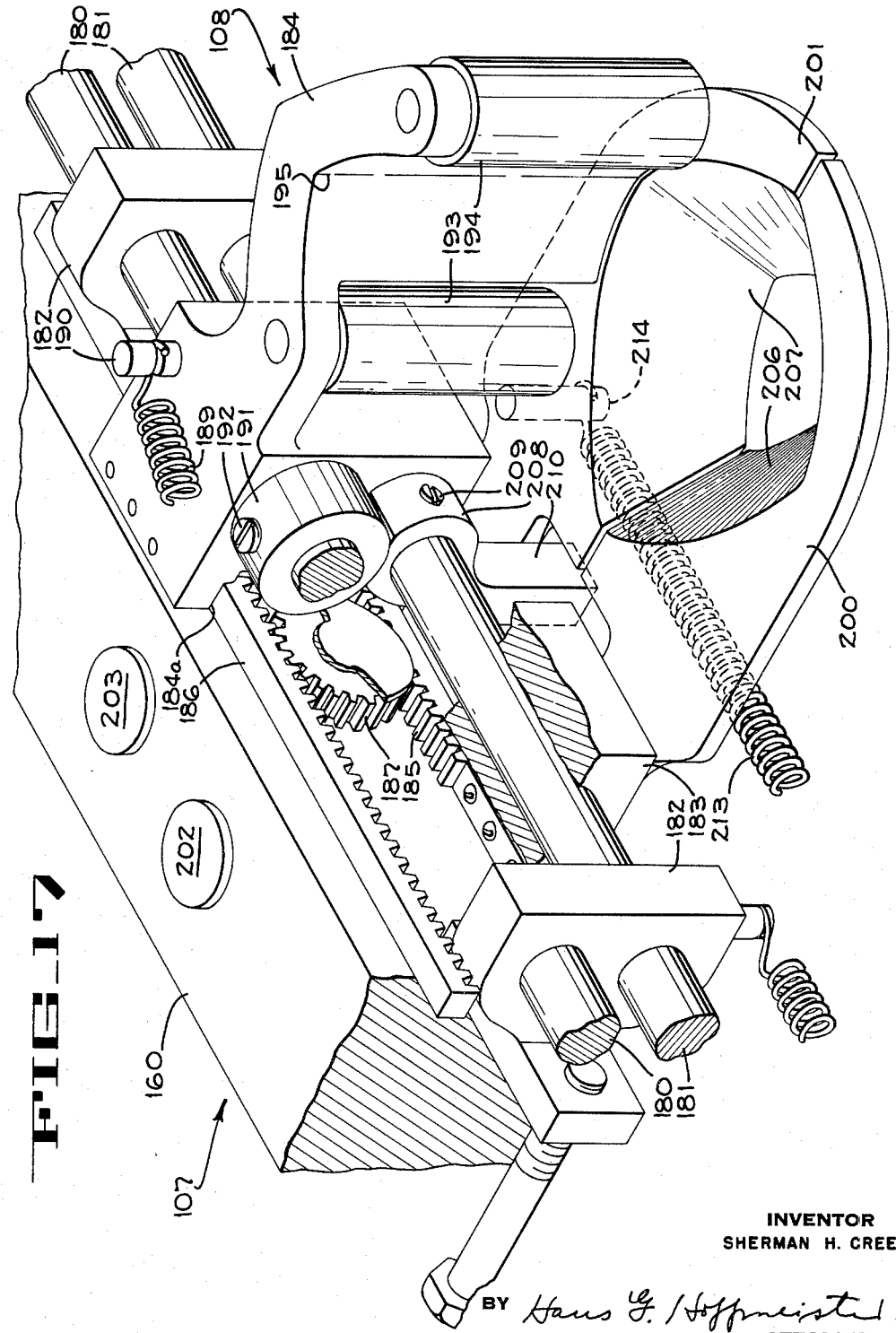

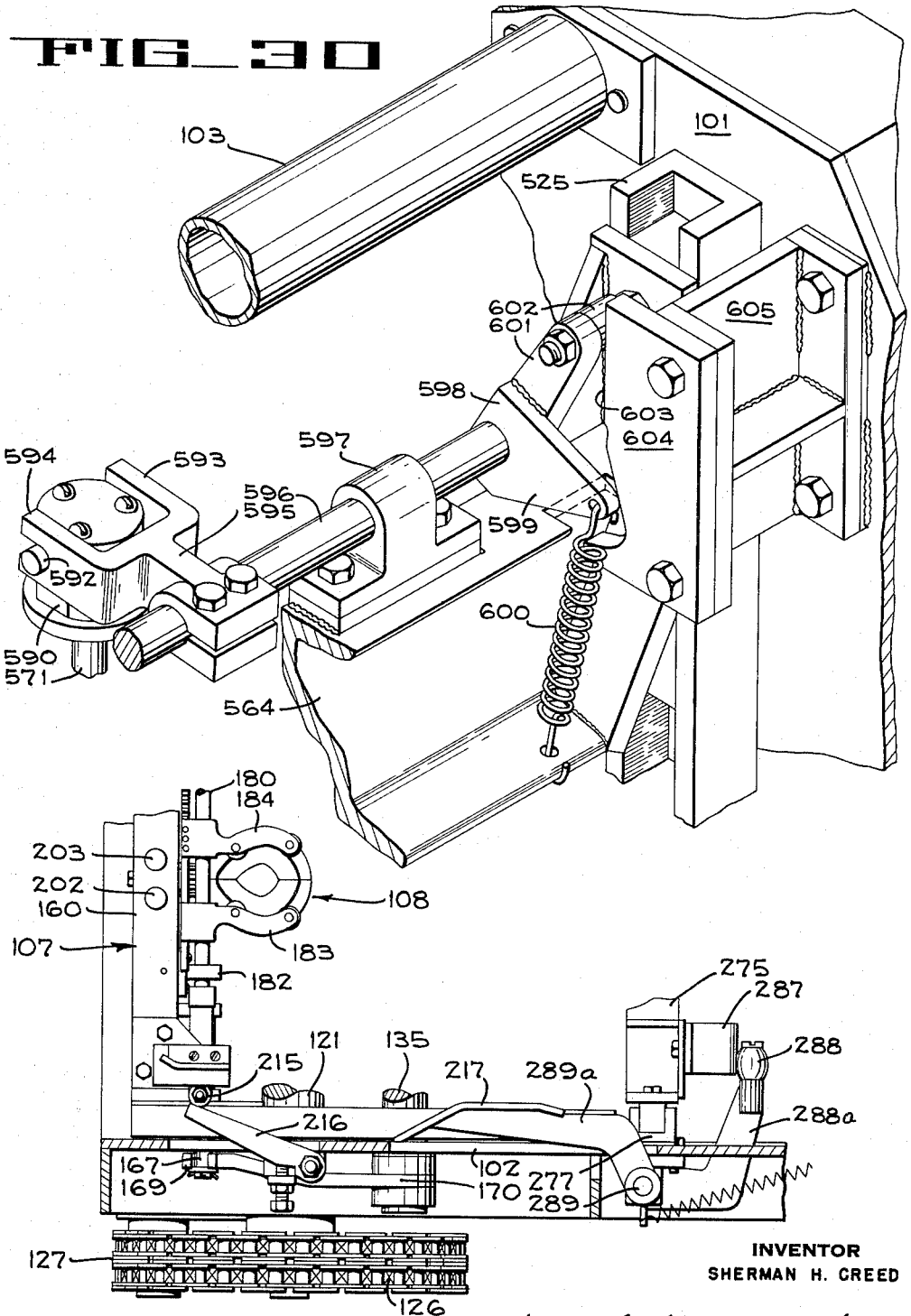

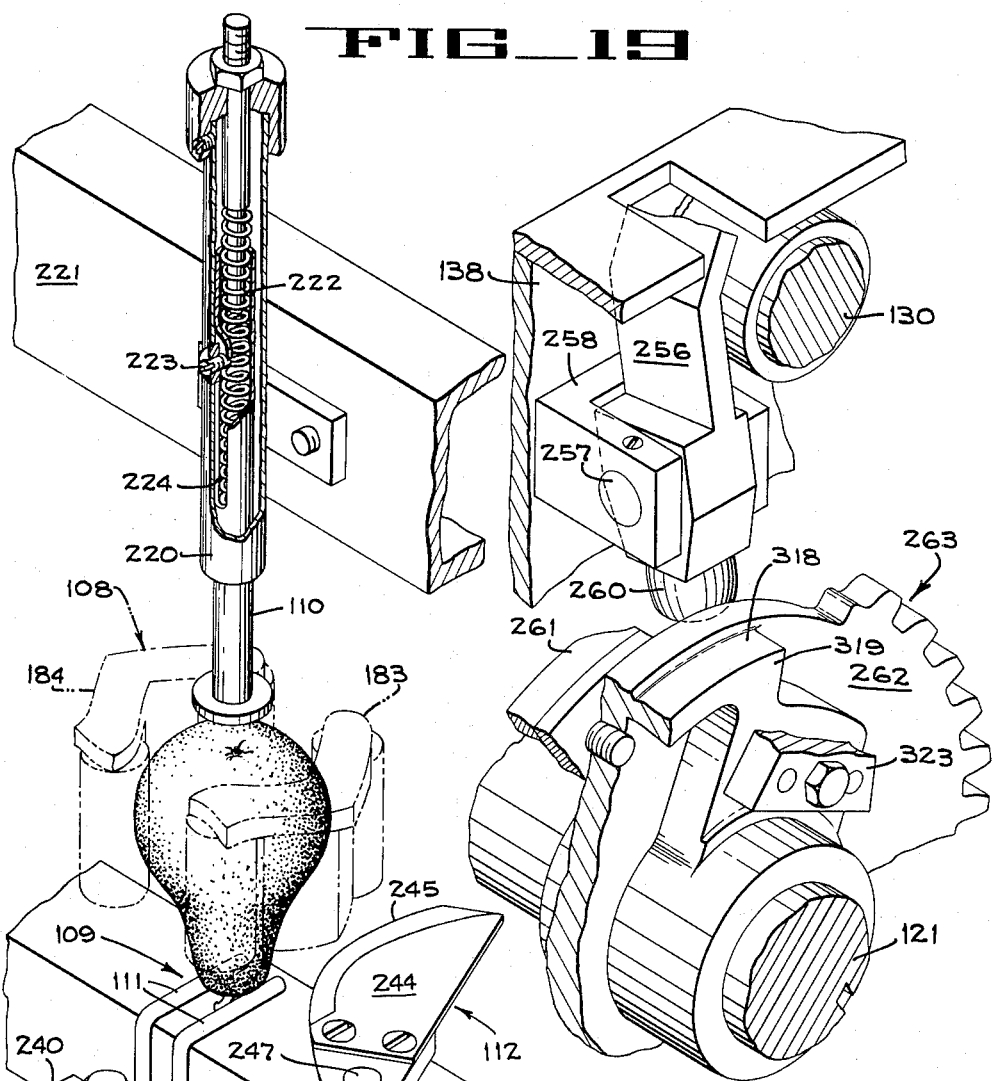

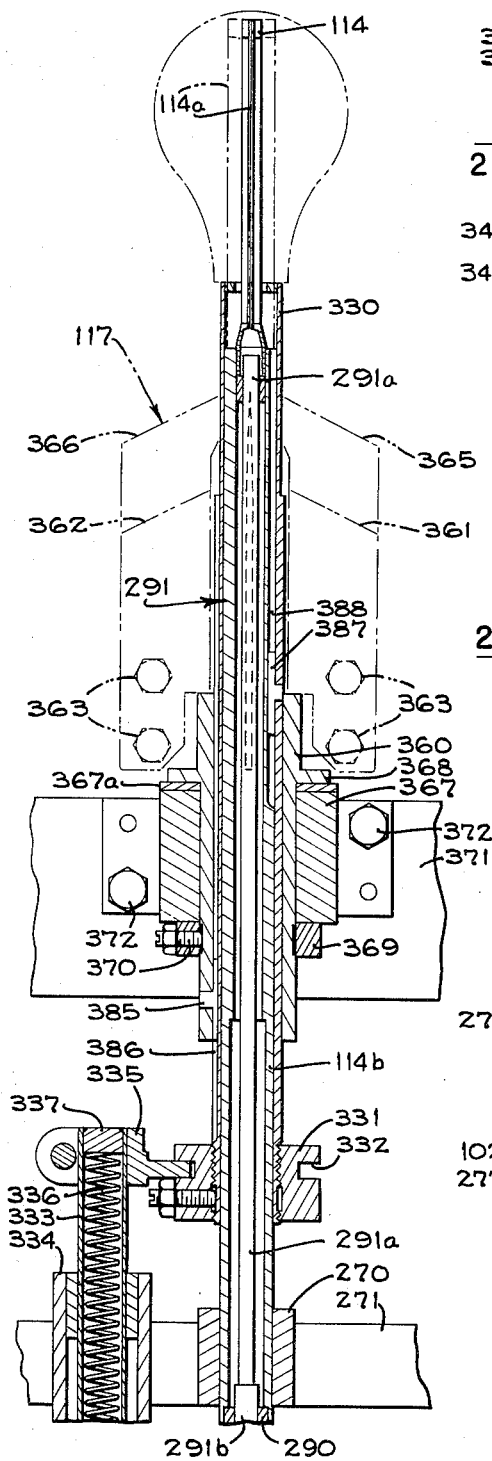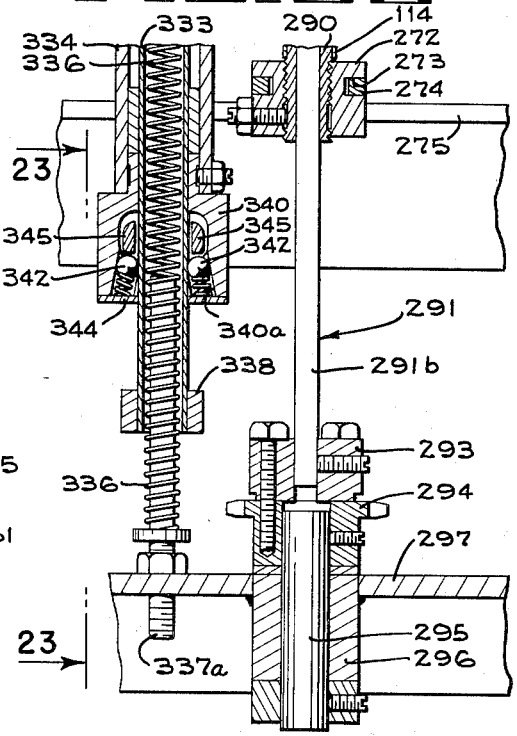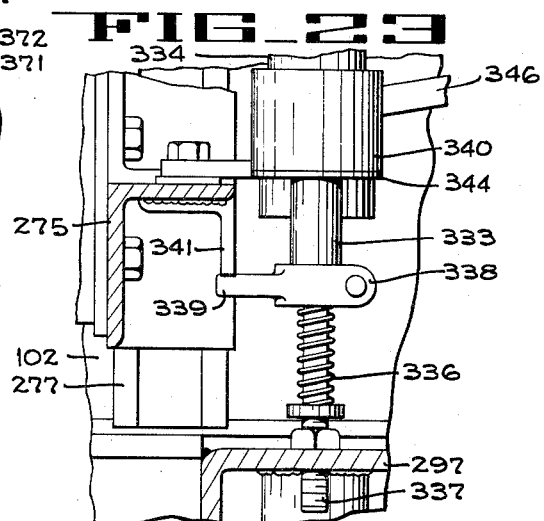

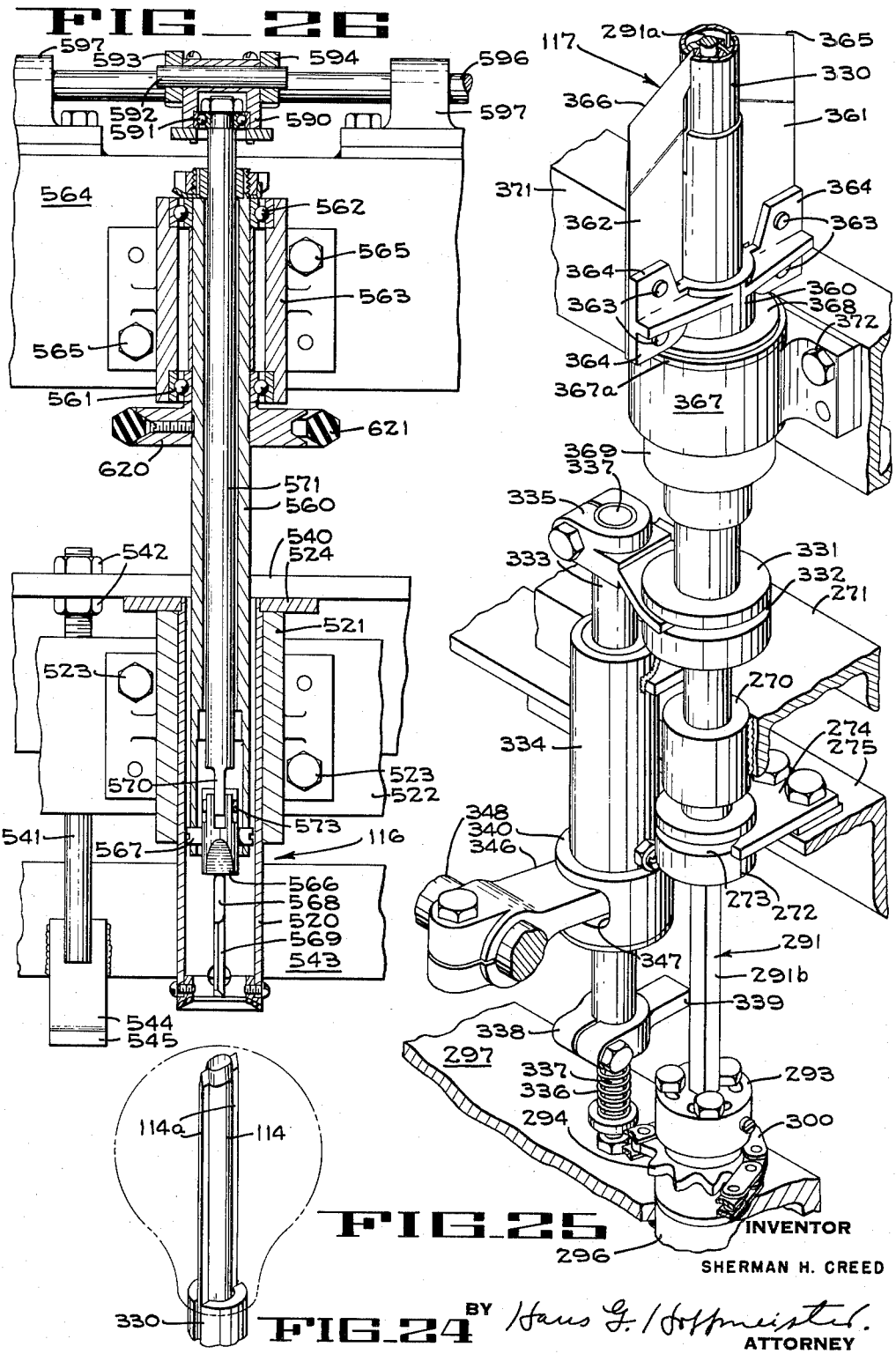

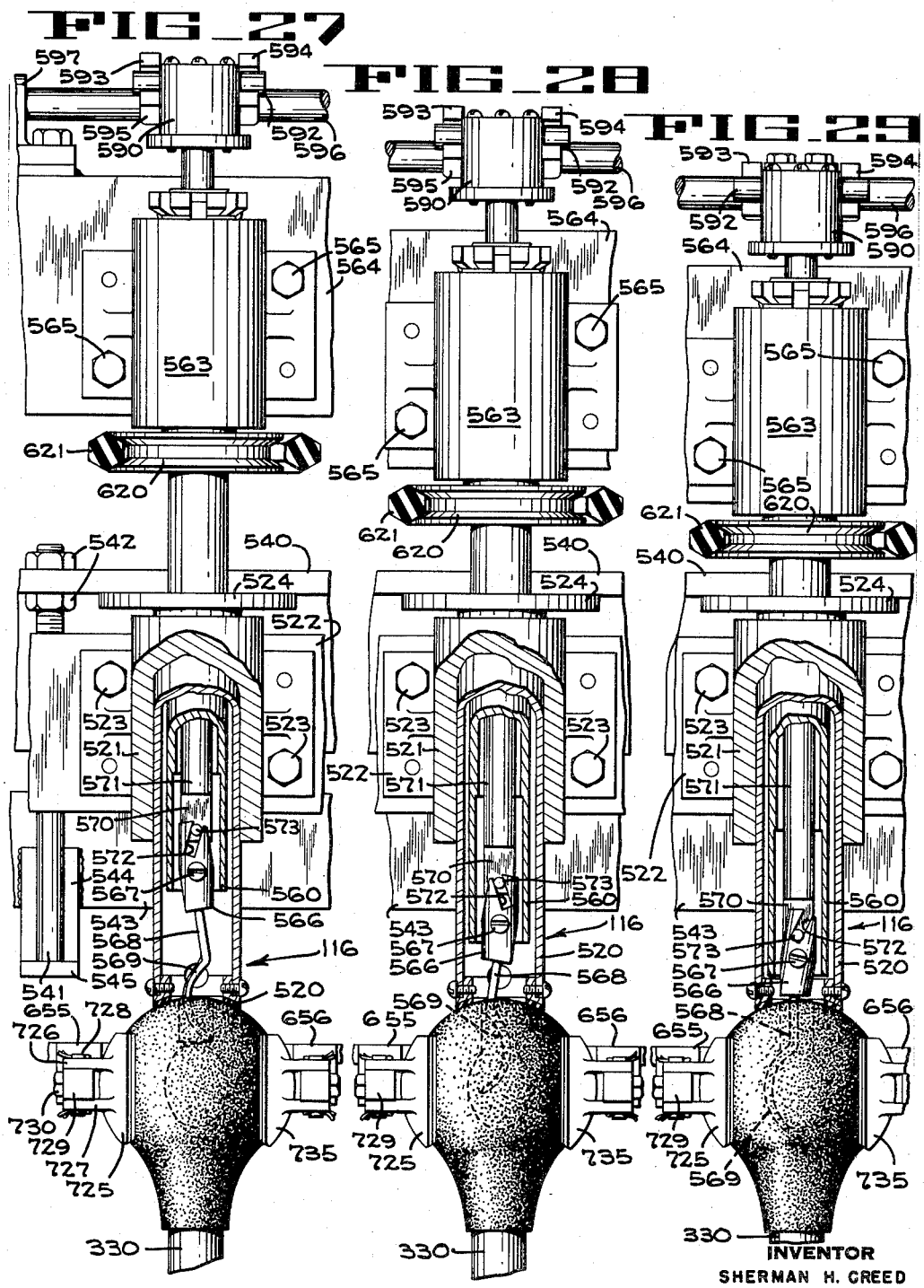

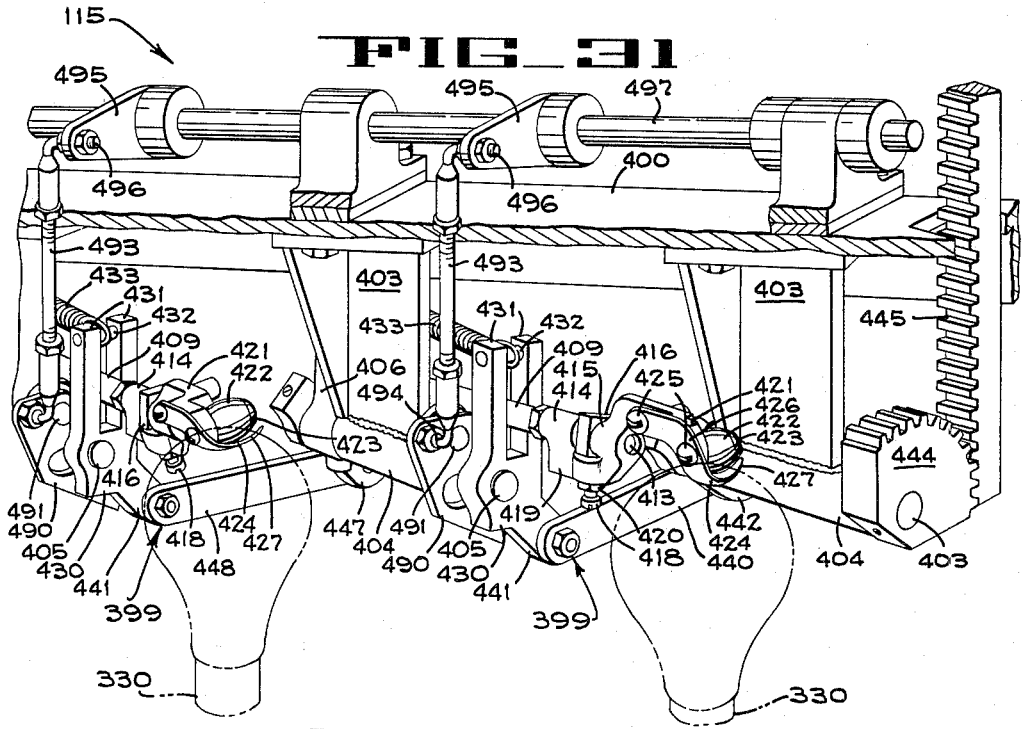
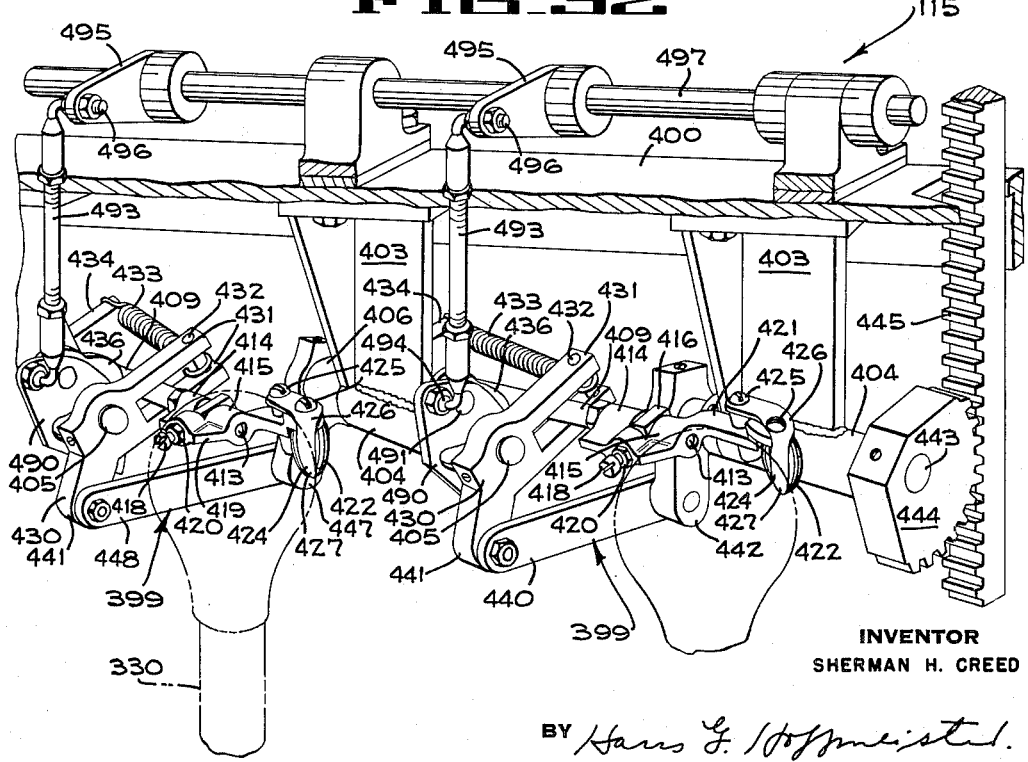

Oct. 12, 1965
S. H. CREED
3,211,201
PEAR STEM END TRIMMING, STEMMING, PEELING, CORING, AND
SPLITTING MACHINE
Filed May 31, 1962
32 Sheets-Sheet 21
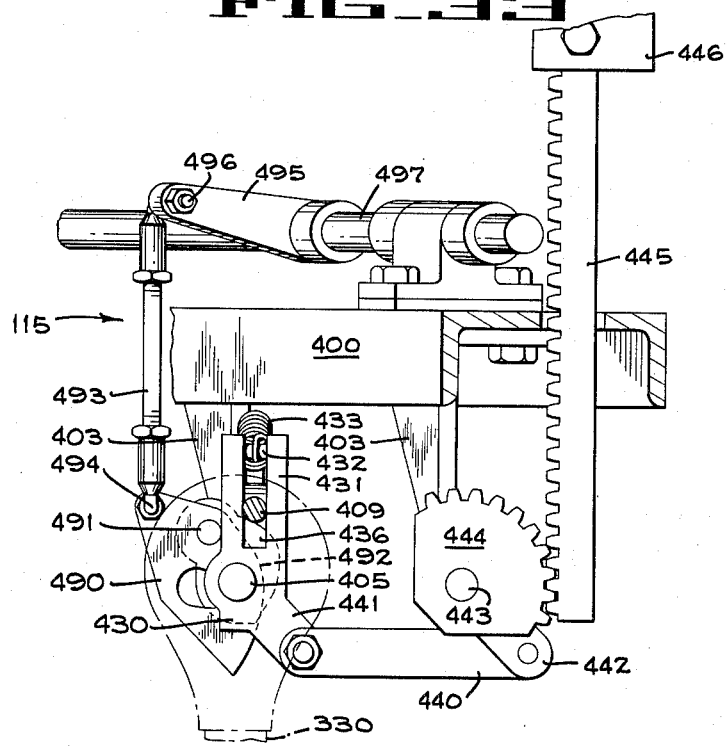
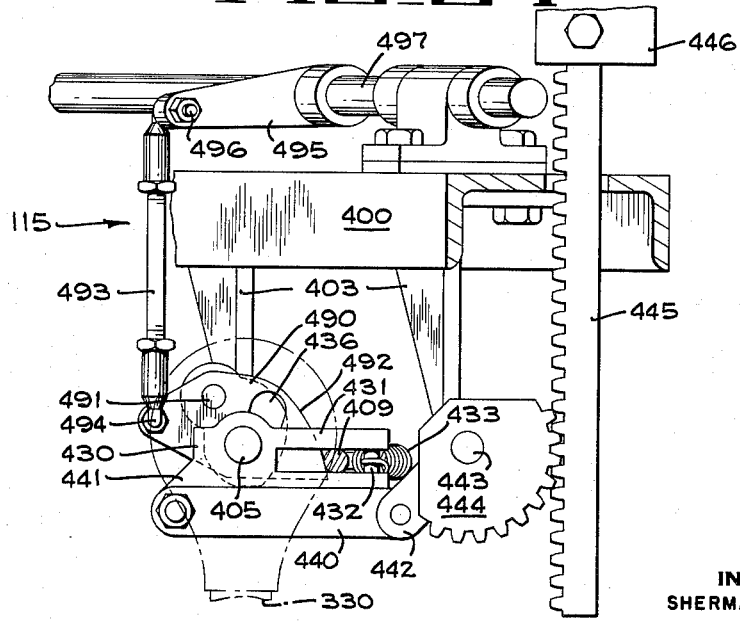
INVENTOR
SHERMAN H. CREED
BY Hans G. Hoffmeister
ATTORNEY

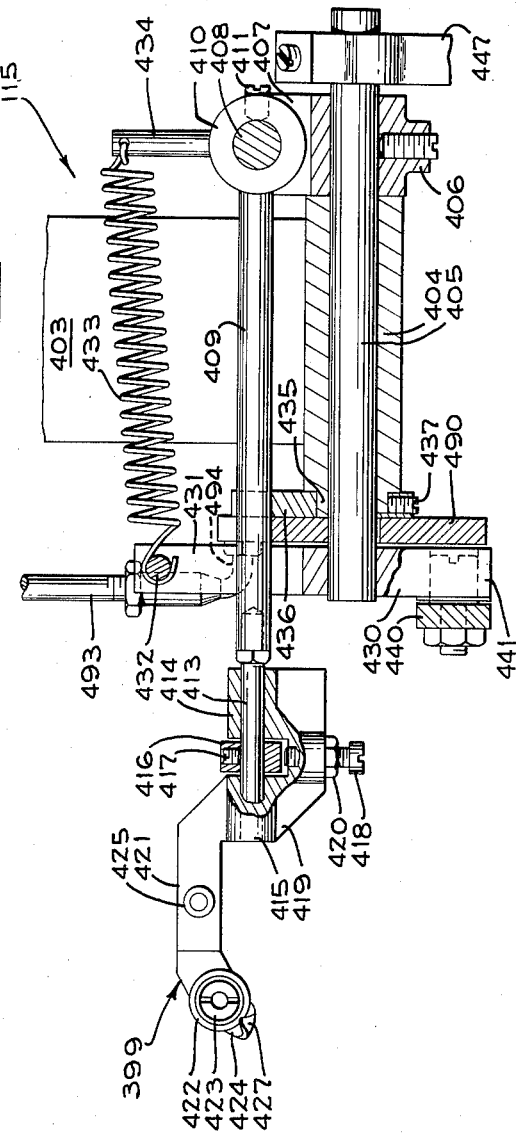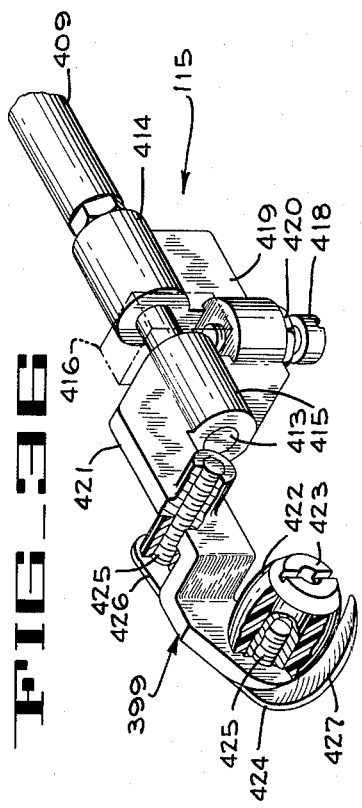

Oct. 12, 1965
S. H. CREED
3,211,201
PEAR STEM END TRIMMING, STEMMING, PEELING, CORING, AND SPLITTING MACHINE
Filed May 31, 1962
32 Sheets-Sheet 23
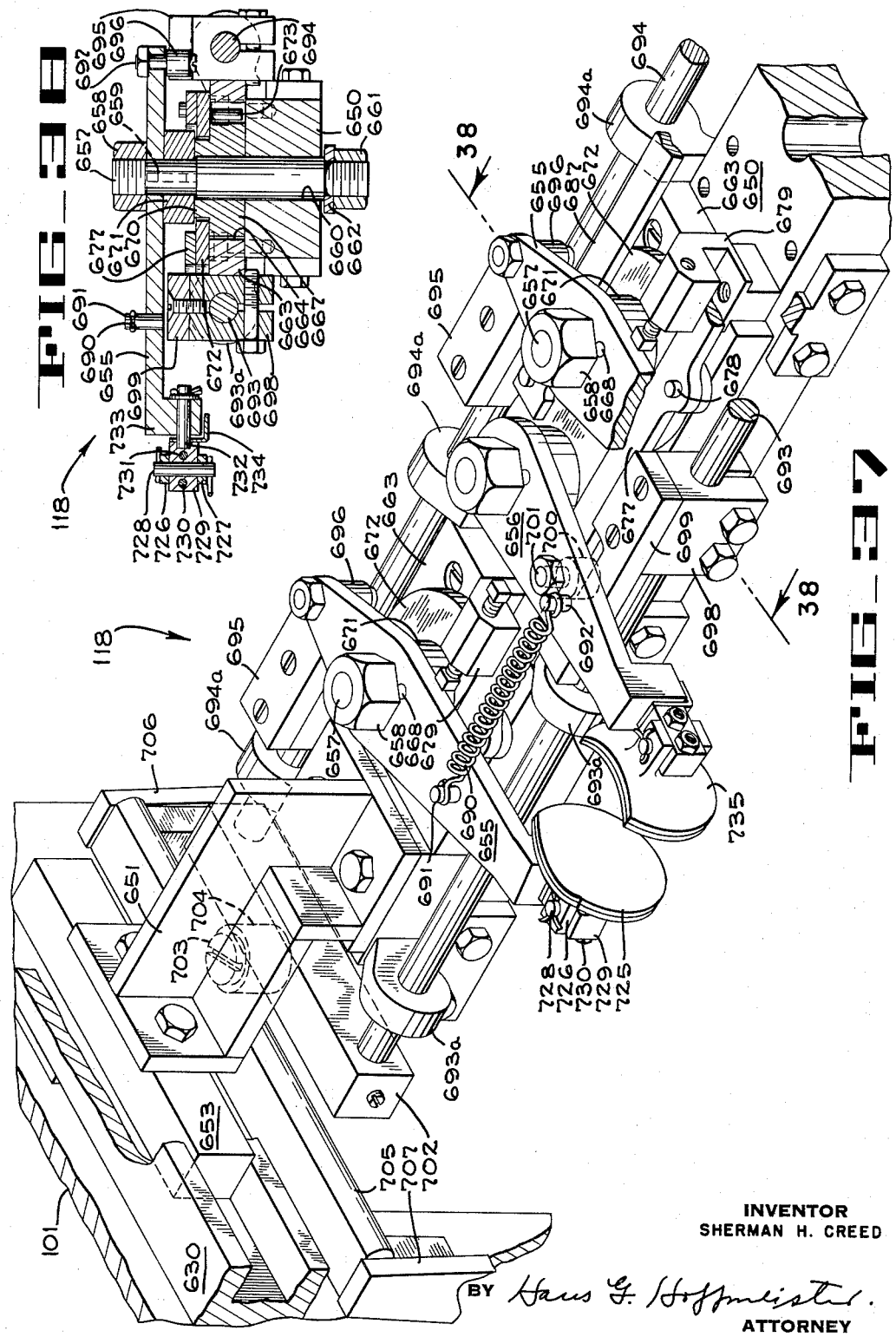
INVENTOR
SHERMAN H. CREED
BY Hans G. Hoffmeister.
ATTORNEY Oct. 12, 1965 S. H. CREED 3,211,201
PEAR STEM END TRIMMING, STEMMING, PEELING, CORING, AND
SPLITTING MACHINE
Filed May 31, 1962 32 Sheets-Sheet 24
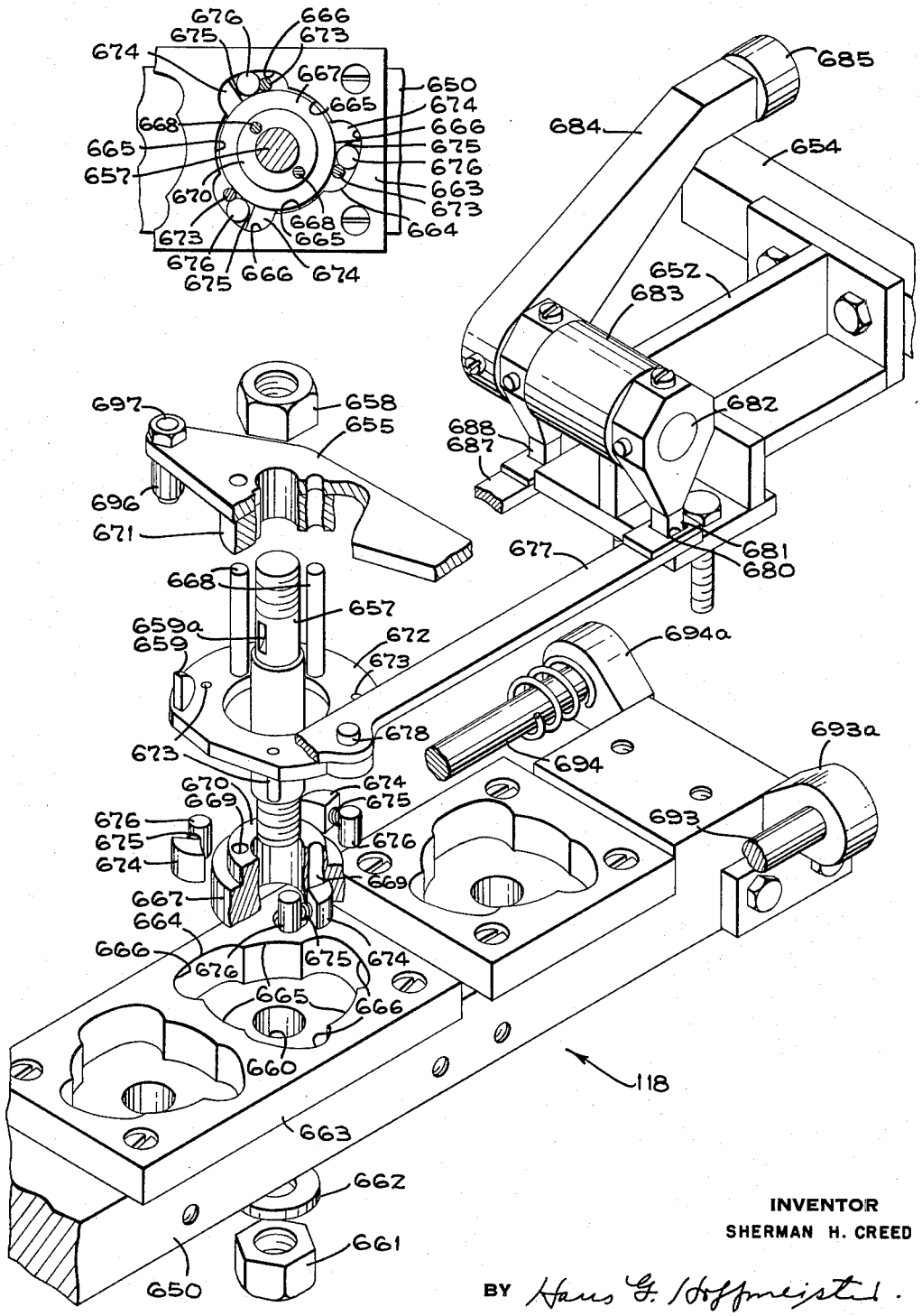
INVENTOR
SHERMAN H. CREED
BY Hans G. Hoffmeister
ATTORNEY

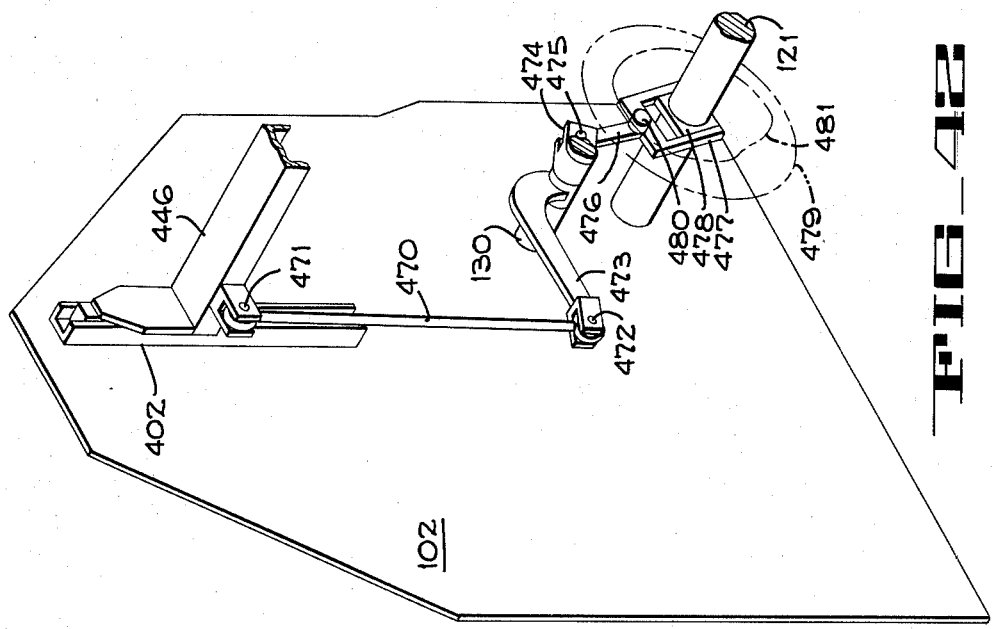
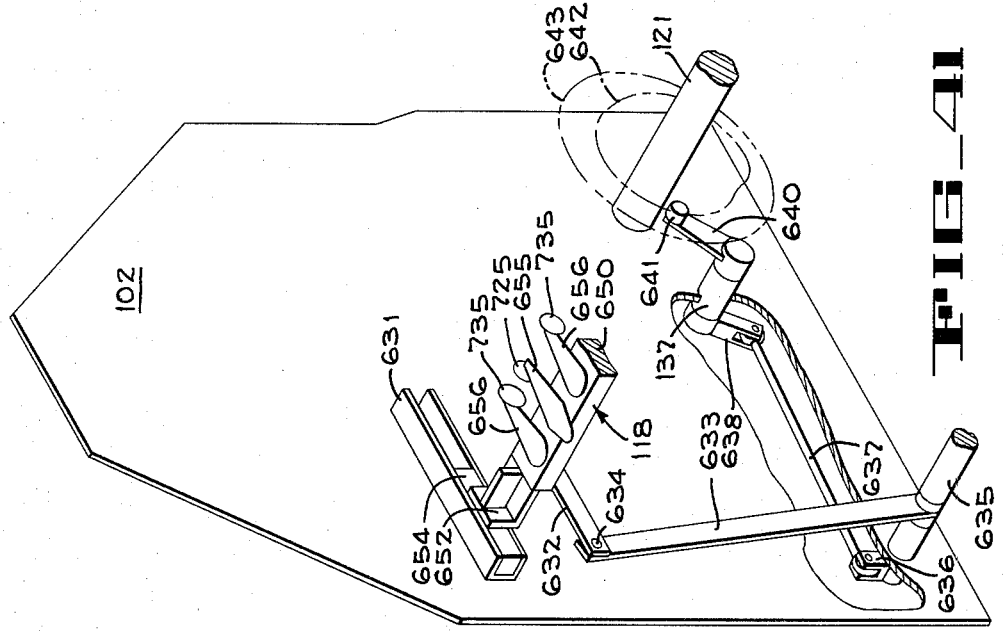

Oct. 12, 1965   S. H. CREED   3,211,201
PEAR STEM END TRIMMING, STEMMING, PEELING, CORING, AND
SPLITTING MACHINE
Filed May 31, 1962   32 Sheets-Sheet 26
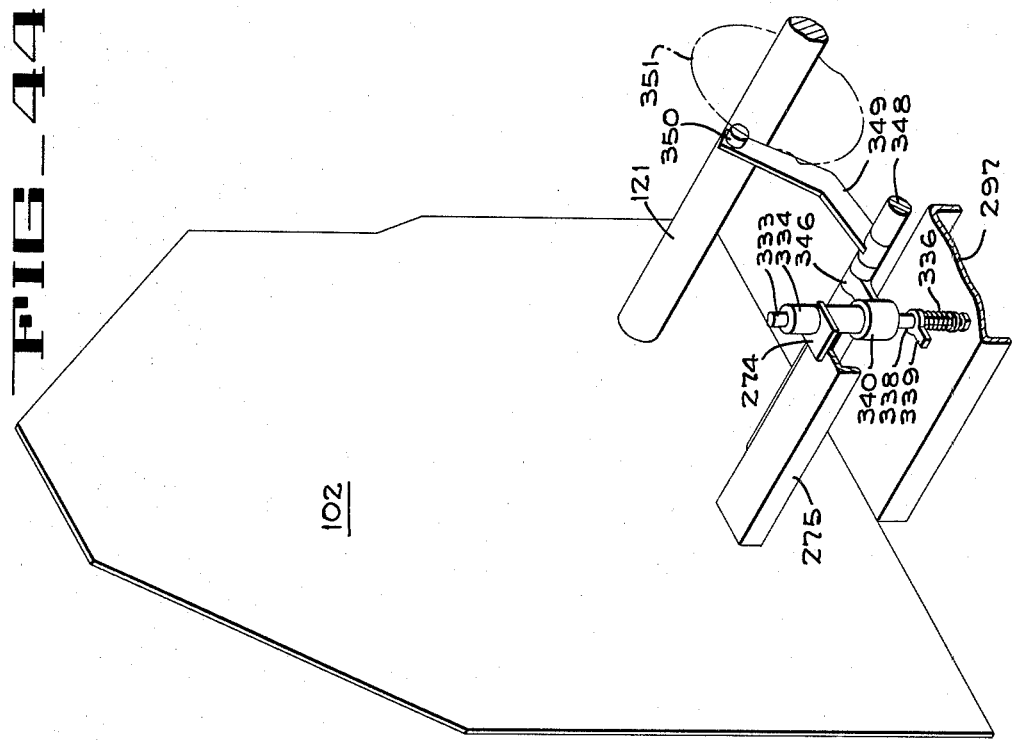
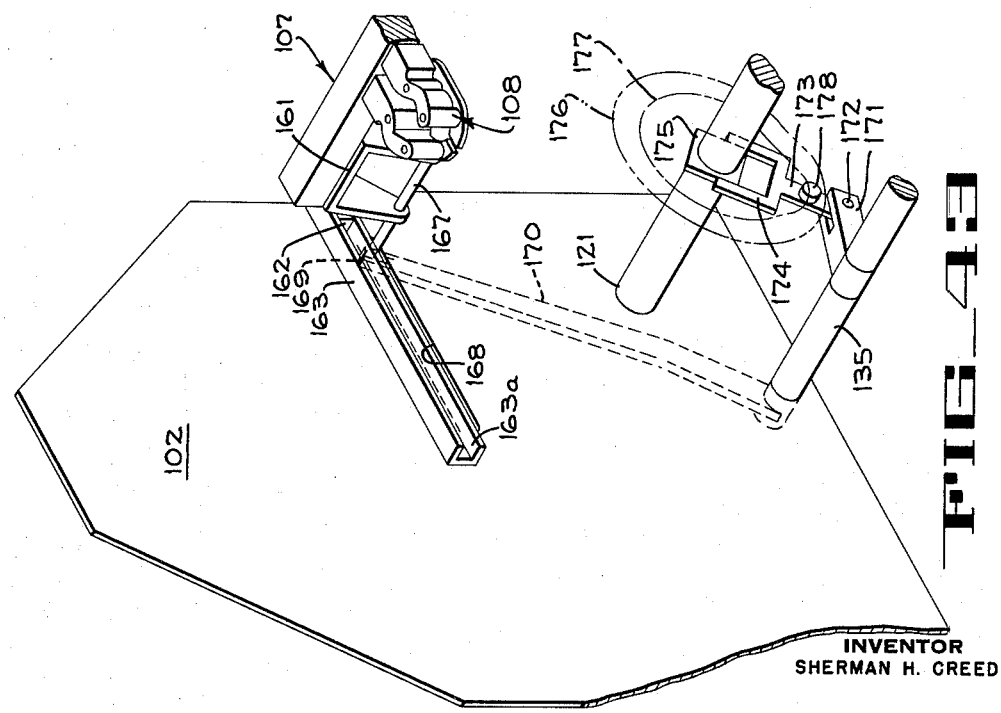
INVENTOR
SHERMAN H. CREED
BY *Hans G. Hoffmeister*
ATTORNEY

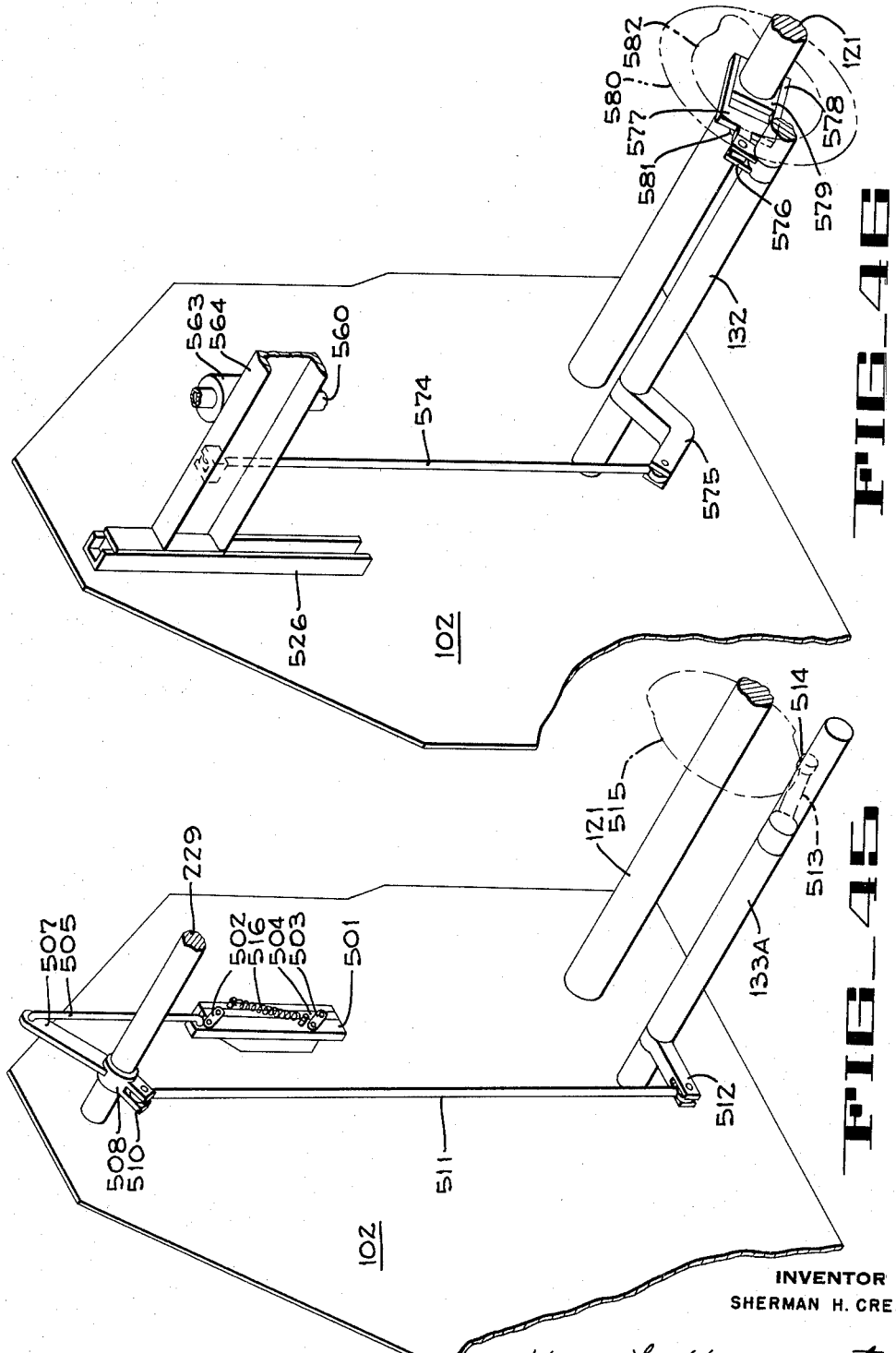

Oct. 12, 1965  S. H. CREED  3,211,201
PEAR STEM END TRIMMING, STEMMING, PEELING, CORING, AND
SPLITTING MACHINE
Filed May 31, 1962  32 Sheets-Sheet 28
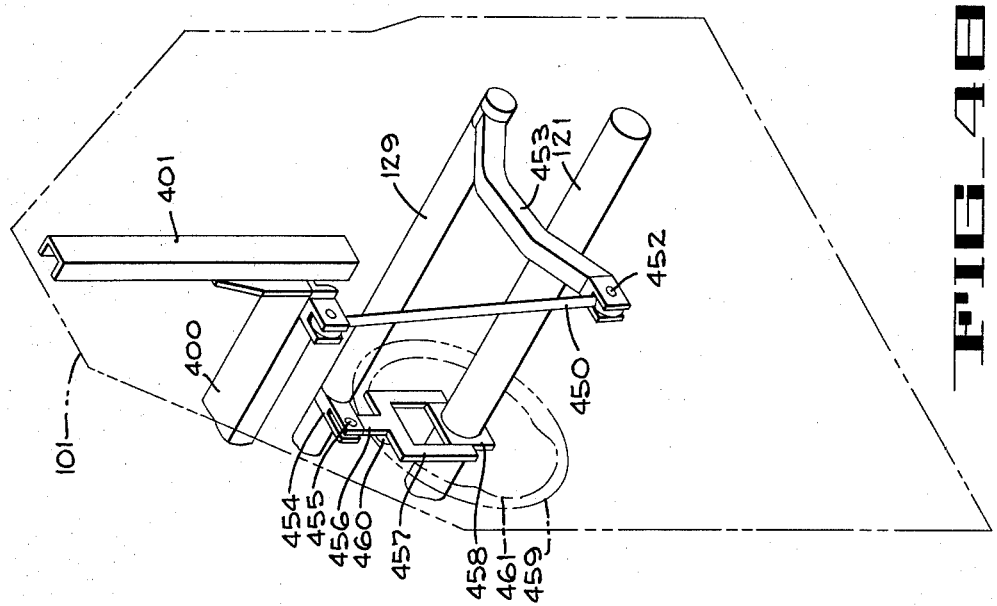
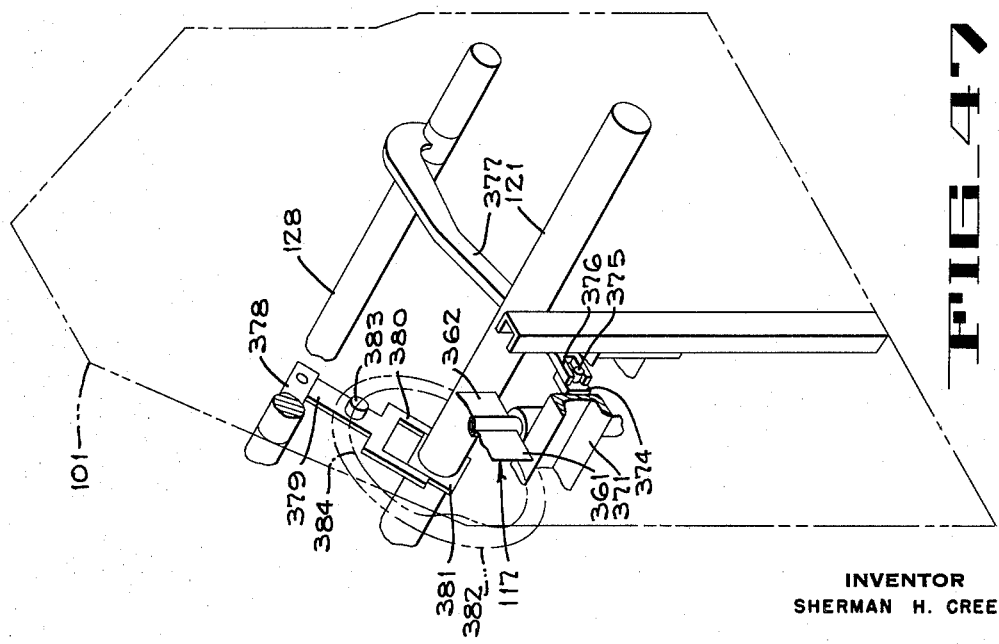
INVENTOR
SHERMAN H. CREED
BY Hans G. Hoffmeister
ATTORNEY

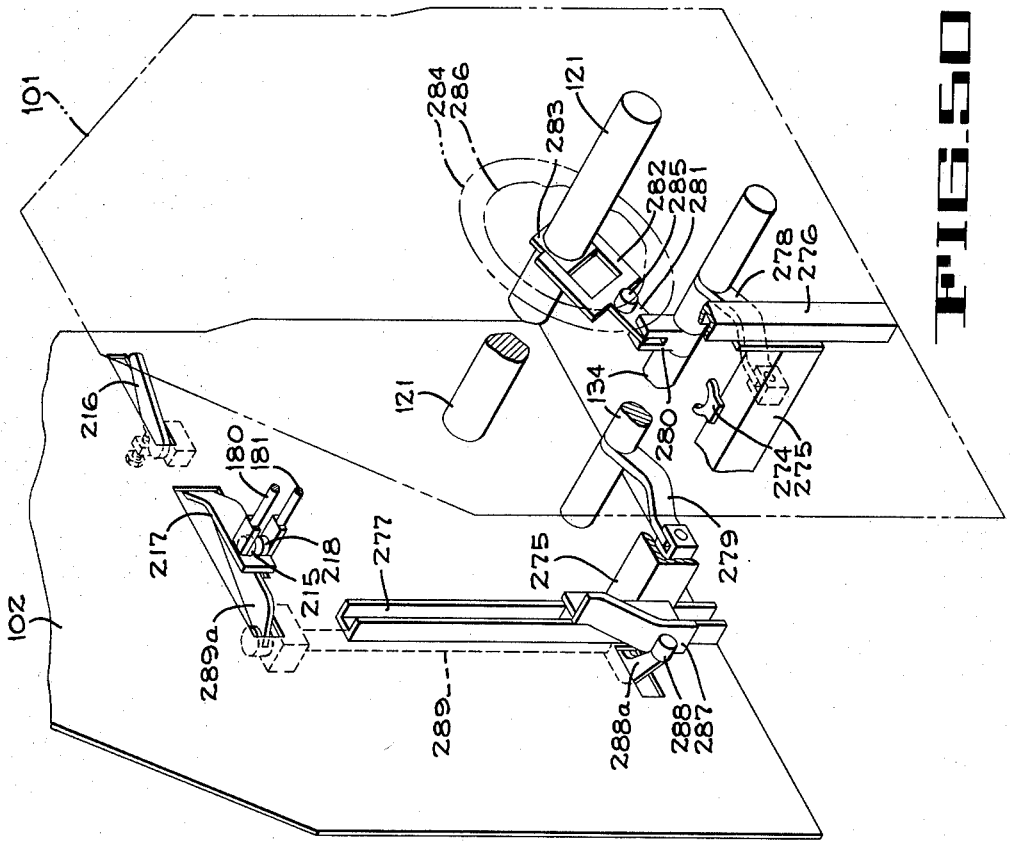
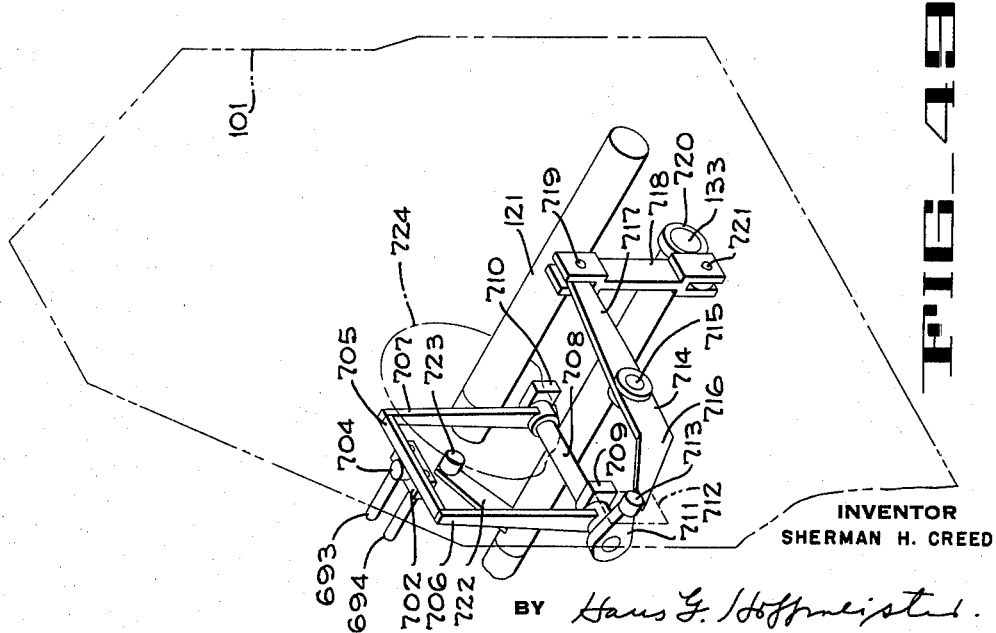

Oct. 12, 1965 S. H. CREED 3,211,201
PEAR STEM END TRIMMING, STEMMING, PEELING, CORING, AND
SPLITTING MACHINE
Filed May 31, 1962 32 Sheets-Sheet 30
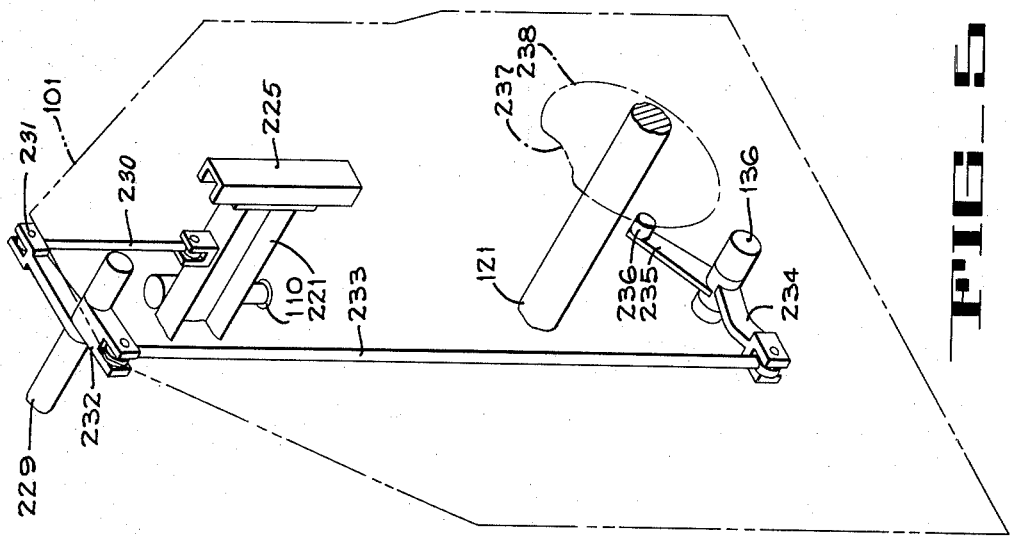
FIG_52
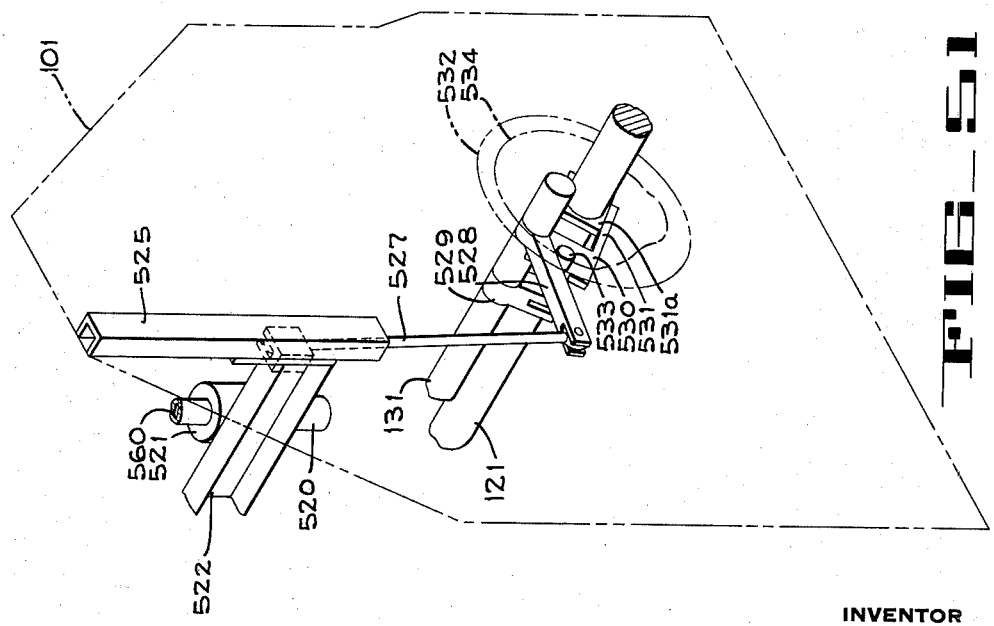
FIG_51
INVENTOR
SHERMAN H. CREED
BY Hans G. Hoffmeister.
ATTORNEY Oct. 12, 1965  S. H. CREED  3,211,201
PEAR STEM END TRIMMING, STEMMING, PEELING, CORING, AND
SPLITTING MACHINE
Filed May 31, 1962  32 Sheets-Sheet 31
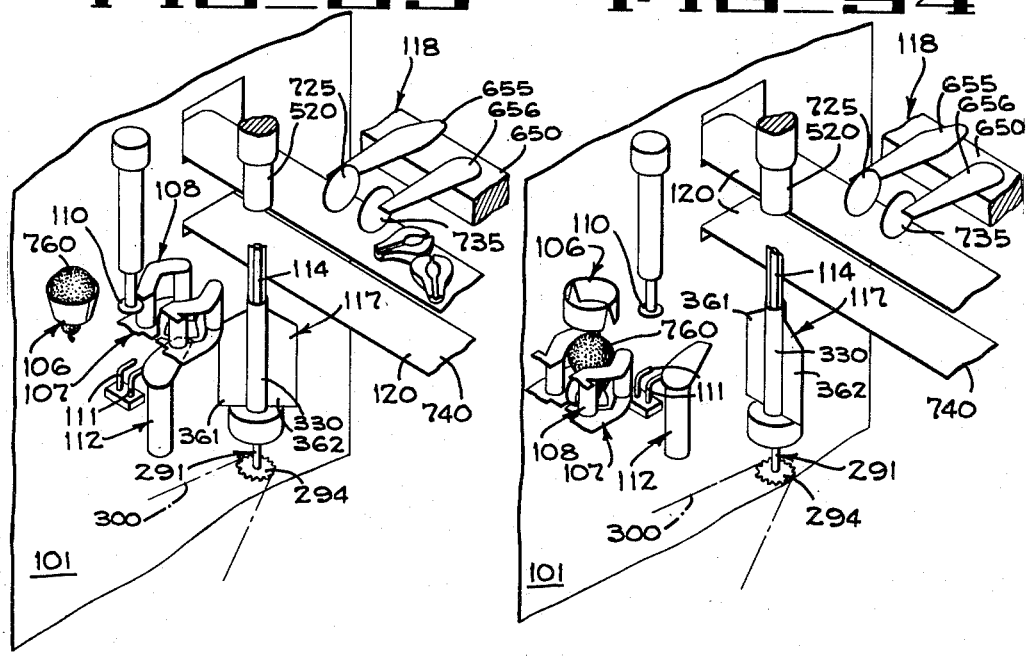
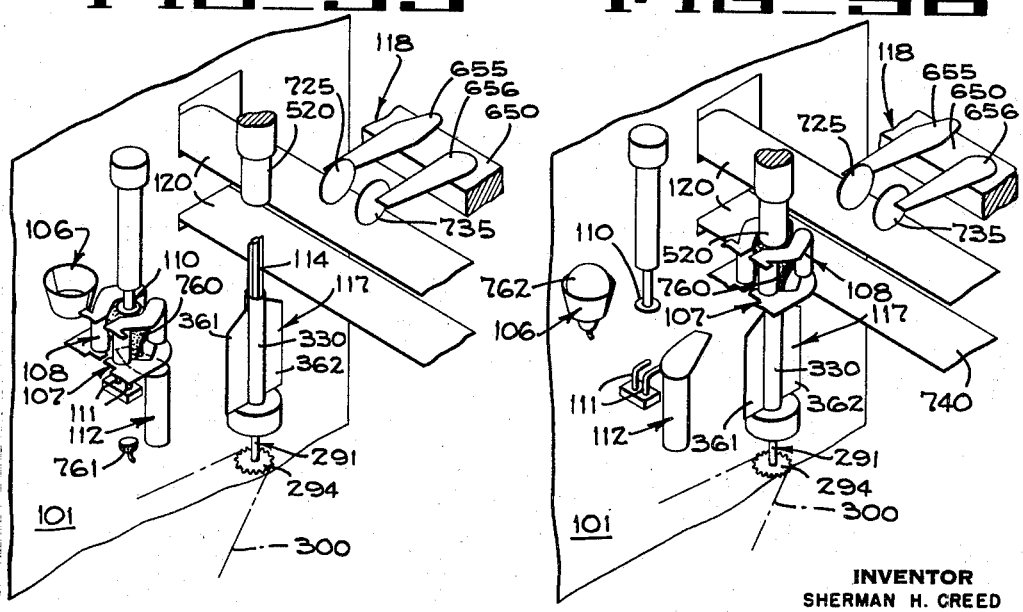
INVENTOR
SHERMAN H. CREED
BY *Hans G. Hoffmeister*
ATTORNEY

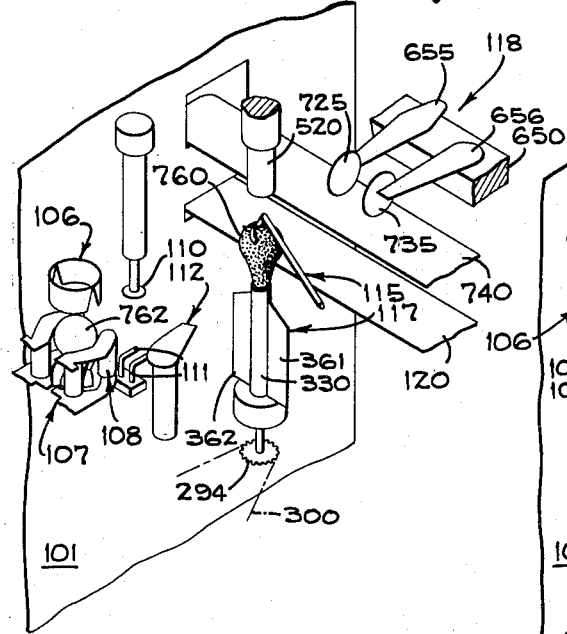
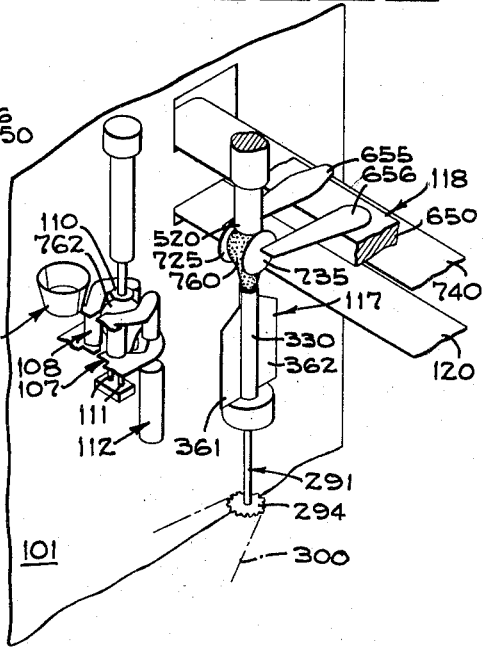
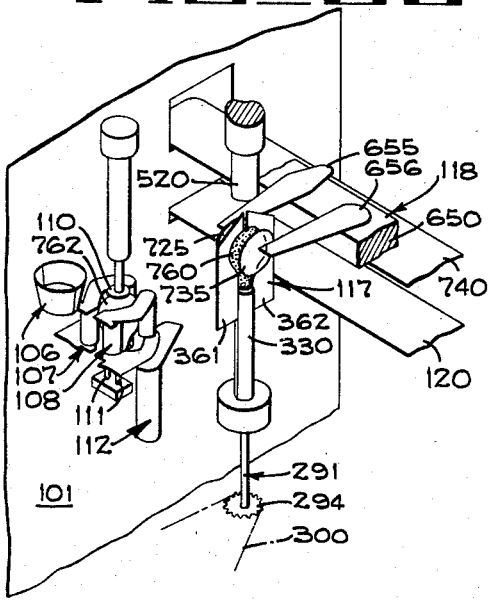
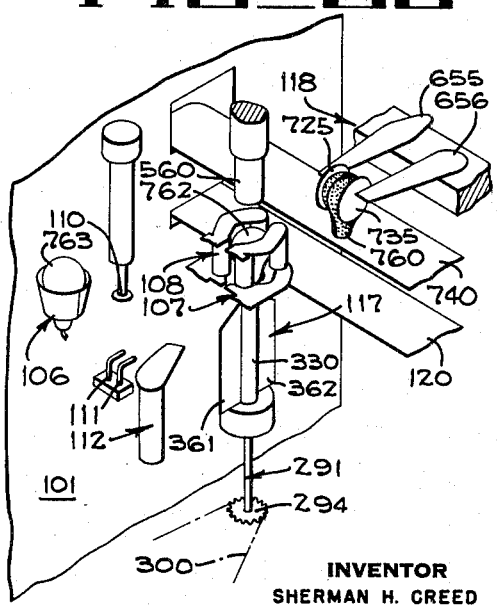
INVENTOR
SHERMAN H. CREED
BY Hans G. Hoffmeister
ATTORNEY United States Patent Office 3,211,201
Patented Oct. 12, 1965

3,211,201
PEAR STEM END TRIMMING, STEMMING, PEELING, CORING AND SPLITTING MACHINE
Sherman H. Creed, San Jose, Calif., assignor to FMC Corporation, San Jose, Calif., a corporation of Delaware
Filed May 31, 1962, Ser. No. 198,990
24 Claims. (Cl. 146—33)

This invention relates to fruit preparation machines, and more particularly to a machine for preparing fruit, such as pears, for canning or drying.

One object of the invention is to provide an improved high speed fruit preparation machine.

Another object of the invention is to provide a machine wherein the fruit is fed into the machine in several lines, and the same operations of stem end trimming, peeling, coring, and splitting are each simultaneously performed on the individual pieces of fruit.

Another object of the invention is to provide a machine wherein the fruit passes through the machine with its stem-blossom axis vertical, and wherein the fruit is carried from a feeding station to a stem end trimming station and subsequently to a peeling, coring and splitting station by a movable transfer cup.

Another object of the invention is to provide a machine wherein the fruit is fed into a feed cup with its blossom end uppermost and is fed downwardly therefrom by gravity into a transfer cup which aligns the stem-blossom axis vertically and carries the fruit to a stem end trimming station, and subsequently to an impaling station whereat an impaling tube axially impales the fruit and a peeling mechanism peels the fruit while it is impaled on the impaling tube.

Another object of the invention is to provide a machine wherein the impaling tubes are intermittently rotated about their axes, the rotation occurring only during the peeling operation.

Another object of the invention is to provide a machine having a novel peeling mechanism wherein a peeling knife is arranged to follow the surface contour of a rotating fruit and then be locked away from the fruit to permit subsequent coring and splitting of the fruit at the same station.

Another object of the invention is to provide a novel coring knife assembly wherein a continuously rotating semicircular knife is inserted into the fruit from the blossom end while in an inclined condition to cut a relatively small diameter annular bore and subsequently is pivoted to its straight position to make a spherical cut at the core of the fruit.

Other objects and advantages of the instant invention will become apparent in the reading of the following detailed description in conjunction with the accompanying drawings, wherein:

FIG. 1 is a perspective view looking at the front or feeding side of the machine from the left side thereof.

FIG. 2 is a perspective view looking at the feeding side of the machine from the right side thereof.

FIG. 3 is a perspective view of the rear or discharge side of the machine.

FIGS. 4 and 5 together form an enlarged plan view of the machine.

FIG. 6 is an enlarged sectional view taken generally on line 6—6 of FIG. 5.

FIG. 6A is a perspective view of the two cooperating shells of a feed cup.

FIGS. 7, 8 and 9 together form the upper, middle and lower portions, respectively, of an enlarged sectional view taken generally on line 7—7 of FIG. 5.

FIGS. 10 and 11 together form a reduced horizontal sectional view taken on line 10—10 of FIG. 8 and illustrate the drive assembly for rotating the impaling tubes.

FIGS. 12, 13 and 14 show three positions of the Geneva drive mechanism in the drive assembly for rotating the impaling tubes.

FIG. 15 is a schematic view showing all of the machine drives.

FIG. 16 is a perspective view of one of the transfer cups looking from front to rear thereof.

FIG. 17 is a perspective view of one of the transfer cup assemblies looking from the rear toward the front, one side of the cup being broken away to show the fruit aligning members therebeneath.

FIG. 18 is a fragmentary sectional view showing a portion of the transfer cup carriage and illustrating the cams for opening and closing the transfer cups.

FIG. 19 is a fragmentary perspective view illustrating one of the pear seating members, one pair of the vertical gauge bars, and one of the stem end trimming knives.

FIG. 20 illustrates the actuating mechanism for the stem end trimming knives.

FIG. 21 is a sectional view of one of the impaling tubes, nose stop and splitting blade assemblies.

FIG. 22 is a continuation of FIG. 21 and shows the lower portion of said assembly.

FIG. 23 is a side elevation of the lower portion of the assembly shown in FIG. 22 taken generally on line 23—23 of FIG. 22.

FIGS. 24 and 25 together form a perspective view of the upper and lower portions, respectively, of the assembly shown in FIGS. 21, 22 and 23.

FIG. 26 is a sectional view of one of the coring mechanisms.

FIGS. 27, 28 and 29 are views of one of the coring mechanisms showing its position at three different points during the cycle of its operation.

FIG. 30 is a fragmentary perspective view illustrating the mechanism for swinging the coring knives.

FIG. 31 is a fragmentary perspective view of the peeling knife assembly shown at the beginning of a cycle of its operation.

FIG. 32 is a similar view to that shown in FIG. 31, but showing the peeling knife assembly in an intermediate point during its operation.

FIGS. 33 and 34 illustrate the mechanism for moving the peeling knives away from the pears on the return stroke of the knife carriage. FIG. 33 shows the mechanism in its normal position during peeling, and FIG. 34 shows the mechanism in its position during the return stroke of the knife carriage.

FIGS. 35 and 36 show a side elevation and a perspective view, respectively, of one of the peeling knives.

FIG. 37 is a fragmentary perspective view of the clamp carriage.

FIG. 38 is a sectional view taken on line 38—38 of FIG. 37.

FIG. 39 is an exploded perspective view illustrating the details of one of the clamp locks.

FIG. 40 is a horizontal sectional view of one of the clamp lock assemblies, the plane of the section being taken immediately below the lock actuating plate.

FIG. 41 is a schematic perspective view of the actuating mechanism for the clamp slide assembly.

FIG. 42 is a schematic perspective view of the actuating mechanism for the upper peeling knife carriage.

FIG. 43 is a schematic perspective view of the actuating mechanism for the transfer cup carriage.

FIG. 44 is a schematic perspective view of the actuating mechanism for the nose stop lock.

FIG. 45 is a schematic perspective view of the actuating mechanism for retracting the peeling knives during the return stroke of the peeling knife carriage.

FIG. 46 is a schematic perspective view of the actuating mechanism for the coring knife carriage.

FIG. 47 is a schematic perspective view of the actuating mechanism for the splitting blades.

FIG. 48 is a schematic perspective view of the actuating mechanism for the lower peeling knife carriage.

FIG. 49 is a schematic perspective view of the actuating mechanism for the clamps on the clamp carriage.

FIG. 50 is a schematic perspective view of the actuating mechanism for the transfer cups.

FIG. 51 is a schematic perspective view of the actuating mechanism for the butt stops.

FIG. 52 is a schematic perspective view of the actuating mechanism for the pear presser mechanism.

FIGS. 53 to 60, inclusive, are a series of operational schematic perspective views illustrating the passage of a single pear through the machine.

Referring now to the drawings wherein similar reference numerals are used to denote the same elements throughout the various views shown, the device comprises a rectangular base 100 (FIGS. 1, 2 and 3) having two upstanding side plates 101 and 102 fixed thereto. The upper portions of the side plates 101 and 102 are tied together by a bracing rod 103, the mid-portion of the front edges of the plates by a bracing rod 104 (FIG. 1), and the mid-portion of the rear edges of the plates by the bracing rod 105 (FIG. 3).

For purposes of convenience in description, the side of the machine wherein the pears are introduced will hereinafter be referred to as the front of the machine, the opposite side accordingly will be referred to as the rear of the machine and the right and left sides, respectively, will be designated from the point of view of a person standing in front of the machine and looking toward the rear.

Referring now to FIGS. 1, 6 and 7, the machine generally comprises a plurality of feed cups 106 which are mounted in a line adjacent the front of the machine and are arranged to receive pears stem-end-down from the operator of the machine. In the particular machine shown, there are six of these cups at points equally spaced transveresly of the machine. A transfer cup carriage 107 carries a plurality of transfer cups 108 each of which is disposed immediately below a feed cup to receive a pear from the cup. The carriage is arranged to move rearwardly in the machine to carry pears in the transfer cups 108 to a stem end trimming station, generally indicated at 109 in FIG. 8, at which each pear is seated downwardly by the presser member 110 against a gauge stop 111. While the stem end of the pear is held against the gauge 111, the stem end is trimmed by the knife of a stem end trimming unit 112. From the stem end trimming station 109, each pear is further carried rearwardly in the machine by the transfer cup 108 to a station, generally indicated at 113 (FIG. 7), at which the pear is impaled on an impaling tube 114, peeled by a peeling knife assembly 115, cored by a coring unit 116 and cut into halves by a splitting blade assembly 117.

After the pears are impaled by the impaling tubes 114, the pears are released from the transfer cups 108 and the carriage 107 is returned to the front of the machine to receive a new group of pears. Prior to the coring operation, a clamp carriage 118, located adjacent the rear of the machine, is moved forward and the clamps thereon grip the pears and hold them during the coring and splitting operations. The impaled tubes 114 are withdrawn as the coring knives enter the pears. After the coring and splitting operations are finished, the clamp carriage 118 moves rearwardly with the split pears. When the clamp carriage reaches its rearmost position, the clamps are opened to permit the pear halves to drop onto a discharge conveyor 120 (FIG. 8).

The various operating units are actuated in timed relation with each other by a plurality of cams mounted on a cam shaft 121 (FIGS. 1 and 2), which extends transversely of the machine adjacent the front thereof and is rotatably supported between the side plates 101 and 102. The cam shaft 121 is rotated by motor 122 (FIG. 3) mounted within the base 100 of the machine and connected to a jack shaft 123 by a chain drive 124 (FIG. 9). The outer end of the jack shaft 123 projects outwardly of the machine through the right side of the base 100 and is provided with a sprocket 125 (FIG. 3). The sprocket 125 is connected by a drive chain 127 to a sprocket 126 fixed to the right end of the cam shaft 121. As best seen in FIG. 8, a plurality of cam follower mounting shafts 128, 129, 130, 131, 132, 133, 134 and 135 extend parallel to the cam shaft 121 and are rotatably mounted in the side plates 101 and 102 at points circumferentially spaced about the cam shaft 121. The shaft 133 extends from the side plate 101 only to a center plate 138, and a second shaft 133A coaxial therewith extends from the plate 138 to the side plate 102. Each of the shafts 133A and 128 to 135, inclusive, carries a cam follower arm for cooperation with one of the cams on the cam shaft in a manner more fully described hereinbelow. A short cam follower shaft 136 is rotatably mounted in the left side plate 101 only and carries a cam follower which cooperates with the cam on the cam shaft nearest the side plate 101. A second short shaft 137 (FIG. 41) is rotatably mounted in the right side plate 102 coaxial with the shaft 136 and carries a cam follower which cooperates with the cam nearest the side plate 102.

FEED CUP ASSEMBLY

Each feed cup 106 (FIG. 6A) comprises two generally semi-cylindrical shells 106A and 106B which are set-screwed to rods 140 (FIG. 7) and 141 respectively. The rods extend parallel to each other in a horizontal plane transversely of the machine and each rod is journalled for rotation at its opposite ends in the side plates 101 and 102. In FIG. 7, the feed cup shells 106A and 106B are shown in their open position which is adapted for dropping a pear into a transfer cup 108 therebeneath. As best seen in FIG. 6, the rod 140 is urged clockwise, as viewed therein, by a tension spring 144 fixed at one of its ends to the right side plate 102 and at its other end to a link 146 fixed to the rod 140. The link 146 is bifurcated at its outer end and embraces a block 147 that is rotatable on a pin 148 fixed to a link 149 which is fixedly mounted on the rod 141. With this arrangement, when the shaft 140 is rotated clockwise by the spring 144, the rod 141 will be rotated counterclockwise to move the feed cups to their closed position. A feed cup actuating solenoid 150 is mounted on the side plate 102 and has a plunger 150a pivotally connected to the outer end of a link 151 fixed to the rod 141. The solenoid 150 is energized through a micro switch 152 mounted on the side plate 102 adjacent the path of movement of the transfer cup carriage 107 and is arranged to be actuated by a cam 153 mounted on the carriage when the transfer cups 108 are in vertical alignment with the feed cups. When energized, the solenoid 150 rotates the rod 141 clockwise and the rod 140 counterclockwise to open the cups 106. The spring 144 moves the cups to their closed position when the solenoid 150 is deenergized.

TRANSFER CUP ASSEMBLY

Referring now to FIGS. 1 and 2, the transfer cup carriage 107 comprises an elongated bar-like carrier 160 which has an inverted U-shaped bracket 161 fixed to the bottom of the member 160 adjacent the right end thereof. A block 162 is fixed to the outer leg of the bracket 161 and is slidably received within a horizontal track 163a (FIG. 43) provided by a channel 163 fixed to the inner surface of the side plate 102. A similar inverted U-shaped bracket 164 (FIGS. 1 and 2) is fixed to the bottom surface of the member 160 adjacent the left end thereof and a similar block 165 on the bracket 164 is slidably received within a horizontal track provided by a channel 166 fixed to the inner surface of the side plate 101. The horizontal tracks extend from the front to the rear of the side plates 101, 102 and thus the carriage 107 is mounted for reciprocatory movement forwardly and rearwardly of the machine.

As best seen in FIGS. 2 and 43, a short rod 167, which is fixed to the bracket 161, projects through a suitable slot 168 formed in the side plate 102 and is received within the bifurcated end 169 of an actuating arm 170 that is fixed to the actuating cam follower shaft 135. Similar mechanism connects the opposite end of the carriage 107 to the opposite end of the shaft 135 as seen in FIG. 1. A cam follower arm 171 (FIG. 43) is mounted at one of its ends on the shaft 135. The other end of the arm 171 is pivotally attached by a pin 172 to a cam follower link 173 which has a bifurcated end 174 in sliding engagement with a square block 175 rotatably mounted on the cam shaft 121 adjacent a transfer cup carriage actuating cam 176 keyed to the cam shaft 121. A cam groove, indicated by the dot-dash center line 177, is formed in the side surface of the cam 176 and receives a cam follower roller 178 rotatably mounted on the link 173 intermediate its ends.

TRANSFER CUPS

The transfer cups 108 are carried by two rods 180 and 181 (FIGS. 16 and 17) which are slidably mounted adjacent the rear face of the elongated carrier 160 by a plurality of brackets 182 fixed to said carrier and extending rearwardly therefrom. The rods 180 and 181 lie in the same vertical plane and slidably carry a plurality of pairs of arms 183 and 184, each pair of arms forming one of the transfer cups 108. Each arm 183 has a recess 183a (FIG. 16) in its forward end. A horizontally extending, upwardly facing rack member 185 is secured in the recess 183a and is disposed adjacent the rear face of the carrier 160 (FIG. 17). Similarly, each arm 184 has a recess 184a in which a horizontally extending, downwardly facing rack member 186 is secured in opposed relation to the rack 185. A spur gear 187 is in mesh with each of the racks 185 and 186 and is rotatably mounted on a stud 188 (FIG. 16) which projects through and is fixed to the carrier 160 whereby when one of the arms 183 or 184 is moved in one direction, its opposing arm will automatically be moved in the opposite direction. A spring 189 is fixed at one of its ends to a pin 190 on the arm 184 and at its other end to the carrier 160 in order to urge the arm 184 toward its associated arm 183. A collar 191 is adjustably fixed to the rod 180 by means of a set screw 192 and abuts the inner side of the arm 184 to limit its movement toward the associated arm 183. The rods 180 and 181 are adapted to be moved toward the left side of the machine, to the left as viewed in FIG. 16, and to the right as viewed in FIG. 17, in order to move the arms 183 and 184 away from each other in a manner described hereinbelow.

The arms 183 and 184 of each transfer cup 108 carry fruit-centering members. The arm 184 has a V-shaped notch 195 on each side of which a pair of rollers 193 and 194 are mounted for rotation about a vertical axis. Similarly, a pair of rollers 196 and 197 are rotatably mounted adjacent the inner surface of the arm 183 with a V-shaped notch 198 formed in said surface therebetween, whereby the arms 183 and 184 are moved toward each other, the rollers 193, 194, 196 and 197 will contact the butt end of a pear therebetween to aid in vertically aligning the pear.

The lower end of each transfer cup 108 is formed by a pair of pear supporting and aligning arms 200 and 201 which have split ends 200a and 201a respectively, which are adjustably secured to a pair of pivot pins 202 and 203, respectively, that project downwardly from the carrier 160. The arms 200 and 201 extend rearwardly from the carrier 160 to a position beneath the arms 183 and 184 to form the lower end of the transfer cup 108. The arm 200, adjacent its inner end, is provided with a downwardly and endwardly tapered conical surface 206, and the arm 201 is provided with a similar downwardly and inwardly tapered conical surface 207 in opposed relation thereto. The surfaces 206 and 207 are adapted to receive the stem end of the pear as it is dropped into the transfer cup 108, and the generally conical opening formed by the arms provides a pivot surface which cooperates with the rollers 193, 194, 196 and 197 in vertically aligning the pear.

The pear support arms 200 and 201 are moved from each other by means of the rod 181 which has a collar 208 (FIG. 17) fixed thereon by means of a set screw 209. The collar 208 is provided with a downwardly extending lug 210 abutting the inner edge of the arm 201. A pair of meshing spur gears 211 and 212 (FIG. 16) are respectively mounted on the pivot pins 202 and 203 of the carrier 160 and are respectively fixed to the arms 200 and 201, whereby when the arm 201 is urged to the right as viewed in FIG. 17 by the lug 210, the meshing spur gears cooperate to move the arm 200 in the opposite direction to move the inclined surfaces 206 and 207 away from each other a distance sufficient to permit the transfer cup 108 to be retracted from a pear. A return spring 213 is attached at one of its ends to a pin 214 extending downwardly from the arm 201 and at its other end to the carrier 160 and is arranged to move the arms 200 and 201 to closed position.

As best seen in FIG. 18, the rod 180 is provided adjacent its right end with a cam follower roller 215 mounted for rotation about a vertical axis and adapted to contact the cam surface of a cam 216 fixed to the side plate 102 to open the transfer cups 108 when the carriage 107 is in its forwardmost position in the manner illustrated in FIG. 18. After a pear is received in the transfer cup, the cup is moved rearwardly causing the follower roller 215 to move out of contact with cam 216 to permit the transfer cup arms to engage the butt end of the pear and pivot it to upright position. A second cam 217 is adapted to contact both the follower 215 and a similar roller 218 (FIG. 50) on the rod 181 to actuate both of the rods 180 and 181 to open both the transfer cup arms 183 and 184 and the arms 200 and 201 therebeneath when the carriage is in its rearmost position in a manner hereinafter described.

PEAR SEATING AND STEM END TRIMMING MECHANISM

After being deposited in a transfer cup 108 and moved to a generally vertical position, the pear is carried by the transfer cup to a stem end trimming station 109 (FIG. 19). At this station, the presser member 110 is moved downwardly against the butt end of the pear to center the pear on the inclined surfaces of the yieldable arms 200 and 201 and to move the stem end of the pear downwardly against two gauge stops 111, which are described more fully hereinafter. The nose of the pear forces the conical surfaces 206 and 207 on the arms 200 and 201 outwardly against the action of the spring 213, thus aligning the nose of the pear while the rollers 193, 194, 196 and 197 on the inwardly urged arms 183 and 184, respectively, align the butt end of the pear so that the pear axis is vertical.

The presser member 110 is slidably mounted within a tube 220 fixed to a vertically movable channel member 221. The presser member 110 is normally urged downwardly relative to the tube 220 by a compression spring 222 within the tube 220. The downward motion of the presser member 110 relative to the tube 220 is limited by a set screw 223 threaded into the tube 220 and extending into a suitable slot 224 formed in the portion of the presser member 110 within the tube 220. In the lowest position of presser member 110, the set screw 223 abuts the wall at the upper end of the slot 224.

The channel member 221 is mounted for vertical reciprocation in a guide 225 (FIG. 2) mounted on the inner surface of the side plate 101 and in a guide 226 (FIG. 1) mounted on the inner surface of side plate 102. As shown in FIG. 6, a link 227 connects one end of the angle member 221 with one end of a lever arm 228, the other end of which is secured to a shaft 229 rotatably mounted by the side plates 101 and 102 adjacent the upper end of the machine. A second link 230 (FIG. 7) connects the other end of the channel member 221 to one end of a second lever arm 231, the other end of which is fixed to the shaft 229.

Referring to FIG. 52, an arm 232 is fixed to one end of the shaft 229 and extends forwardly therefrom. The outer end of the arm 232 is connected by a link 233 to the outer end of an arm 234 secured to the cam follower mounting shaft 136 previously described. A similar linkage connects the other end of the shaft 229 with the shaft 136. A cam follower arm 235 is fixed to the cam follower mounting shaft 136 and rotatably supports, on its outer end, a cam follower roller 236 which contacts the outer cam surface 237 of a plate cam 238 fixed to the cam shaft 121.

It may be seen from the foregoing description that when the channel member 221 is lowered by means of the actuating mechanism just described, the presser member 110 will contact the blossom end of the pear within the transfer cup 108, and that the channel member 221 and the tubes 220 attached thereto are permitted to overtravel by means of the telescopic connection between the presser members 110 and the tubes 220 to thereby accommodate pears of different sizes.

When the pear is pressed downwardly by the presser member 110, the stem end thereof contacts the pair of gauge stop members 111 which are in the form of bent rods fixed by setscrews 241 to a block 242 which, in turn, is bolted to a rigid angle member 240 that extends transversely of the machine and is fixed to the side plates 101 and 102.

STEM END TRIMMING KNIVES

A stem end trimming unit 112 (FIG. 19) is associated with each set of gauge members 111. Each unit 112 comprises a knife blade 244 extending in a horizontal plane and having a cutting edge 245. The blade 244 is secured to a support arm or bracket 246 which is fixed to the upper end of a vertically extending pivot shaft 247 rotatably mounted in a tube 248 fixed to the forward face of an angle member 243 which extends transversely of the machine rearwardly of and parallel to the angle member 240, and is fixed to the side plates 101 and 102. The lower end of the shaft 247 is provided with an arm 249 adjustably clamped thereto by a bolt 250. The outer end of the arm 249 is pivotally secured to an actuating rod 251 by a bolt 252. The actuating rod 251 is provided with a forwardly extending block 253 pivotally mounted on a shaft 254 fixed to the rod 251. The block 253 is received within the bifurcated end 255 of an operating lever 256 pivotally mounted intermediate its ends on a pivot pin 257 (FIG. 20) mounted in a bifurcated bracket 258 secured to the vertically extending plate 138 (FIG. 8) which, in turn, is fixed to the base 100. The lower end of the actuating lever 256 (FIG. 20) is provided with a roller 260 mounted for rotation on a pin projecting from the lever 256. The roller 260 is adapted to be contacted by an actuating cam 261 mounted on one face of a mutilated drive pinion 262 fixed to the cam shaft 121. The mutilated drive pinion 262 is one portion of a Geneva drive assembly 263 more fully described hereinbelow.

From the description of the foregoing mechanism, it may be seen that when the cam 261 contacts the roller 260, the actuating lever 256 will be rocked clockwise (FIG. 20) about the pivot pin 257 to move the actuating rod 251 toward the right, as viewed in FIG. 19. Movement of rod 251 causes rotation of each of the knife blades 244 counterclockwise to cut off the stem end of the pears which are being held against the gauge members 111 by the presser members 110.

After the stem end trimming and pear aligning operations, the presser members 110 are raised, the knife blades 244 are retracted to the position illustrated in FIG. 19, and the transfer cup carriage 107 is further advanced toward the rear of the machine to move the pears into alignment with the impaling tubes 114.

IMPALING TUBES

As shown in FIGS. 21 and 22, each of the impaling tubes 114 is mounted for rotation within, and for longitudinal movement with respect to, a tubular mounting bracket 270 fixed to a transversely extending channel member 271 which in turn is fixed to the side plates 101 and 102. A collar 272 (FIG. 22) is fixed to the lower end of the impaling tube 114 and is provided on its outer surface with an annular groove 273. The impaling tube is raised and lowered relative to the tubular bracket 270 by means of a yoke member 274, the bifurcated end of which is received within the groove 273 and the other end of which is fixed to an actuating carriage member 275 extending transversely of the machine and mounted for vertical reciprocatory movement in suitable guides 276 and 277 (FIGS. 10 and 11) fixed to the inner surfaces of the side plates 101 and 102, respectively.

As best seen in FIG. 50, the carriage member 275 is raised and lowered within its guides 276 and 277 by means of a pair of arms 278 and 279 pivotally attached one adjacent each end thereof. The arms 278 and 279 are fixed to the cam follower mounting shaft 134 previously mentioned. A cam follower mounting arm 280 is fixed at one of its ends to the shaft 134 and is pivotally secured at its other end to one end of a link 281. The opposite end of the link 281 is bifurcated, in the manner indicated at 282, and slidably embraces a block 283 rotatably mounted on the cam shaft 121 adjacent an impaling tube actuating cam 284 fixed thereto. A cam follower roller 285 is rotatably mounted on the link 281 intermediate its ends and is slidably received within a cam groove formed in the side surface of the cam 284 and indicated by the dot-dash center line 286.

Referring now to FIGS. 18 and 50, a cam 287 is fixed to the carriage member 275 adjacent the right end thereof. The cam 287 is adapted to contact a roller 288 mounted on one end of a lever arm 288a extending through a suitable opening in the side plate 102. The lever arm 288a is fixed at its other end to a vertical shaft 289 rotatably mounted in suitable bearings mounted on the outside of the side plate 102. An arm 289a is fixed to the upper end of the vertical shaft 289 and carries, on its outer end, the cam 217 (previously described), whereby as the carriage member 275 is raised by the mechanism just described to raise the impaling tubes and impale the pears, the action of the cam 287 contacting the roller 288 adjacent the upper limit of the movement of the impaling tubes will actuate the cam 217 to push the rods 180 and 181 on the transfer cup carriage 107 to the left of the machine (to the right as viewed in FIG. 50) to open both the transfer cups 108 and the aligning arms 200 and 201 to permit the transfer cup carriage 107 to return toward the front of the machine and leave the pears mounted on the impaling tubes.

ROTARY DRIVE FOR IMPALING TUBES

Each of the impaling tubes 114 has an upper bladed portion 114a and a lower tubular portion 114b which is provided adjacent its lower end with a block 290 (FIG. 22) having a bore of square cross section. A rotatable spindle 291 extends upwardly within the impaling tube portion 114b. The upper portion 291a of the spindle 291 (FIG. 21) is round and terminates adjacent the upper end of the impaling tube portion 114b when the impaling tube is in its lowermost, or retracted, position and serves as an ejection member to eject through the open upper end of the tube any pulp material which may be within the tube when it is lowered relative to the spindle 291. The lower portion 291b (FIG. 22) of the spindle 291 is of square cross sectional configuration to cooperate with the bore of the block 290 and provide a rotary driving connection between the spindle 291 and the impaling tube 114 regardless of the relative longitudinal positions of the two members. The lower end of the spindle 291 (FIGS. 22 and 25) is received in a collar 293 which is bolted to a sprocket 294 that in turn is fixed to a stub shaft 295. The stub shaft 295 is rotatably mounted in a suitable bearing sleeve 296 fixed to an inverted channel member 297 (FIG. 8) secured to the upper portion of the machine base 100 and extending transversely of the machine.

Referring now to FIGURE 15, the spindles 291 are intermittently rotated by the Geneva drive mechanism 263 mounted on the cam shaft 121 through a drive mechanism illustrated in FIGURES 10, 11 and 15. The drive mechanism comprises a chain 300 (FIGS. 10 and 15) which is in driving engagement with the sprockets 294 on each of the spindles associated with the three impaling tubes adjacent the left side of the machine, and also in driving relation with a driving sprocket 302 fixed to a shaft 302a which is journaled for rotation in suitable bearings, not shown, fixed to the inverted channel member 297. Similarly, a drive chain 303 is in driving relation with the several sprockets 294 associated with the three impaling tubes 114 adjacent the right side of the machine and also in driving relation with a drive sprocket 304 fixed to a shaft 305 journalled for rotation in suitable bearings, not shown, fixed to the inverted channel member 297.

The two shafts 302a and 305 are interconnected for rotation at the same speed by a chain 306 disposed under the member 297. The chain 306 is indicated by the dot-dash center line 306 in FIGURES 10 and 11. The shaft 302a is connected by a chain drive 307 to a large driving sprocket 308 fixed to a vertical shaft 309 journalled for rotation in suitable bearings supported by a bracket 310 (FIG. 10) fixed to the plate 138 previously described. The upper end of the shaft 309 (FIGS. 10 and 15) has fixed thereto a bevel gear 311 which is in mesh with a second bevel gear 312 fixed to a horizontally extending shaft 313 journalled for rotation in a suitable bearing 314 supported by the plate 138. A spur gear 315 (FIGS. 11 and 15) is fixed to the shaft 313 and is adapted to mesh with the teeth on the mutilated pinion 262 (FIG. 15) of the Geneva drive mechanism 263.

A locking member 316 (FIGS. 12, 13 and 14) is fixed to the spur gear 315 for rotation therewith. The locking member 316 is provided with a concave arcuate surface 317 adapted to cooperate with a convex arcuate surface 318 formed on a cam 319 fixed to the mutilated drive gear 262 to lock the shaft 313 and prevent rotation thereof when the spur ger 315 is not in mesh with the teeth on the mutilated drive gear 262. The lock member 316 is provided with two slots 320 and 321 adjacent the arcuate concave surface 317. Two arms 322 and 323 are mounted on the mutilated drive gear 262 for rotation therewith. A roller 324 is rotatably mounted on the arm 323 and is adapted to be slidably received within the slot 320 to rotate the locking member 316 into the proper position for the mating surfaces 317 and 318 to engage each other and prevent rotation of the shaft 313 when the teeth on the mutilated gear 262 disengage the teeth on the spur gear 315. Similarly, a roller 325 is rotatably mounted on the arm 322 and is adapted to be slidably received in the slot 321 to rotate the lock member 316 into proper position for the meshing engagement of the teeth on the mutilated drive gear 262 with the teeth of the spur gear 315 when the mating surfaces 317 and 318 disengage.

From the foregoing description, it will be seen that during one portion of the cycle of the cam shaft 121, the impaling tubes 114 remain stationary and that during another portion of the cycle of the cam shaft 121 the impaling tubes are rapidly rotated for purposes which will later be described. As best seen in FIG. 15, the impaling tubes 114 are provided adjacent their upper ends with laterally extending diametrically opposed fins 114a, whereby when the impaling tubes 114 are rotated, the pear impaled thereon will be rotated therewith.

NOSE STOP MECHANISM

Referring again to FIGS. 21 and 22, a tubular nose stop member 330 surrounds the upper portion of the impaling tube in telescopic relation therewith. A collar 331 is fixed to the lower end of the nose stop member 330 and is provided on its outer surface with an annular groove 332. A tubular nose stop actuating member 333 is slidably mounted in a sleeve 334 that is fixed to the frame channel member 271 adjacent the mounting sleeve 270 of the impaling tube 114. A yoke 335 is fixed to the upper end of the nose stop actuating member 333, and the forked end of the yoke 335 is received within the annular groove 332 formed in the collar 331. A compression spring 336 is disposed within the nose stop actuating member 333 and presses against a plug 337 in the upper end thereof. The opposite end of the spring 336 receives a guide stud 337a which is fixed to the frame member 297 whereby the nose stop actuating member 333 is normally urged upwardly by the spring to raise the nose stop member 330 relative to the impaling tube 114. A clamp 338 (FIGS. 22 and 23) is fixed to the lower end of the nose stop actuating member 333 below the sleeve 334. The clamp 338 is provided with a lug 339 which projects rearwardly into the path of movement of a small angle member 341 (FIG. 23) welded to the impaling tube actuating member 275 whereby when the member 275 is lowered to lower the impaling tubes, the angle member 341 will contact the lug 339 at the time the upper end of the impaling tube is even with the upper end of the nose stop 330. Further lowering movement of the member 275 will move both the impaling tube 114 and the nose stop 330 downwardly in unison.

As is best seen in FIG. 22, a locking mechanism is provided to prevent upward movement of the nose stop 330 when the lock is in its locked relation to the nose stop. The lock comprises a tubular housing 340 fixed to the lower end of the sleeve 334 and provided with an upwardly and inwardly tapering inner surface 340a. A plurality of balls 342 are mounted between the nose stop actuating member 333 and the inner surface 340a of the housing 340 and are normally urged upwardly by a plurality of springs therebeneath, said springs being retained by an annular plate 344 fixed to the lower end of the housing 340, whereby the balls 342 will wedge themselves between the inclined surfaces 340a of the housing 340 and the outer surface of the nose stop actuating member 333 to prevent upward movement thereof.

The bifurcated end 345 (FIG. 22) of a lock releasing arm 346 (FIG. 25) extends through a suitable opening 347 in the housing 340 and contacts the upper surface of the balls 342 whereby downward movement of the end 345 of the arm 346 will move the balls 342 downwardly to permit movement of the nose stop actuating member 333 relative to the housing 340. The arm 346 is clamped to an actuating shaft 348 which is rotatably mounted to the side plates 101 and 102. As best seen in FIG. 44, a cam follower arm 349 is fixed to the actuating shaft 348 and carries at its outer end a cam follower roller 350 which rests against the outer cam surface of a nose stop lock actuating cam 351 fixed to the cam shaft 121.

SPLITTING BLADE MECHANISM

The splitting blade assembly 117, best illustrated in FIGURES 21 and 25 comprises a mounting sleeve 360 slidably mounted on the outer surface of the tubular nose stop 330. Two thin flat splitting blades 361 and 362 are oppositely secured to the sleeve 360 by a plurality of bolts 363 screwed into flanges 364 formed integral with the sleeve 360. The upper ends of the splitting blades 361 and 362 are sharpened to form knife edges 365 and 366, respectively. A sleeve 367 surrounds the splitting blade mounting sleeve 360 and abuts the lower surface of a thrust washer 367a which is disposed against the underside of an annular flange 368 formed on the sleeve 360. A collar 369 is disposed on the splitting blade mounting sleeve 360 below the sleeve 367 and is fixed thereto by means of a set screw 370. The sleeve 367 is fastened to a splitting blade actuating carriage member 371 by cap screws 372 which extends through the flanges of the sleeve 367 and are screwed into threaded apertures in the carriage 371. The splitting blade actuating carriage member 371 extends transversely of the machine and is guided for vertical reciprocatory motion in the same vertical guides 276 and 277 (FIGS. 10 and 11) that guides the actuating member 275 for raising and lowering the impaling tubes.

Referring now to FIG. 47, a block 374 is fixed to the forward face of the member 371 adjacent one end thereof, and a laterally extending pin 375 is fixed to the block 374. One end 376 of an actuating arm 377 is bifurcated to embrace the pin 375 and the other end of the arm 377 is fixed to the cam follower mounting shaft 128 previously described. A similar linkage connects the other end of the carriage member 371 with the shaft 128. A cam follower arm 378 is fixed to the cam follower mounting shaft 128, and the outer end of the arm 378 is pivotally connected to one end of a link 379, the opposite end of which is bifurcated in the manner indicated at 380 and slidably embraces a block 381 rotatably mounted on the cam shaft 121 adjacent the splitting blade actuating cam 382 that is fixed thereto. A cam follower roller 383 is rotatably mounted on the link 379 intermediates its ends and is slidably received in a cam groove formed in the side surface of the cam 382 and indicated by the dot-dash center line 384. Two shock absorbers 352, only one of which is shown in FIG. 8, are mounted one adjacent the inner surface of each of the side plates 101 and 102. Each shock absorber 352 is provided with an arm 353 pivotally attached thereto. The outer ends of the arms 353 extend into the path of movement of the splitting blade actuating member 371 and are adapted to be contacted by the lower surface thereof when said member moves downwardly and to cushion the downward movement thereof.

Referring again to FIG. 21, a key 385 is secured to the inner surface of the splitting blade mounting sleeve 360 and is slidably received within a longitudinally extending groove 386 formed in the outer surface of the nose stop 330. Similarly, a key 387 is fixed to the inner surface of the nose stop member 330 and is slidably received in a longitudinally extending groove 388 formed in the outer surface of the lower portion 114b of the impaling tube 114, whereby the splitting blades 361 and 362, the nose stop 330 and the impaling tube 114 are each permitted longitudinal movement relative to the others and are keyed together for rotation as a unit. Due to the inherent characteristics of the Geneva drive mechanism which rotates the members 361, 362, 330 and 114, the members will always stop at the same orientation, wherein the plane of the splitting blades 361 and 362, and the plane of the fins 326 on the impaling tube 114, will extend in a direction forwardly and rearwardly of the machine for purposes which will become apparent in connection with other mechanisms to be presently described.

PEELING MECHANISM

The peeling mechanisms 115 (FIGS. 31–36 inclusive) each comprise a knife assembly 399 which is located adjacent an impaling tube 114. The knife assemblies 399 are mounted on a carriage 400 which is mounted for vertical reciprocatory movement in suitable guides 401 and 402 (FIGS. 4 and 5) that are fixed to the inner surfaces of the side plates 101 and 102, respectively. The mechanism for moving the carriage 400 upwardly and downwardly will be described hereinbelow. A plurality of peeling knife mounting brackets 403 (FIG. 31) are fixed to the undersurface of the member 400 and a tubular sleeve 404 is fixed to the lower end of each of the brackets 403. Since all of the individual knife assemblies 399 are identical, only one will be described in detail. Referring now to FIG. 35, a shaft 405 is rotatably received within the tubular sleeve 404 and a bracket 406 is fixed to one end thereof and extends upwardly therefrom. The bracket 406 is bifurcated at its upper end in the manner indicated at 407 and a pin 408 extends transversely between the bifurcated ends thereof and is rotatably mounted with respect thereto. A knife mounting arm 409 extends normal to the pin 408 and is provided at one of its ends with a hub 410 which embraces the pin 408 and is fixed thereto by a set screw 411. A knife assembly is fixed to the opposite end of the knife mounting arm 409.

The mounting for each knife assembly 399 comprises a cylindrical extension rod 413 fixed to the outer end of the rod 409 and slidably received within a pair of axially aligned spaced bosses 414 and 415. A block 416 is mounted on the rod 413 between the bosses 414 and 415 and is adjustably secured thereto by a set screw 417. A stop screw 418 is threadedly received in a web portion 419 which extends between the bosses 414 and 415 and the screw is adapted to abut the block 416 to limit the rotation of the knife assembly relative to the rod extension 413. The stop screw 418 has a lock nut 420 which is adapted to abut the outer surface of the web 419 to lock the screw in its adjusted position. It will be seen that the axial adjustment of the knife assembly 399 is effected by the adjustment of the block 416 on the rod extension 413, and that the knife assembly 399 is permitted limited rotational movement relative to the rod extension 413 within the limits prescribed by the setting of the stop screw 418.

An arm 421 is formed integral with and extends forwardly from the boss 415, and a barrel-shaped roller 422 is mounted for rotation on a pin 423 fixed to the forward end of the arm 421 and extending laterally therefrom with its axis normal to the axis of the knife mounting arm 409. A knife blade 424 is fixed to the arm 421 by cap screws 425 in the manner indicated in FIGURE 36. The knife 424 comprises a flat portion 426 which extends parallel to and adjacent the arm 421, and a cutting portion 427 which extends substantially at right angles to the portion 426 and is curved to substantially follow the contour of the surface of the roller 422 in parallel spaced relation with the surface thereof.

Referring now to FIGURES 31 to 34, a bell crank 430 is fixed to the forward end of the shaft 405. One end 431 of the bell crank is bifurcated and embraces the knife mounting arm 409 intermediate the ends thereof. A pin 432 extends between the outer ends of the bifurcated arm 431 outwardly of the knife mounting arm 409. One end of a tension spring 433 is hooked to the pin 432 and the other end of the spring is hooked to a pin 434 (FIG. 35) fixed to and extending outwardly from the hub 410, previously described, whereby the knife actuating arm 409 is normally urged about the axis of the pin 408 in a counter-clockwise direction as viewed in FIGURE 35.

A hub 435 is provided on the sleeve 404 and is formed integral therewith. A plate cam 436 is mounted on the hub 435 and is secured thereto by a set screw 437, whereby as the shaft 405 is rotated in a manner presently to be described, the inclination of the arm 409 relative to the shaft 405 is adjusted to permit the spring-loaded knife 424 to follow the contour of the pear being peeled. The cam 436 is so designed that the knife will be held out of engagement with the associated stemming tube 114 if no pear is in the tube.

Referring to FIGURE 35 it will be seen that each knife mounting arm 409 is keyed to a shaft 405 by a bracket 406. Accordingly, rotation of the shaft 405 will cause the spring loaded knife assembly to be moved about the axis of shaft 405 from the position of FIGURE 31 wherein the knife rests on the butt of the pear to a position in which the knife has moved around the butt end of the pear. This rotation of shaft 405 is effective to carry the knife around the butt end of the pear.

The mechanism for rotating the shaft 405 comprises a link 440 (FIGS. 31–34 inclusive) pivotally secured at one of its ends to one end of an arm 441 of the bell crank 430, and pivotally secured at its other end to an arm 442 fixed to a shaft 443 rotatably mounted in the sleeve 404 fixed to the bracket 403 adjacent to the left side of the machine. A sector gear 444 is fixed to the opposite end of the shaft 443 and is in mesh with a vertical rack 445 fixed to and extending downwardly from a carriage 446 (FIG. 7), whereby it may be seen that downward movement of the carriage 446 relative to the lower carriage member 400 will cause rotation of the shaft 405 relative to the sleeve 404 and thus rotate the peeling knife about the axis of the shaft 405 and move it around the butt end of the pear. As best seen in FIGURES 31 and 32, a lever arm 447 is fixed to the rear of the shaft 405 and is connected by a link 448 to the arm 441 of the bell crank lever 430 of the knife assembly next adjacent thereto. All of the knife assemblies are thus interconnected so that the vertical movement of the carriage 446 in the frame will rotate all of the knives in unison about the axes of their associated mounting shafts 405 whereby all the knives are simultaneously carried down around the butt end of the associated pear being peeled.

LOWER PEELING KNIFE CARRIAGE ACTUATING MECHANISM

The lower peeling carriage member 400 (FIG. 48) is pivotally connected adjacent one of its ends to the upper end of a link 450. The lower end of the link 450 is pivotally connected by a pin 452 to one end of an actuating arm 453 which is secured to the cam follower mounting shaft 129 previously described. A similar linkage connects the other end of the carriage member 400 to the shaft 129. A cam follower mounting arm 454 is fixed to the cam follower mounting shaft 129 and the outer end thereof is pivotally secured by a pin 455 to one end of a link 456. The opposite end of the link 456 is bifurcated, in the manner indicated at 457, and slidably embraces a square block 458 rotatably mounted on the cam shaft 121 adjacent the lower peeling knife carriage actuating cam 459 secured to the shaft 121. A cam follower roller 460 is rotatably mounted on the link 456 intermediate its ends, and is slidably received within a cam groove formed in the side surface of the cam 459 and indicated by the dot-dash center line 461. Thus, rotation of cam shaft 121 causes vertical reciprocating movement of the carriage 400 on which the knife assemblies are mounted. When the carriage 400 moves downwardly, the knives are carried down along the surfaces of the pears being peeled, and when the carriage 400 moves upwardly, the knives are returned to their upper position above the impaling tubes.

UPPER PEELING KNIFE CARRIAGE ACTUATING MECHANISM

The carriage 446 (FIGS. 4 and 5) is mounted for vertical reciprocatory movement in the same guides 401 and 402 that guide the lower peeling knife carriage member 400. The upper peeling knife carriage member 446 (FIG. 42) is pivotally secured near one of its ends to the upper end of a link 470 by a pivot pin 471. The lower end of the link 470 is connected by a pivot pin 472 to one end of an actuating arm 473 which is secured to the cam follower mounting shaft 130. A similar linkage connects the other end of the carriage member 446 with the other end of the shaft 130. A cam follower mounting arm 474 is mounted on the cam follower mounting shaft 130, and the outer end of said arm is connected by a pivot pin 475 to one end of a link 476. The opposite end of the link 476 is bifurcated in the manner indicated at 477 and slidably embraces a square block 478 rotatably mounted on the cam shaft 121 adjacent the upper peeling knife carriage actuating cam 479 which is fixed to the cam shaft 121. A cam follower roller 480 is rotatably mounted on the link 476 intermediate its ends and is slidably received within a cam groove formed in the side surface of the cam 479 and indicated by the dot-dash center line 481. Accordingly, rotation of cam shaft 121 causes vertical reciprocation of the carriage 446 which effects the simultaneous movement of the several cutters about the shafts 405.

PEELING KNIFE LOCK-OUT MECHANISM

A lock-out mechanism is provided to lock the peeling knives outwardly away from the surface of the pears on the impaling tubes 114 while the peeling knives are being raised relative to the pears after the peeling operation has been completed. The peeling knife lock-out mechanism comprises a lock-out cam 490 (FIG. 33) pivotally mounted adjacent the cam 436 on a pin 491 fixed thereto. When actuated, the cam 490 is rotated about the pin 491, and a cam surface 492 formed on the cam contacts and moves the arm 409 outwardly between the bifurcated ends of the arm 431 on the bell crank 430 to increase the inclination of the arm 409 relative to the pivot shaft 405 and thus move the peeling knife outwardly away from the surface of the pear. The cam 490 is actuated through a link 493 pivotally connected at one of its ends to the cam 490 as indicated at 494 and at its other end to an arm 495 in the manner indicated at 496. The opposite end of the arm 495 is secured to a shaft 497 rotatably mounted in suitable bearing bosses fixed to the upper surface of the carriage 400.

As best seen in FIGURE 6, an arm 499 is fixed to the right end of the shaft 497 and rotatably carries at its outer end a cam follower roller 500 which is in contact with an elongated cam bar 501 that is mounted for swinging movement on two parallel links 502 and 503. The links 502 and 503 are pivotally connected to a bracket 504 fixed to the inner surface of the side plate 101. The cam bar 501 is swung in an arcuate path by link 505 which is pivotally secured at one of its ends to the upper end of the cam bar 501 and has its opposite end pivotally secured to the outer end of one arm 507 of a bell crank lever 508 by a pivot pin 509. The bell crank 508 is rotatably mounted on the actuating shaft 229 previously described in connection with the actuating mechanism for the presser member 110. The other arm 510 (FIG. 45) of the bell crank 508 is pivotally attached to the upper end of a link 511, the lower end of which is pivotally connected to the outer end of an arm 512 which is secured to the cam follower mounting shaft 133A previously described. A cam follower arm 513 is fixedly secured to the cam follower mounting shaft 133A and rotatably carries at its outer end a cam follower roller 514 which contacts the outer cam surface of the peeling knife lock-out actuating cam 515 fixedly secured on the cam shaft 121. A spring 516 connected at one of its ends to the cam 501 and at its other end to the bracket 504 returns the cam 501 to its normal position.

With the above described arrangement, rotation of cam shaft 121 causes each knife mounting shaft 409 to be cammed outwardly to carry the knife assembly to a position spaced from the associated impaling tube 114 as the knife is raised upwardly at the end of a peeling operation.

BUTT STOP AND CORING MECHANISM

The butt stop and coring assembly, generally indicated 116, is best seen in FIGURES 26 to 29, and includes a tubular butt stop member 520 which is slidably received within a tubular sleeve 521 secured to a butt stop carriage member 522 by cap screws in the manner indicated at 523. At its upper end the butt stop member 520 is fixed to an annular flange 524 which overlies the upper end of the sleeve 521 and limits the downward movement of the butt stop 520 relative thereto.

Referring now to FIGURE 51, the butt stop carriage member 522 is mounted for vertical reciprocatory motion by a pair of suitable guides 525 (FIGS. 4 and 51) and 526 (FIG. 5) fixed to the inner surface of the side plates 101 and 102, respectively. One end of a link 527 is pivotally secured to one end of the butt stop carriage member 522, and the other end thereof is pivotally connected to one end of an arm 528. The other end of the arm 528 is secured to the butt stop cam follower mounting shaft 131 previously described. A similar linkage connects the opposite end of the carriage member 522 with the shaft 131. A cam follower mounting arm 529 is secured to the shaft 131 and the other end thereof is pivotally connected to one end of a link 530. The link 530 is bifurcated in the manner shown at 531 and slidably embraces a square block 531a rotatably mounted on the cam shaft 121 adjacent the butt stop actuating cam 532 fixed to the shaft 121. A cam follower roller 533 is rotatably mounted on the link 530 intermediate the ends thereof and is slideably received within a cam groove formed in the side surface of the cam 532 and indicated by the dot-dash center line 534. With this arrangement of the parts just described, rotation of the cam 532 causes vertical reciprocation of the carriage member 522 and the tubular sleeves 521 that slidably receive each butt stop member 520.

Referring again now to FIGURE 26, a weight in the form of an angle member 540 overlies the upper surfaces of the flanges 524 of all of the butt stops 520 and normally urges the butt stops 520 to their lowermost position relative to their sleeves 521. The angle member weight 540 is held in position overlying the flanges 524 by a plurality of guide rods 541 which are adjustably fixed to depend from the horizontal flange of the angle member 540 by a pair of adjusting nuts 542 threaded onto the rod 541 one above and one beneath said horizontal flange. Each rod 541 extends downwardly through suitable apertures in the flanges of the butt stop actuating member 522. A fixed frame member 543 extends transversely of the machine and is fixed at its opposite ends to the side plates 101 and 102 adjacent the path of movement of the butt stop carriage member 522. A plurality of L-shaped brackets 544 are fixed to the frame member 543 so that a horizontal flange 545 of each bracket 544 extends beneath the lower end of one of the guide rods 541 whereby when the butt stop carriage member 522 is moved downwardly, the butt stop 520 will move downwardly therewith under the influence of the weight 540 until the lower ends of the guide rods 541 strike the horizontal flanges 545 on the L-shaped members 544. When this occurs, the downward movement of the weight 540 is arrested and the downward motion of the butt stops 520 ceases while the butt stop carriage member 522 is permitted a slight overtravel because it is free to slide down on the guide rods 541. In this manner, the butt ends of the pears are always indexed at the same height regardless of the size of the pear.

The weight 540 is adapted to be latched in its lowermost position, to prevent upward movement thereof when the impaling tubes 114 are projected upwardly to enter the pears from their downwardly positioned stem end, by a hooked shaped latch 550 (FIG. 7) which is secured to a shaft 551 rotatably mounted in a suitable bracket 552 mounted on the upper surface of the fixed frame member 543. An arm 553 is fixed to the shaft 551 and rotatably carries a cam follower roller 554 which is engaged with a cam bar 555 that is secured to the butt stop carriage member 522. A spring 556, hooked at one of its ends to the frame member 543 and at its other end to an arm 557 fixed to the shaft 551, normally urges the latch 550 toward its latching position. When the butt stop carriage member 522 moves downwardly, the cam 555 allows the latch 550 to pivot forwardly and engage its hooked upper end with the rear edge of the weight 540, thereby locking the weight against upward movement when the pears are subsequently impaled.

The coring mechanism 116 (FIGURES 26-29, inclusive) comprises a knife supporting tube 560 rotatably supported by bearings 561 and 562 mounted in a flanged sleeve 563 that is secured to a coring knife actuating carriage member 564 by a pair of cap screws 565. The coring knife supporting tube 560 extends downwardly through the tubular butt stop member 520. A coring knife blade supporting member 566 is pivotally supported at the lower end of the coring knife supporting tube 560 by a diametrically disposed pin 567. A semicircular knife blade 569, having a sharpened leading edge and a downwardly extending straight shank portion 568, depends from, and is fixed to, the lower end of the knife blade supporting member 566. During operation of the machine, the knives 569 are continuously rotated by a drive means later described. The upper portion of the knife blade supporting member 566 is bifurcated to receive a flat portion 570 of a coring knife actuating rod 571. The rod 571 extends upwardly through the tubular knife supporting member 560 and is vertically reciprocated by means to be presently described. A diagonal slot 572 (FIGS. 27-29) is cut into the bifurcated end of the knife blade supporting member 566. A pin 573 extends through the flat portion 570 of the rod 571 and is slidably received within the slot 572, whereby downward movement of the rod 571 relative to the knife blade supporting tube 560 will move the knife blade 569 from the position illustrated in FIGURE 28 to that illustrated in FIGURE 29.

The coring knives are raised and lowered relative to the pears by raising and lowering the coring knife actuating carriage member 564 which is mounted for vertical reciprocatory movement in the previously described vertical guides 525 and 526. As best seen in FIGURE 46, the carriage member 564 is pivotally connected adjacent one of its ends to the upper end of a link 574. The lower end of the link 574 is pivotally connected to an actuating arm 575 that is fixed to the coring knife cam follower mounting shaft 132 which was previously described. A similar linkage connects the other end of the carriage member 564 with the shaft 132. A bifurcated arm 576 is fixedly secured to the shaft 132 and the outer end thereof is pivotally connected to one end of a link 577. The other end of the link 577 is bifurcated in the manner indicated at 578 and slidably embraces a square block 579 which is rotatably mounted on the cam shaft 121 at a point adjacent a coring knife actuating cam 580 that is fixed to the same shaft. A cam follower roller 581 is rotatably mounted on the link 577 intermediate the ends thereof and is slidably received within a cam groove formed in the side surface of the cam 580 and indicated by the dot-dash center line 582.

The rod 571 (FIGS. 26 and 30) is rotatably connected at its upper end to a swivel housing 590 by a bearing 591. A pin 592 extends transversely through the swivel housing 590 and is received in the bifurcated ends 593 and 594 of a yoke 595. The yoke 595 is clamped to a shaft 596 that is rotatably mounted in bearings 597 mounted on the upper surface of the coring knife carriage member 564. A bell crank 598 is fixed to the left end of the shaft 596. One arm 599 of the bell crank is connected to one end of a tension spring 600 which at its other end is connected to the carriage member 564 and tends to rotate the shaft 596 in a clockwise direction as viewed in FIGURE 30. The rod 571 is thus raised relative to the coring knife supporting tube 560 to maintain the knife blade 569 in the position illustrated in FIGURE 27. The other arm 601 of the bell crank 598 has a cam follower roller 602 rotatably mounted thereon. Due to the force of the spring 600, the roller 602 is maintained in contact with a cam surface 603 of a stationary cam 604 that is fixed to the side plate 101 by a suitable bracket 605. The cam surface 603 is of proper configuration to guide the continuously rotating knives 569 out of the lower end of the butt stop member 520 and into the butt end of the pear in a position offset from the longitudinal axis of the actuating rod 571 and offset from the stem-blossom axis of the pear whereby the knife will cut the smallest possible hole while it enters the pear. When the carriage member 564 is fully lowered and the coring knives are thus properly positioned for the coring of the seed cells, the blades 569 are swung outwardly to the position illustrated in FIGURE 29.

The coring knives are each continuously rotated by a pulley 620 fixed to the knife supporting tube 560 beneath the sleeve 563 and driven by a common drive belt 621. The belt 621 is trained around a drive pulley 622 (FIG. 15) that is driven by a motor 624 mounted on the rear of the knife carriage member 564. During operation of the machine, the motor 624 is always energized and the coring knives 569 are constantly being rotated at high speed whether they are actually coring or not.

CLAMP CARRIAGE MECHANISM

The clamp carriage 118 (FIG. 37) is mounted for reciprocatory movement in a horizontal plane forwardly and rearwardly of the machine on a pair of suitable guides 630 and 631 (FIG. 41) which are secured to the inner surface of the plates 101 and 102, respectively. One end of a link 632 is connected to the clamp carriage 118 adjacent the right end thereof. The other end of the link 632 is pivotally connected to the upper end of an actuating arm 633 by a pivot pin 634. The lower end of the actuating arm 633 is fixed to a shaft 635 extending transversely of the machine adjacent the lower rear corner thereof and rotatably mounted in the side plates 101 and 102. A similar linkage connects the other end of the carriage 118 to the shaft 635. The right end of the shaft 635 extends through the right side plate 102 and is provided with an arm 636 secured thereto, the outer end of which is pivotally connected to one end of a link 637. At its other end, the link 637 is pivotally connected to an arm 638 which is fixed to the outer end portion of the shaft 137 previously mentioned. A cam follower mounting arm 640 is fixed to the inner end portion of the shaft 137 and rotatably carries adjacent its outer end a cam follower roller 641 which is slidably received within a cam groove 642, indicated by a dot-dash center line, in a clamp carriage actuating cam 643 fixed to the cam shaft 121.

The clamp carriage 118 (FIGS. 37–40, inclusive) comprises a main frame bar 650 having support brackets 651 and 652 secured to the ends thereof. The brackets 651 and 652 are bolted to blocks 653 and 654, respectively, which are slidably disposed within the guides 630 and 631. A plurality of pairs of clamp arms are mounted on the frame member 650 for pivotal motion with respect thereto, the left clamp arms being designated by the reference numeral 655 (FIG. 37) and the right arms by the reference numeral 656. The arm 655 (FIGS. 38 and 40) is secured to the upper end of a shaft 657 by a nut 658 and is keyed to the shaft by a half-moon key 659 receivable in a key way 659a. The shaft 657 is rotatably mounted in a vertical bore 660 provided in the carriage frame member 650. A nut 661 is threaded onto the lower end of the shaft and a washer 662 is interposed between the nut 661 and the lower surface of the frame member 650. A plate 663 is fixed to the upper surface of the frame member 650 and is provided with a lock-receiving opening 664 through which the shaft 657 extends. The lock-receiving opening 664 (FIG. 40) is formed with three equally spaced arcuate portions 665 having equal radii, and three substantially wedge shaped recesses 666 are disposed between the arcuate surfaces 665 to provide a wedging action for locking the arm 655, as will be described presently. A circular hub 667 is received within the opening 664. Two pins 668 (FIG. 39) extend through the clamp arm 655 and downwardly therefrom into suitable openings 669 formed in the hub 667 whereby the hub 667 will rotate with the arm 655. The hub 667 is formed with an upwardly extending annular boss 670 which abuts the lower surface of a boss 671 (FIG. 38) fixed to the undersurface of the clamp arm 655. A lock actuating ring 672 (FIG. 39) is mounted on the boss 670 for rotation with respect thereto and is provided with the three downwardly projecting lock actuating pins 673, each of which project into one of the wedge shaped recesses 666.

A spring retainer 674 (FIGS. 39 and 40) is mounted in each of the wedge shaped recesses 666 and a spring 675 extends from a suitable bore therein in a direction generally tangentially of the hub 667. A vertically disposed roller 676 is interposed between the end of the spring 675 and the pin 673, whereby when the lock actuating ring 672 is rotated clockwise as viewed in FIGURES 39 and 40, the pins 673 are moved away from the rollers 676 and the springs 675 wedge the rollers between the outer surfaces of the wedge shaped recesses 666 and the outer surface of the hub 667 to prevent clockwise, or opening, movement of the clamping arm 655.

The lock actuating ring 672 associated with each of the left clamping arms 655 is pivotally connected to a link 677 by a pivot pin 678 which is secured to the ring and extends upwardly therefrom. The link 677 extends longitudinally of the carriage frame member 650 and is mounted for reciprocating movement in suitable guides 679 (FIG. 37) mounted thereon. At the right end of the link 677 there is formed a square opening 680 (FIG. 39) which receives a square lug 681 extending radially outwardly from a shaft 682 that is rotatably mounted in a bearing sleeve 683. The bearing sleeve 683 is fixed to the support bracket 652 which was previously mentioned. A cam follower arm 684 is secured to the shaft 682 and carries a cam roller 685, which is slidably received in a cam groove 686 formed in a plate 686a (FIG. 6) fixed to the inner surface of the side plate 102. When the carriage 118 is moved forwardly and rearwardly, the arm 684 (FIG. 39) is moved downwardly and upwardly to lock and unlock the clamp arms in the proper time sequence hereinafter described.

It is to be understood that the right clamp arms 656 are similarly mounted and provided with similar, oppositely disposed, locking mechanisms actuated by a second link 687 (FIGS. 37 and 38) which is actuated by a lug 688 extending radially from the shaft 682 adjacent the follower arm 684. The arms 655 and 656 of each pair of clamp arms are normally urged toward each other by tension spring 690 (FIG. 37) that is connected at its opposite ends to pins 691 and 692 fixed to and extending upwardly from the upper surfaces of the arms 655 and 656, respectively.

The mechanism for opening the arms 655 and 656 to a position away from each other comprises a pair of push rods 693 (FIGS. 37 and 39) and 694 slidably mounted adjacent the front and rear portions of the frame bar member 650 by a plurality of suitable bosses 693a and 694a, respectively. The push rod 694 has fixed thereto at spaced points therealong, cam blocks 695 which are each adapted to contact a cam roller 696 rotatably mounted on a pin 697 that depends from the rear end portion of each clamp arm 655. When the push rod 694 is moved toward the right as viewed in FIGURE 37, the cam blocks 695 move the rear of the clamp arms 655 toward the right thus rotating the arm in a clockwise direction to move the forward end of the arm away from the forward end of its associated arm 656.

Similarly, a plurality of cam carrying blocks 698 are fixed to the push rod 693 and a cam 699 is fixed to each block 698. Each cam 699 is adapted to contact a cam roller 700 that is rotatably mounted on a pin 701 fixed to and extending downwardly from the clamp arm 656 at a point intermediate its length. When the push rod 693 is moved toward the right, as viewed in FIGURE 37, the cam 699 moves the clamp arm 656 counterclockwise and thus causes the forward end thereof to move away from its associated clamp arm 655.

The left ends of the push rods 693 (FIG. 37) and 694 are each connected to a block 702. A pin 703 extends upwardly from the center portion of the block 702 and a cam follower roller 704 is rotatably mounted on the pin 703. The cam follower roller 704 is in contact with the inner edge portion of a block 705 that is mounted between the upper ends of two arms 706 and 707 in a position parallel and adjacent to the side plate 101. Referring now to FIGURE 49, the arms 706 and 707 are secured to a shaft 708 that is rotatably mounted in suitable bearing brackets 709 and 710 which are fixed to the inner surface of the side plate 101. A cam follower arm 711 is fixed to the rear end of the shaft 708 and extends radially outward therefrom through an aperture 712 in the side plate 101. A cam roller 713 is rotatably mounted on the outer end thereof. A bell crank 714, rotatably mounted on the outside of the side plate 101 on a stub shaft 715, has an arm 716 in contact with the lower surface of the cam roller 713. The outer end of its other arm 717 is pivotally attached to the upper end of a substantially vertical link 718 by a pivot pin 719. The lower end of the link 718 is pivotally attached to an arm 720 by a pivot pin 721 and the arm 720 is secured to the previously described cam follower mounting shaft 133. A cam follower mounting arm 722 is secured to the cam follower mounting shaft 133 and carries on its outer end a cam follower roller 723 in contact with the outer cam surface of a clamp actuating cam 724 fixed to the cam shaft 121.

As is best seen in FIGURE 37, the forwardmost end of the clamping arm 655 is provided with a spherical clamp cup 725. The cup 725 is provided on its rear surface with two parallel spaced lugs 726 and 727 (FIG. 38) and is mounted for limited pivotal movement in a horizontal plane about a vertical pivot pin 728 extending through the lugs 726 and 727 and a block 729. Two set screws 730 and 731 are threaded into the block 729, one on each side of the pin 728, and are adapted to abut the rear surface of the cup 725 and limit the horizontal movement thereof. The block 729 is fixed to a horizontally extending pin 732 which is rotatably mounted in a depending end portion 733 of the arm 655 to permit rotational movement of the cup 725 in a vertical plane. The motion in the vertical plane is limited by a bracket 734 which is fixed to the block 729 and adapted to contact the lower surface of the end portion 733 of the clamp arm 655.

The arms 656 are provided with a similar spherical cup 735 mounted in a similar manner but oppositely disposed with respect to the cup 725. When the forward ends of the arms 655 and 656 are moved toward each other, the cups 725 and 735 are adapted to grip the butt end of a pear therebetween. Because of their pivotal mountings, the cups will closely engage any size of pear.

DISCHARGE CONVEYOR

The discharge conveyor, generally indicated at 120, is best seen in FIGURES 3 to 5 and 15. The conveyor 120 comprises an endless belt 740 extending transversely of the machine immediately beneath the rearmost position of the clamp cups 725 and 735. The belt 740 is trained over suitable horizontally disposed rollers 741 and 742. The roller 741 is rotatably supported by suitable bracketc 743 (FIG. 1) and 744 fixed to the outer surface of the side plate 101. The roller 742 is similarly supported by brackets 745 (FIG. 3) and 746 fixed to the outer surface of side plate 102. The shaft of the roller 741 is provided with a bevel gear 747 (FIGS. 4 and 15) which meshes with a bevel gear 748 fixed to a shaft 749 that is rotatably mounted in suitable bearings on the bracket 743 and the side plate 101. A sprocket 750 is fixed to the shaft 749 and is connected by a drive chain 751 to a large driving sprocket 752 fixed to the left end of the cam shaft 121. When the machine is in operation, the drive train above described causes the upper flight of the discharge conveyor belt 740 to move to the left of the machine.

OPERATION

The operation of the machine is best understood in connection with FIGURES 53 to 60 which trace the course of a single pear through the machine, although it should be understood that six pears are conveyed through the machine simultaneously and the same operations are performed on all six of the pears.

The placement of the pears into the feed cups 106, by either hand or machine, is chosen as the most logical point in the machine's operating cycle to start the description. A pear 760 is dropped into the feed cup 106 with its stem end down (FIG. 53) at the time when the transfer cup carriage 107 is farthest away from the feed cups. The transfer cup 108 is then moved forward, from the position shown in FIGURE 53 to the position shown in FIGURE 54, wherein it is in vertical alignment with the feed cup 106. When the transfer cup 108 reaches this position, the feed cup 106 is opened in the manner previously described, and the pear 760 is dropped into the transfer cup 108. The transfer cup then moves rearwardly (FIG. 55) until the pear 760 is in vertical alignment with the presser member 110 and the gauge bars 111. The presser member 110 is moved downwardly and the stem end of the pear is seated against the gauge bars 111. During the time the pear is being seated, the rollers of the transfer cup 108 and the pear aligning arms 200 and 201 cooperate to vertically align the pear. While the pear 760 is held against the gauge bars 111, the knife assembly 112 is actuated to cut off the stem end of the pear and the cut-off portion 761 drops away from the pear.

After a suitable interval to permit certain operations to be completed on the preceding pear in the manner more fully described hereinbelow, the transfer cup 108 is moved further rearwardly to the position illustrated in FIGURE 56. In this position the pear 760 is in vertical alignment below the butt stop 520 and above the impaling tubes 114. The butt stop 520 is then moved downwardly against the butt or blossom end of the pear 760 and the impaling tube 114 is moved upwardly into the pear. It should be noted at this point that the blossom end of all of the six pears are indexed at the same height regardless of the pear size, through the use of the weight 540 and the mechanism associated therewith in the manner previously described. The nose stop 330 is released and moves upwardly until it strikes the nose of the pear 760. The nose stop is then locked in this position. The several nose stops may move different amounts depending on the individual pear sizes, but each of the nose stops 330 will be in contact with its associated pear. It will be noted that it is at this point in the cycle that the succeeding pear 762 is deposited in the now closed feed cup 106.

The transfer cup 108 (FIG. 57) and the aligning arms 200 and 201 are now opened, and the transfer carriage 107 moves forwardly away from the pear 760 now impaled on the impaling tube 114, and the impaling tube starts rotating. The peeling knife assembly 115 is lowered into contact with the rotating pear 760 and peels the skin therefrom in a continuous spiral peel. The upper peeling carriage, not shown in FIGURE 57, is slowly moved downwardly relative to the lower peeling knife carriage, also not shown, so that the peeling knife is rotated as it is lowered and follows the contour of the pear 760. During the peeling of the pear 760, the succeeding pear 762 is moved to the positions shown in FIGURES 55 and 58 and the stem end thereof is cut off in the manner previously described.

At the completion of the peeling operation, the peeling knife is locked away from the pear 760 and both the upper and lower peeling knife carriages are moved upwardly without changing their relative distance from each other. Thus the knives are held in their rotated and locked-out position to remain out of the way of the coring tube assembly 116.

At the completion of the peeling operation the Geneva drive stops the rotation of the impaling tube 114 (FIG. 58) in the position wherein the plane of its fins and the plane of the splitting blades 361 and 362 extends forwardly and rearwardly of the machine. The clamp carriage 118 is now moved forwardly and the clamps are closed on the pear 760 and locked in that position in the manner previously described.

The coring assembly 116 (FIG. 58) is now lowered until the butt stop 520 contacts the butt end of the pear 760. The coring knife, not shown, is projected out of the butt stop and enters the butt end of the pear. When the coring knife reaches its lowermost position it is swung outwardly, in the manner previously described in connection with FIGURES 28 and 29, to completely sever the core from the pear 760. As the coring knife enters the pear, the impaling tube 114 is withdrawn. The butt stop 520 and the nose stop 330 cooperate to prevent vertical movement of the pear 760 as the coring knife enters and is withdrawn therefrom, and while the impaling tube is withdrawn. When the impaling tube is fully withdrawn from the pear 760, the nose stop lock is released and the nose stop 330 is retracted away from the pear along with the impaling tube.

The splitting blade assembly 117 is raised, as shown in FIGURE 59, at the same time as the coring knife is withdrawn, and the blades 361 and 362 sever the pear 760 into two portions while the butt stop 520 is still in contact with the pear 760 to resist the thrust of the blades 361 and 362. The splitting blade assembly 117 is then lowered. During the latter portion of the peeling operation, and during the coring and splitting operations on the pear 760, the succeeding pear 762 is held at the stem end trimming station in the manner previously described.

After the splitting operation is completed, the clamp carriage 118 (FIG. 60) is moved rearwardly to bring the pear 760 into vertical alignment with the conveyor 120, and the transfer cup 108 is simultaneously moved rearwardly to bring the succeeding pear 762 into alignment with the impaling tubes 114. When the pear 760 reaches its rearmost position the clamp arms are opened and the pear halves drop onto the conveyor 120 in the manner illustrated in FIGURE 53. At this point a second succeeding pear 763 (FIG. 60) has been introduced into the feed cup 106.

From the foregoing description, it may be seen that the untreated pears are fed to the machine six abreast in a continuous stream and are passed through the machine to be stemmed, peeled, cored and halved and issue from the machine on the discharge conveyor in condition for further operations thereon.

Having thus described my invention, what I claim and desire to secure by Letters Patent is:

1. In a fruit preparation machine, a transfer carriage mounted for horizontal reciprocating motion, a fruit holding assembly mounted on said carriage, said assembly being adapted to receive a fruit and carry the same from a fruit receiving station to an impaling station, means for adjusting the pear in said fruit holder to a position wherein the end surface of its blossom end is at a predetermined elevation, a vertically disposed impaling tube at said impaling station mounted both for rotary and for vertical reciprocating movement, means for moving said impaling tube upwardly to impale the fruit in said fruit holding assembly and position the upper end of the tube at an elevation slightly below said predetermined elevation, a peeling knife carriage mounted for vertical reciprocation adjacent said impaling tube, a peeling knife mounted on said peeling knife carriage, means for rotating said impaling tube, and means for moving said peeling knife carriage to bring said knife into contact with said rotating fruit.

2. In a fruit preparation machine, a transfer carriage mounted for horizontal reciprocating motion, a fruit holding assembly mounted on said carriage, said assembly being adapted to receive a fruit and carry the same from a fruit receiving station to an impaling station, a vertically disposed impaling tube at said impaling station mounted both for rotary and for vertical reciprocating movement, means for moving said impaling tube upwardly to impale the fruit in said fruit holding assembly, a clamp carriage mounted for horizontal reciprocating movement between said impaling station and an unloading station, a pair of clamp arms mounted on said clamp carriage adapted to clamp the sides of said fruit, a coring knife mounted above said impaling tube in coaxial alignment therewith, means for continuously rotating said coring knife, and means for moving said coring knife downwardly relative to said fruit as the impaling tube is withdrawn downwardly therefrom, whereby said coring knife enters said fruit and severs the core therefrom.

3. In a fruit preparation machine, a transfer carriage mounted for horizontal reciprocating motion, a fruit holding assembly mounted on said carriage, said assembly being adapted to receive a fruit and carry the same from a fruit receiving station to an impaling station, a vertically disposed impaling tube at said impaling station mounted both for rotary motion and for vertical reciprocating movement, means for moving said impaling tube upwardly to impale the fruit in said fruit holding assembly, a clamp carriage mounted for horizontal reciprocating movement between said impaling station and an unloading station, a pair of clamp arms mounted on said clamp carriage adapted to clamp the sides of said fruit, a coring assembly mounted above said impaling tube in coaxial alignment therewith, said coring assembly comprising a knife mounting tube and a coring knife pivotally connected to the lower end of said knife mounting tube, means for continuously rotating said coring knife mounting tube, and means for moving said mounting tube downwardly relative to said fruit as the impaling tube is withdrawn downwardly therefrom, whereby said coring knife enters said fruit and cuts an enlarged area from the central portion thereof to completely sever the core therefrom.

4. In a fruit preparation machine, a transfer carriage mounted for horizontal reciprocating motion, a fruit holding assembly mounted on said carriage, said assembly being adapted to receive a fruit and carry the same from a fruit receiving station to an impaling station, a vertically disposed impaling tube at said impaling station mounted both for rotary motion and for vertical reciprocating movement, means for moving said impaling tube upwardly to impale the fruit in said fruit holding assembly, a clamp carriage mounted for horizontal reciprocating movement between said impaling station and an unloading station, a pair of clamp arms mounted on said clamp carriage adapted to clamp the sides of said fruit, a pair of splitting blades mounted on said impaling tube for rotation therewith and for reciprocation with respect thereto, means for moving said splitting blades relative to said fruit to split said fruit into two halves, means for moving said clamp carriage to said unloading station after said fruit is split, and means for opening said clamp arms to release said split fruit.

5. In a fruit preparation machine, a transfer carriage mounted for horizontal reciprocating motion, a fruit holding assembly mounted on said carriage, said assembly being adapted to receive a fruit and carry the same from a fruit receiving station to an impaling station, a vertically disposed impaling tube at said impaling station mounted both for rotary motion and for vertical reciprocating movement, means for moving said impaling tube upwardly to impale the fruit in said fruit holding assembly, a clamp carriage mounted for horizontal reciprocating movement between said impaling station and an unloading station, a pair of clamp arms mounted on said clamp carriage adapted to clamp the sides of said fruit, a coring assembly mounted adjacent said impaling tube in coaxial alignment therewith, said coring assembly comprising a knife mounting tube and a coring knife pivotally connected to the lower end of said knife mounting tube, means for continuously rotating said coring knife mounting tube, means for moving said mounting tube relative to said fruit as the impaling tube is withdrawn therefrom, whereby said coring knife enters said fruit and cuts an enlarged area from the central portion thereof to completely sever the core therefrom, a pair of splitting blades mounted on said impaling tube for rotation therewith and for reciprocation with respect thereto, means for moving said splitting blades relative to said fruit as the coring knife is removed therefrom to split said fruit into two halves, means for moving said clamp carriage to said unloading station after said fruit is split, and means for opening said clamp arms to release said split fruit.

6. In a fruit preparation machine, a transfer carriage mounted for horizontal reciprocating motion adapted to receive a fruit and carry the same from a fruit receiving station to a stem end trimming station and subsequently to an impaling station, a presser member mounted at said stem end trimming station, means for moving said presser member against the blossom end of said fruit, a gauge member in axial alignment with said presser member adapted to arrest the movement of said fruit under the influence of said presser member, a stem end trimming knife mounted for oscillatory movement about an axis adjacent said gauge member, means for oscillating said knife to trim the stem end from said fruit, a vertically disposed impaling tube at said impaling station mounted both for rotary and for vertical reciprocatory movement, means for moving said impaling tube relative to said fruit to impale the fruit, a peeling knife carriage mounted for reciprocation adjacent said impaling tubes, a peeling knife mounted on said peeling knife carriage, means for rotating said impaling tube, means for moving said peeling knife carriage to bring said knife into contact with said rotating fruit, a clamp carriage mounted for horizontal reciprocatory movement between said impaling station and an unloading station, a pair of clamp arms mounted on said clamp carriage adapted to clamp the sides of said fruit, a coring assembly mounted adjacent said impaling tube in coaxial alignment therewith, said coring assembly comprising a knife mounting tube and a coring knife pivotally connected to the lower end of said knife mounting tube, means for continuously rotating said coring knife mounting tube, means for moving said mounting tube relative to said fruit as the impaling tube is withdrawn therefrom, whereby said coring knife enters said fruit and cuts an enlarged area from the central portion thereof to completely sever the core therefrom, a pair of splitting blades mounted on said impaling tube for rotation therewith and for reciprocation with respect thereto, means for moving said splitting blades relative to said fruit as the coring knife is removed therefrom to split said fruit into two halves, means for moving said clamp carriage to said unloading station after said fruit is split, means for opening said clamp arms to release said split fruit, and a conveyor at said unloading station adapted to receive the fruit as it is released by said clamp arms.

7. In a fruit preparation machine, a transfer carriage mounted for horizontal reciprocating motion, a plurality of fruit holding assemblies mounted on said carriage, each of said assemblies being adapted to receive a fruit and carry the same from a fruit receiving station to an impaling station, a plurality of vertically disposed impaling tubes at said impaling station each mounted both for rotary and for vertical reciprocating movement, means for moving said impaling tubes upwardly to impale the fruit in said fruit holding assemblies, means movable into engagement with the lower end of the fruit on said tube to prevent downward movement of the fruit, a peeling knife carriage mounted for vertical reciprocation adjacent said impaling tubes, a plurality of peeling knives mounted on said peeling knife carriage, means for rotating said impaling tubes, and means for moving said peeling knife carriage to bring said knives into contact with said rotating fruit and downwardly along the fruit from the top end to the bottom end.

8. In a fruit preparation machine, a transfer carriage mounted for horizontal reciprocating motion, a plurality of fruit holding assemblies mounted on said carriage, each of said assemblies being adapted to receive a fruit and carry the same from a fruit receiving station to an impaling station, a plurality of vertically disposed impaling tubes at said impaling station each mounted both for rotary and for vertical reciprocating movement, means for moving said impaling tubes inwardly to impale the fruit in said fruit holding assemblies, a clamp carriage mounted for horizontal reciprocating movement between said impaling station and an unloading station, a plurality of pairs of clamp arms mounted on said clamp carriage adapted to clamp the sides of their associated fruit, a plurality of coring knives mounted adjacent said impaling tubes in coaxial alignment therewith, means for continuously rotating said coring knives, and means for moving said coring knives relative to said fruit as the impaling tubes are withdrawn therefrom, whereby said coring knives enter said fruit and sever the cores therefrom.

9. In a fruit preparation machine, a transfer carriage mounted for horizontal reciprocating motion, a plurality of fruit holding assemblies mounted on said carriage, each of said assemblies being adapted to receive a fruit and carry the same from a fruit receiving station to an impaling station, a plurality of vertically disposed impaling tubes at said impaling station each mounted both for rotary motion and for vertical reciprocating movement, means for moving said impaling tubes upwardly to impale the fruit in said fruit holding assemblies, a clamp carriage mounted for horizontal reciprocating movement between said impaling station and an unloading station, a plurality of pairs of clamp arms mounted on said clamp carriage each pair adapted to clamp the sides of its associated fruit, a plurality of coring assemblies mounted adjacent said impaling tubes in coaxial alignment therewith, each of said coring assemblies comprising a knife mounting tube and a coring knife pivotally connected to the lower end of each knife mounting tube, means for continuously rotating said coring knife mounting tubes, and means for moving said mounting tubes relative to said fruit as the impaling tubes are withdrawn therefrom, whereby said coring knives enter said fruit and cut an enlarged area from the central portions thereof to completely sever the cores therefrom.

10. In a fruit preparation machine, a transfer carriage mounted for horizontal reciprocating motion, a plurality of fruit holding assemblies mounted on said carriage, each of said assemblies being adapted to receive a fruit and carry the same from a fruit receiving station to an impaling station, a plurality of vertically disposed impaling tubes at said impaling station each mounted both for rotary motion and for vertical reciprocating movement, means for moving said impaling tubes upwardly to impale the fruit in said fruit holding assemblies, a clamp carriage mounted for horizontal reciprocating movement between said impaling station and an unloading station, a plurality of pairs of clamp arms mounted on said clamp carriage each pair adapted to clamp the sides of its associated fruit, a pair of splitting blades mounted on each of said impaling tubes for rotation therewith and for reciprocation with respect thereto, means for moving said splitting blades relative to said fruit to split said fruit into two halves, means for moving said clamp carriage to said unloading station after said fruit is split, and means for opening said clamp arms to release said split fruit.

11. In a fruit preparation machine, a transfer carriage mounted for horizontal reciprocating motion, a plurality of fruit holding assemblies mounted on said carriage, each of said assemblies being adapted to receive a fruit and carry the same from a fruit receiving station to an impaling station, a plurality of vertically disposed impaling tubes at said impaling station each mounted both for rotary motion and for vertical reciprocating movement, means for moving said impaling tubes upwardly to impale the fruit in said fruit holding assemblies, a clamp carriage mounted for horizontal reciprocating movement between said impaling station and an unloading station, a plurality of pairs of clamp arms mounted on said clamp carriage each pair adapted to clamp the sides of its associated fruit, a plurality of coring assemblies mounted adjacent said impaling tubes in coaxial alignment therewith, each of said coring assemblies comprising a knife mounting tube and a coring knife pivotally connected to the lower end of each knife mounting tube, means for continuously rotating said coring knife mounting tubes, means for moving said mounting tubes relative to said fruit as the impaling tubes are withdrawn therefrom, whereby said coring knives enter said fruit and cut an enlarged area from the central portions thereof to completely sever the cores therefrom, a pair of splitting blades mounted on each of said impaling tubes for rotation therewith and for reciprocation with respect thereto, means for moving said splitting blades relative to said fruit as the coring knives are removed therefrom to split said fruit into two halves, means for moving said clamp carriage to said unloading station after said fruit is split, and means for opening said clamp arms to release said split fruit.

12. In a fruit preparation machine, a transfer carriage mounted for horizontal reciprocating motion adapted to receive a fruit and carry the same from a fruit receiving station to a stem end trimming station and subsequently to an impaling station, a plurality of presser members mounted at said stem end trimming station, means for moving said presser members against the blossom ends of said fruit, gauge members in axial alignment with said presser members adapted to arrest the movement of said fruit under the influence of said presser members, a plurality of horizontally disposed stem end trimming knives mounted for oscillatory movement about an axis adjacent one of said gauge members, means for oscillating said knives to trim the stem ends from said fruit, a plurality of vertically disposed impaling tubes at said impaling station each mounted both for rotary and for vertical reciprocatory movement, means for moving said impaling tubes upwardly to impale the fruit, a peeling knife carriage mounted for reciprocation adjacent said impaling tubes, a plurality of peeling knives mounted on said peeling knife carriage, means for rotating said impaling tubes, means for moving said peeling knife carriage to bring said knives into contact with said rotating fruit, a clamp carriage mounted for horizontal reciprocatory movement between said impaling station and an unloading station, a plurality of pairs of clamp arms mounted on said clamp carriage each pair adapted to clamp the sides of its associated fruit, a plurality of coring assemblies mounted adjacent said impaling tubes in coaxial alignment therewith, each of said coring assemblies comprising a knife mounting tube and a coring knife pivotally connected to the lower end of each knife mounting tube, means for continuously rotating said coring knife mounting tubes, means for moving said mounting tubes relative to said fruit as the impaling tubes are withdrawn therefrom, whereby said coring knives enter said fruit and cut an enlarged area from the central portions thereof to completely sever the cores therefrom, a pair of splitting blades mounted on each of said impaling tubes for rotation therewith and for reciprocation with respect thereto, means for moving said splitting blades relative to said fruit as the coring knives are removed therefrom to split said fruit into two halves, means for moving said clamp carriage to said unloading station after said fruit is split, means for opening said clamp arms to release said slipt fruit, and a conveyor at said unloading station adapted to receive the fruit as it is released by said clamp arms.

13. In a fruit processing machine, a vertically disposed impaling tube, means for impaling a fruit thereon, means for rotating said impaling tube and fruit, a first vertically movable carriage, a peeling knife mounting bracket fixed to said first carriage, a peeling knife mounting bar mounted on said bracket for both pivotal and rotatable movement relative thereto, a peeling knife blade mounted on said mounting bar, spring means normally urging said peeling knife mounting bar about its pivotal connection to yieldably maintain said knife blade in contact with said rotating fruit, a second vertically movable carriage and means associated with said second carriage and said mounting bracket for rotating said peeling knife mounting bar about the axis of said bracket upon relative movement between said first and second carriages to cause said knife blade to follow the surface contour of said rotating fruit in proper cutting relation therewith as knife progresses downwardly relative to said rotating fruit.

14. In a fruit processing machine, a vertically disposed impaling tube, means for impaling a fruit thereon, means for rotating said impaling tube and fruit, a first vertically movable carriage, a peeling knife mounting bracket fixed to said first carriage, a peeling knife mounting bar mounted on said bracket for both pivotal and rotatable movement relative thereto, a peeling knife blade mounted on said mounting bar, spring means normally urging said peeling knife mounting bar about its pivotal connection to yieldably maintain said knife blade in contact with said rotating fruit, a second vertically movable carriage, means associated with said second carriage and said mounting bracket for rotating said peeling knife mounting bar about the axis of said bracket upon relative movement between said first and second carriages to cause said knife blade to follow the surface contour of said rotating fruit in proper cutting relation therewith as knife progresses downwardly relative to said rotating fruit, and cam means for moving said first and second carriages in proper timed relation with each other.

15. In a fruit processing machine, a vertically disposed impaling tube, means for impaling a fruit thereon, means for rotating said impaling tube and fruit, a first vertically movable carriage, a peeling knife mounting bracket fixed to said first carriage, a peeling knife mounting bar mounted on said bracket for both pivotal and rotatable movement relative thereto, a peeling knife blade mounted on said mounting bar, spring means normally urging said peeling knife mounting bar about its pivotal connection to yieldably maintain said knife blade in contact with said rotating fruit, a second vertically movable carriage, means associated with said second carriage and said mounting bracket for rotating said peeling knife mounting bar about the axis of said bracket upon relative movement between said first and second carriages to cause said knife blade to follow the surface contour of said rotating fruit in proper cutting relation therewith as knife progresses downwardly relative to said rotating fruit, cam means for moving said first and second carriages in proper timed relation with each other, cam means for moving said cutting bar about its pivotal axis against the action of said spring to move said knife blade away from said fruit, and means for actuating said last mentioned cam means after completion of the peeling of said fruit.

16. In a fruit preparation machine, a clamp carriage mounted for horizontal reciprocating movement from a coring station to an unloading station, a plurality of pairs of clamp arms, each of said pairs of clamp arms being adapted to clamp the sides of their associated fruit at said coring station and hold said fruit with its stem blossom axis vertical and to release said fruit when said clamp carriage reaches said unloading station, a plurality of coring assemblies mounted at said coring station, each of said coring assemblies comprising a knife mounting tube mounted for rotational and vertical reciprocating movement, a spoon-shaped coring knife pivotally connected to the lower end of said knife mounting tube for movement about an axis transverse to and laterally offset from the rotary axis of said tube, means for continuously rotating said coring knife mounting tube, means for lowering said mounting tube relative to said fruit while maintaining said coring knife in its inclined position, means for pivoting said knife to its straight position so that the curved portion thereof will cut an enlarged area from the central portion of said fruit and completely sever the core therefrom, splitting blades mounted below each coring assembly at said coring station for vertical reciprocating movement, means for moving said blades upwardly to split the cored fruit held in said clamp arms, means for moving said clamp carriage to said unloading station after said fruit is cored and split, and means for opening said clamp arms to release said cored and split fruit.

17. In a fruit preparation machine, a clamp carriage mounted for horizontal reciprocating movement from a coring station to an unloading station, a plurality of pairs of clamp arms, each of said pairs of clamp arms being adapted to clamp the sides of their associated fruit at said coring station and hold said fruit with the stem blossom axis of each vertical and to release said fruit when said clamp carriage reaches said unloading station, a plurality of coring assemblies mounted at said coring station, each of said coring assemblies comprising a knife mounting tube mounted for rotational and vertical reciprocating movement, a spoon-shaped coring knife pivotally connected to the lower end of each of said knife mounting tubes for movement about an axis transverse to and laterally offset from the rotary axis of said tube, a push rod slidably mounted within each of said mounting tubes and connected with said knives so that downward movement of said push rods will pivot said knives about their connection to said mounting tubes from a position wherein the straight portion of each of said knives is diagonal to the axis of its associated mounting tube to a position wherein said straight portion is parallel to but laterally offset from the axis of said mounting tube, means for continuously rotating said coring knife mounting tubes, means for lowering said mounting tubes relative to said fruit while maintaining said push rods in their upper position relative to said mounting tubes, whereby said coring knives enter said fruit in their inclined position and cut a relatively small diameter bore therein, means for lowering said push rods relative to said knife mounting tubes when said tubes reach their lowermost position, whereby the knives will be pivoted to their straight position so that the curved portion of each will cut an enlarged area from the central portion of its associated fruit and completely sever the core therefrom, splitting blades at said coring station operable to split the cored fruit held in said clamp arms, means for moving said clamp carriage to said unloading station after said coring knives are withdrawn and the fruit is split, and means for opening said clamp arms to release said cored and split fruit.

18. In a fruit preparation machine, a clamp carriage mounted for horizontal reciprocating movement from a coring station to an unloading station, a plurality of pairs of clamp arms, each of said pairs of clamp arms being adapted to clamp the sides of their associated fruit at said coring station and hold said fruit with the stem blossom axis of each vertical and to release said fruit when said clamp carriage reaches said unloading station, a plurality of coring assemblies mounted at said coring station, each of said coring assemblies comprising a knife mounting tube mounted for rotational and vertical reciprocating movement, a coring knife pivotally connected to the lower end of each of said knife mounting tubes for movement about an axis transverse to and laterally offset from the rotary axis of said tube, said knives each comprising a straight portion and a downwardly depending arcuate portion, the chord of said arcuate portion being in alignment with said straight portion, a push rod slidably mounted within each of said mounting tubes and connected with said knives so that downward movement of said push rods will pivot said knives about their connection to said mounting tubes from a position wherein the straight portion of each of said knives is diagonal to the axis of its associated mounting tube to a position wherein said straight portion is parallel to but laterally offset from the axis of said mounting tube, means for continuously rotating said coring knife mounting tubes, means for lowering said mounting tubes relative to said fruit while maintaining said push rods in their upper position relative to said mounting tubes, whereby said coring knives enter said fruit in their inclined position and cut a relatively small diameter bore therein, means for lowering said push rods relative to said knife mounting tubes when said tubes reach their lowermost position, whereby the knives will be pivoted to their straight position so that the curved portion of each will cut an enlarged area from the central portion of its associated fruit and completely sever the core therefrom, splitting blades at said coring station, means for moving said blades into the fruit to split the fruit as said knives are withdrawn means for moving said clamp carriage to said unloading station after said coring knives are withdrawn and the fruit has been split, and means for opening said clamp arms to release said cored and split fruit.

19. In a fruit preparation machine, means for supporting a fruit; a composite processing tool mounted adjacent to and in alignment with said fruit support means and including a tubular stop movable into engagement with one surface of a fruit on said support means, an impaling member disposed within said tubular stop and movable relative to said stop to engage and penetrate the fruit, and a splitting blade including a tubular member telescoped over said stop and movable relative thereto to engage and split the fruit; and means for selectively moving said stop, said impaling member, and said splitting blade.

20. In a fruit preparation machine, means for supporting a pear in fixed position with its stem-blossom axis having a predetermined orientation, an impaling tube mounted for movement relative to said fruit support means to pentrate the pear along its stem-blossom axis, a butt stop having a hollow central passage in alignment with said impaling tube and movable into engagement with the butt end of the pear to resist the pressure on the pear as said tube penetrates the pear, means moving said tube into the pear and withdrawing it, a coring knife disposed in the central passage of said butt stop and mounted for movement out of said passage to penetrate and make a coring cut in the pear while said stop is in engagement with the pear.

21. In a fruit preparation machine, means for supporting a fruit in fixed position, a vertically disposed impaling tube mounted below said suport means at an impaling station both for rotary motion and for vertical reciprocating movement, means for moving said impaling tube upwardly to impale the fruit in said fruit holding assembly, a clamp carriage mounted for horizontal reciprocating movement between said impaling station and an unloading station, a pair of clamp arms mounted on said clamp carriage adapted to clamp the sides of said fruit, a pair of splitting blades mounted on said impaling tube for rotation therewith and for reciprocation with respect thereto, means for moving said splitting blades relative to said fruit to split said fruit into two halves, means for moving said clamp carriage to said unloading station after said fruit is split, and means for opening said clamp arms to release said split fruit.

22. In a fruit preparation machine, means for supporting a fruit in fixed position, a vertically disposed impaling tube mounted below said support means at an impaling station both for rotary motion and for vertical reciprocating movement, means for moving said impaling tube upwardly to impale the fruit in said fruit holding assembly, means for rotating said impaling tube, a cutter movable along the surface of the fruit to peel it during rotation of said impaling tube, a clamp carriage mounted for horizontal reciprocating movement between said impaling station and an unloading station, a pair of clamp arms mounted on said clamp carriage adapted to clamp the sides of said fruit, a pair of splitting blades mounted on said impaling tube for rotation therewith and for reciprocation with respect thereto, means for moving said splitting blades relative to said fruit to split said fruit into two halves, means for moving said clamp carriage to said unloading station after said fruit is split, and means for opening said clamp arms to release said split fruit.

23. In a fruit preparation machine, a vertically disposed impaling tube at said impaling station mounted for rotary movement, means for positioning a pear in impaled relation on said tube with the tube extending into the stem end of the fruit and projecting along the stem-blossom axis to a point short of the butt end, a peeling knife carriage mounted for vertical reciprocation adjacent said impaling tube, a peeling knife mounted on said peeling knife carriage, means for rotating said impaling tube, and means for initially moving said peeling knife carriage to bring said knife into contact with the exposed butt end of the rotating pear near the axis thereof and then moving said knife longitudinally of the pear to cut a spiral peel as the pear rotates.

24. In a fruit preparation machine, a plurality of vertically disposed impaling tubes mounted for vertical reciprocating movement, means for positioning a plurality of pears above said tubes with the upper surfaces of all the pears disposed in a common horizontal plane, said positioning means including a weighted member movable downwardly by gravity to move the top surfaces of the pears to said common horizontal plane, the stem-blossom axis of each pear being in vertical alignment with the axis of one of said tubes, and means for moving said tubes upwardly into the pears.

References Cited by the Examiner

UNITED STATES PATENTS

| | | | |
|---|---|---|---|
| 1,198,283 | 9/16 | Shira | 74—53 |
| 1,823,854 | 9/31 | Coons | 146—52 X |
| 2,187,075 | 1/40 | Coons | 146—33 |
| 2,431,310 | 11/47 | Coons | 146—51 |
| 2,468,255 | 4/49 | Dunn | 146—51 |
| 2,622,719 | 12/52 | Amori | 198—103 |
| 2,629,480 | 2/53 | Williams | 198—28 |
| 2,664,129 | 12/53 | Coons | 146—52 |
| 2,692,509 | 10/54 | Gibson | 74—53 |
| 2,699,191 | 1/55 | de Back et al. | 146—51 |
| 2,740,441 | 4/56 | Coons | 146—33 |
| 2,891,591 | 6/59 | Boyce | 146—43 |
| 2,927,615 | 3/60 | Puccinelli | 146—43 |
| 2,969,098 | 1/61 | Creed | 146—52 |
| 3,039,504 | 6/62 | Overstreet et al. | 146—51 |
| 3,111,972 | 11/63 | Anderson et al. | 146—52 X |

J. SPENCER OVERHOLSER, *Primary Examiner.*